(12) United States Patent
He et al.

(10) Patent No.: US 12,744,882 B2
(45) Date of Patent: Sep. 22, 2026

(54) REFERENCE PICTURE SET (RPS) SIGNALING FOR SCALABLE HIGH EFFICIENCY VIDEO CODING (HEVC)

(71) Applicant: InterDigital VC Holdings, Inc., Wilmington, DE (US)

(72) Inventors: Yong He, San Diego, CA (US); Yan Ye, San Diego, CA (US); George W. McClellan, Bensalem, PA (US); Jie Dong, San Diego, CA (US)

(73) Assignee: InterDigital VC Holdings, Inc., Wilmington, DE (US)

(*) Notice: Subject to any disclaimer, the term of this patent is extended or adjusted under 35 U.S.C. 154(b) by 110 days.

(21) Appl. No.: 17/891,352

(22) Filed: Aug. 19, 2022

(65) Prior Publication Data

US 2022/0400254 A1 Dec. 15, 2022

Related U.S. Application Data

(63) Continuation of application No. 13/755,460, filed on Jan. 31, 2013, now Pat. No. 11,445,172.

(Continued)

(51) Int. Cl.

*G02B 21/26* (2006.01)
*H04N 19/105* (2014.01)

(Continued)

(52) U.S. Cl.

CPC ......... *H04N 19/105* (2014.11); *H04N 19/187* (2014.11); *H04N 19/31* (2014.11);

(Continued)

(58) Field of Classification Search

None

See application file for complete search history.

(56) References Cited

U.S. PATENT DOCUMENTS

| | | | |
|---|---|---|---|
| 7,505,590 | B1 | 3/2009 | Apostolopoulos |
| 2004/0179619 | A1 | 9/2004 | Tian et al. |

(Continued)

FOREIGN PATENT DOCUMENTS

| | | | |
|---|---|---|---|
| CN | 1801944 | A | 7/2006 |
| CN | 101228795 | A | 7/2008 |

(Continued)

OTHER PUBLICATIONS

Boyce et al., "Extensible High Layer Syntax for Scalability", JCTVC-E279, Vidyo, Inc., Joint Collaborative Team on Video Coding (JCT-VC) of ITU-T SG 16 WP 3 and ISO/IEC JTC 1/SC 29/WG 11 5th Meeting: Geneva, CH, Mar. 16-23, 2011, pp. 1-10.

(Continued)

*Primary Examiner* — Mikhail Itskovich
(74) *Attorney, Agent, or Firm* — Condo Roccia Koptiw LLP

(57) ABSTRACT

Embodiments contemplate coding video data by generating a video encoded bitstream that may include reference picture set (RPS) extensions for inter-layer reference pictures, and the extensions may include inter-layer delta Picture Order Counts (POCs). Embodiments may also include signaling that lower layer reference pictures may be available in a lower layer decoder picture buffer (DPB), and/or an aggregate DPB, that may be added to the RPS set of a higher layer. The bitstream may include a signal indicating whether the higher layer RPS may be specified by a lower layer RPS, and the lower layer RPS may be temporal, inter-layer prediction (ILP), or both.

16 Claims, 23 Drawing Sheets

Related U.S. Application Data

(60) Provisional application No. 61/639,776, filed on Apr. 27, 2012, provisional application No. 61/593,256, filed on Jan. 31, 2012.

(51) Int. Cl.
*H04N 19/187* (2014.01)
*H04N 19/31* (2014.01)
*H04N 19/33* (2014.01)
*H04N 19/463* (2014.01)
*H04N 19/70* (2014.01)

(52) U.S. Cl.
CPC .......... *H04N 19/33* (2014.11); *H04N 19/463* (2014.11); *H04N 19/70* (2014.11)

(56) References Cited

U.S. PATENT DOCUMENTS

| | | | | |
|---|---|---|---|---|
| 2007/0033494 | A1* | 2/2007 | Wenger | H04N 19/147 375/E7.153 |
| 2007/0109409 | A1 | 5/2007 | Yea et al. | |
| 2008/0089597 | A1 | 4/2008 | Guo et al. | |
| 2008/0137742 | A1 | 6/2008 | Chen et al. | |
| 2008/0253467 | A1 | 10/2008 | Wang et al. | |
| 2009/0003445 | A1 | 1/2009 | Ying et al. | |
| 2009/0080535 | A1 | 3/2009 | Yin et al. | |
| 2009/0116562 | A1 | 5/2009 | Eleftheriadis | |
| 2009/0207919 | A1 | 8/2009 | Yin et al. | |
| 2010/0091881 | A1 | 4/2010 | Pandit et al. | |
| 2011/0002397 | A1 | 1/2011 | Wang et al. | |
| 2012/0183060 | A1* | 7/2012 | Hong | H04N 19/40 375/E7.255 |
| 2014/0105286 | A1 | 4/2014 | Caglar et al. | |

FOREIGN PATENT DOCUMENTS

| | | | |
|---|---|---|---|
| CN | 101516028 | A | 8/2009 |
| CN | 101529913 | A | 9/2009 |
| CN | 101558651 | A | 10/2009 |
| JP | 2009-502099 | A | 1/2009 |
| JP | 2009-522888 | A | 6/2009 |
| JP | 2010-507346 | A | 3/2010 |
| JP | 2011-077722 | A | 4/2011 |
| KR | 10-2009-0079932 | A | 7/2009 |
| TW | 200421878 | A | 10/2004 |
| TW | 200829035 | A | 7/2008 |
| TW | 200843513 | A | 11/2008 |
| TW | 200850008 | A | 12/2008 |
| TW | 200901773 | A | 1/2009 |
| WO | 2010/126608 | A2 | 11/2010 |
| WO | 2010/126612 | A2 | 11/2010 |

OTHER PUBLICATIONS

Boyce et al., "Information for HEVC Scalability Extension", JCTVC-G078, Vidyo, Inc., Joint Collaborative Team on Video Coding (JCT-VC) of ITU-T SG16 WP3 and ISO/IEC JTC1/SC29/WG11, 7th Meeting: Geneva, CH, Nov. 21-30, 2011, pp. 1-7.

Boyce, Jill, "JCT-VC Break-Out Report: Reference Picture Buffering and List Construction (AHG21)", JCTVC-G1002, BoG, Joint Collaborative Team on Video Coding (JCT-VC) of ITU-T SG16 WP3 and ISO/IEC JTC1/SC29/WG11, 7th Meeting: Geneva, CH, Nov. 21-30, 2011, pp. 1-8.

Bross et al., "High Efficiency Video Coding (HEVC) Text Specification Draft 6", JCTVC-H1003, Editor, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pages.

Bross et al., "WD4: Working Draft 4 of High-Efficiency Video Coding", JCTVC-F803_d0, Editor, Joint Collaborative Team on Video Coding (JCT-VC) OF ITU-T SG16 WP3 and ISO/IEC JTC1/SC29/WG11, 6th Meeting, Torino, IT, Jul. 14-22, 2011, 222 pages.

Choi et al., "3D-HEVC HLS: On Reference List", Samsung Electronics Co., Ltd., ISO/IEC JTC1/SC29/WG11 MPEG2012/M24876, Geneva, Switzerland, May 2012, 8 pages.

Choi et al., "Scalable Structures and Inter-Layer Predictions for HEVC Scalable Extension", JCTVC-F096, Kwu (Kwangwoon University), Joint Collaborative Team on Video Coding (JCT-VC) of ITU-T SG16 WP3 and ISO/IEC JTC1/SC29/WG11, 6th Meeting: Torino, IT, Jul. 14-22, 2011, 15 pages.

Deshpande, Sachin, "On Reference Picture Set Extension", JCTVC-K0222, Sharp Labs of America, Inc., Joint Collaborative Team on Video Coding (JCT-VC) of ITU-T SG16 WP3 and ISO/IEC JTC1/SC29/WG11, 11th Meeting: Shanghai, CN, Oct. 10-19, 2012, pp. 1-5.

Hong et al., "Scalability Support in HEVC", JCTVC-F290, Vidyo, Inc., Joint Collaborative Team on Video Coding (JCT-VC) of ITU-T SG 16 WP 3 and ISO/IEC JTC 1/SC 29/WG 11, 6th Meeting: Torino, IT, Jul. 14-22, 2011, pp. 1-15.

ISO/IEC, "3D Video Standardization Plans", Video Subgroup, ISO/IEC JTC1/SC29/WG11 N12557, San Jose, US, Feb. 2012, 3 pages.

ISO/IEC, "Information Technology—Coding of Audio—Visual Objects", ISO/IEC 14496-2:2001(E), Dec. 2001, 536 pages.

ISO/IEC, "Information Technology-Coding of Moving Pictures and Associated Audio for Digital Storage Media at up to About 1,5 Mbit/s—Part 2: Video", ISO/IEC 11172-2:1993/Cor.3:2003(E), Nov. 2003, 6 pages.

ISO/IEC, "Information Technology—Generic Coding of Moving Pictures and Associated Audio Information: Video", ISO/IEC 13818-2:2000 (E), Dec. 2000, 220 pages.

ITU, "Codec for Audiovisual Services AT n*384 kbits", Series H: Audiovisual and Multimedia Systems, Coding of Moving Video, Reedition of CCITT Recommendation H.261 Published in the Blue Book, Fascicle III.6, Nov. 1988, 14 pages.

ITU-T, "Advanced Video Coding for Generic Audiovisual Services", H.264, Series H: Audiovisual and Multimedia Systems, Infrastructure of Audiovisual Services—Coding of Moving Video, Mar. 2005, 23 pages.

ITU-T, "Advanced Video Coding for Generic Audiovisual Services", H.264, Series H: Audiovisual and Multimedia Systems, Infrastructure of Audiovisual Services—Coding of Moving Video, Nov. 2007, 564 pages.

ITU-T, "Video Coding for Low Bit Rate Communication", ITU-T Recommendation H.263, Transmission of Non-Telephone Signals, Mar. 1996, 52 pages.

Lasserre et al., "Low Complexity Scalable Extension of HEVC Intra Pictures", JCTVC-G248, Canon Research Centre France, Joint Collaborative Team on Video Coding (JCT-VC) of ITU-T SG16 WP3 and ISO/IEC JTC1/SC29/WG11, 7th Meeting: Geneva, CH, Nov. 21-30, 2011, pp. 1-8.

Luthra, Ajay, "Draft use Cases for the Scalable Enhancement of HEVC (v1)", WG11 AHG on Study of HEVC Extensions, ISO/IEC JTC1/SC29/WG11 M22558, Geneva, Switzerland, Nov. 2011, 8 pages.

Luthra, Ajay, "Draft Requirements and Discussion on the Scalable Enhancement of HEVC", ISO/IEC JTC1/SC29/WG11 M22556, WG11 AHG on Study of HEVC Extensions, Geneva, Switzerland, Nov. 2011, 20 pages.

Luthra, Ajay, "Draft Requirements for the Scalable Enhancement of HEVC", ISO/IEC JTC1/SC29/WG11 M22557, WG11 AHG on Study of HEVC Extensions, Geneva, Switzerland, Nov. 2011, 8 pages.

Ohm, Jens-Rainer, "Advances in Scalable Video Coding", Proceedings of IEEE, vol. 93, Issue 1, Jan. 2005, pp. 42-56.

Schwarz et al., "Overview of the Scalable Video Coding Extension of the H.264/AVC Standard", IEEE Transactions on Circuits and Systems for Video Technology, vol. 17, Issue 9, Sep. 2007, pp. 1-18.

Schwarz et al., "SI-SVC: Overview of the Scalable Extension of the H.264 / MPEG-4 AVC Video Coding Standard", JVT-U145-L, Fraunhofer HHI, Joint Video Team (JVT) of ISO/IEC MPEG & ITU-T VCEG (ISO/IEC JTC1/SC29/WG11 and ITU-T SG16 Q.6), 21st Meeting: Hangzhou, China, Oct. 20-27, 2006, pp. 1-21.

(56) References Cited

OTHER PUBLICATIONS

Sjoberg et al., "Absolute Signaling of Reference Pictures", JCTVC-F493, Ericsson, Joint Collaborative Team on Video Coding (JCT-VC) of ITU-T SG16 WP3 and ISO/IEC JTC1/SC29/WG11, 6th Meeting, Ericsson, Torino, Jul. 2011, pp. 1-15.
Sjoberg et al., "High-Level Syntax for Bitstream Extraction", JCTVC-G607, WG11 No. m22172, Ericsson, Joint Collaborative Team on Video Coding (JCT-VC) of ITU-T SG16 WP3 and ISO/IEC JTC1/SC29/WG11, 7th Meeting, Geneva, CH, Nov. 21-30, 2011, pp. 1-14.
Sjoberg et al., "JCT-VC AHG Report: Reference Picture Buffering and List Construction (AHG21)", JCTVC-G021, AHG, Joint Collaborative Team on Video Coding (JCT-VC) of ITU-T SG16 WP3 and ISO/IEC JTC1/SC29/WG11 7th Meeting: Geneva, CH, Nov. 21-30, 2011, pp. 1-9.
Tan, TK, "AHG21: Inter Reference Picture Set Prediction Syntax and Semantics", JCTVC-G198r2, NTT DoComo, Inc., Joint Collaborative Team on Video Coding (JCT-VC) of ITU-T SG16 WP3 and ISO/IEC JTC1/SC29/WG11, 7th Meeting, Geneva, CH, Nov. 21-30, 2011, pp. 1-10.
Tan et al., "AHG21: Inter Reference Picture Set Prediction Syntax and Semantics", JCTVC-G198, NTT DoComo, Inc., Joint Collaborative Team on Video Coding (JCT-VC) of ITU-T SG16 WP3 and ISO/IEC JTC1/SC29/WG11, 7th Meeting: Geneva, CH, Nov. 21-30, 2011, pp. 1-7.
Wahadaniah et al., "AHG21: Construction and Modification of Predefined Picture Sets and Reference Picture Lists", JCTVC-G548, Panasonic Corporation, Joint Collaborative Team on Video Coding (JCT-VC) of ITU-T SG16 WP3 and ISO/IEC JTC1/SC29/WG11, 7th Meeting: Geneva, CH, Nov. 21-30, 2011, pp. 1-21.
Wang et al., "Common Conditions for Reference Picture Marking and List Construction Proposals", JCTVC-G1036d03, AHG21, Joint Collaborative Team on Video Coding (JCT-VC) of ITU-T SG16 WP3 and ISO/IEC JTC1/SC29/WG11, 7th Meeting: Geneva, CH, Nov. 21-30, 2011, pp. 1-12.
Zhao et al., "Improvement to Intra RPS Prediction", JCTVC-H0482, Sharp, Joint Collaborative Team on Video Coding (JCT-VC) of ITU-T SG16 WP3 and ISO/IEC JTC1/SC29/WG11, 8th Meeting, San Jose, CA, USA, Feb. 2012, pp. 1-6.

* cited by examiner

Table 23: Layer-2 ILP reference picture list (POC) construction example

| Layer-2 POC | ILP short-term reference picture POC (layer-1) | ILP short-term reference picture POC (layer-0) | IlpRefPicList0 | | | | | IlpRefPicList1 | | | |
|---|---|---|---|---|---|---|---|---|---|---|---|
| | | | IlpRpsStCurr0[1] | IlpRpsStCurr0[0] | IlpRpsStCurr1[1] | IlpRpsStCurr1[0] | IlpRpsLtCurr | IlpRpsStCurr1[1] | IlpRpsStCurr1[0] | IlpRpsStCurr0[1] | IlpRpsStCurr0[0] |
| 0 | 0 * | 0 ** | 0 * | 0 ** | 0 * | 0 ** | - | 0 * | 0 ** | 0 * | 0 ** |
| 8 | 0, 4 * | 0, 4 ** | 0 * | 0 ** | 4 * | 4 ** | - | 4 * | 4 ** | 0 * | 0 ** |
| 4 | 0, 2, 4 * | 0, 2, 4 ** | 0 * | 0 ** | 2, 4 * | 2, 4 ** | - | 2, 4 * | 2, 4 ** | 0 * | 0 ** |
| 2 | 0, 1, 2, 4 * | 0, 1, 2, 4 ** | 0 * | 0 ** | 1,2, 4 * | 1, 2, 4 ** | - | 1,2, 4 * | 1, 2, 4 ** | 0 * | 0 ** |
| 1 | 0, 1, 2, 4 * | 0, 1, 2, 4 ** | 0 * | 0 ** | 1, 2, 4 * | 1, 2, 4 ** | - | 1, 2, 4 * | 1, 2, 4 ** | 0 * | 0 ** |
| 3 | 1, 0, 2, 4 * | 1, 0, 2, 4 ** | 1 * | 1, 0 ** | 2, 4 * | 2, 4 ** | 0 * | 2, 4 * | 2, 4 ** | 1 * | 1, 0 ** |
| 6 | 2, 1, 0, 3, 4 * | 2, 1, 0, 3, 4 ** | 2, 1 * | 2, 1, 0 ** | 3, 4 * | 3, 4 ** | 0 * | 3, 4 * | 3, 4 ** | 2, 1 * | 2, 1, 0 ** |
| 5 | 2, 0, 3, 4 * | 2, 0, 3, 4 ** | 2 * | 2, 0 ** | 3, 4 * | 3, 4 ** | 0 * | 3, 4 * | 3, 4 ** | 2 * | 2, 0 ** |
| 7 | 3, 2, 0, 4 * | 3, 2, 0, 4 ** | 3, 2 * | 3, 2, 0 ** | 4 * | 4 ** | 0 * | 4 * | 4 ** | 3, 2 * | 3, 2, 0 ** |

FIG. 8

Table 27: Layer-2 consolidated reference picture lists (POC) construction example

| Layer-2 POC | Layer-2 RefPicList0 | | | | | | | Layer-2 RefPicList1 | | | | | | |
|---|---|---|---|---|---|---|---|---|---|---|---|---|---|---|
| | RpsStCurr0 [2] * | RpsStCurr0[1] ** | RpsStCurr0 [0] *** | RpsStCurr1 [2] * | RpsStCurr1[1] ** | RpsStCurr1[0] *** | RpsLtCurr * | RpsStCurr1 [2] * | RpsStCurr1[1] ** | RpsStCurr1 [0] *** | RpsStCurr0 [2] * | RpsStCurr0[1] ** | RpsStCurr0 [0] *** |
| 0 | - | 0 | 0 | - | 0 | 0 | - | - | 0 | 0 | - | 0 | 0 |
| 8 | 0 | 0 | 0 | 0 | 4 | 4 | - | 0 | 4 | 4 | 0 | 0 | 0 |
| 4 | 0 | 0 | 0 | 8 | 2, 4 | 2, 4 | - | 8 | 2, 4 | 2, 4 | 0 | 0 | 0 |
| 2 | 0 | 0 | 0 | 4, 8 | 1,2, 4 | 1, 2, 4 | - | 4, 8 | 1,2, 4 | 1, 2, 4 | 0 | 0 | 0 |
| 1 | 0 | 0 | 0 | 2, 4, 8 | 1, 2, 4 | 1, 2, 4 | - | 2, 4, 8 | 1, 2, 4 | 1, 2, 4 | 0 | 0 | 0 |
| 3 | 2, 0 | 1 | 1, 0 | 4, 8 | 2, 4 | 2, 4 | 0 | 4, 8 | 2, 4 | 2, 4 | 2, 0 | 1 | 1, 0 |
| 6 | 4, 2, 0 | 2, 1 | 2, 1, 0 | 8 | 3, 4 | 3, 4 | 0 | 8 | 3, 4 | 3, 4 | 4, 2, 0 | 2, 1 | 2, 1, 0 |
| 5 | 4, 0 | 2 | 2, 0 | 6, 8 | 3, 4 | 3, 4 | 0 | 6, 8 | 3, 4 | 3, 4 | 4, 0 | 2 | 2, 0 |
| 7 | 6, 4, 0 | 3, 2 | 3, 2, 0 | 8 | 4 | 4 | 0 | 8 | 4 | 4 | 6, 4, 0 | 3, 2 | 3, 2, 0 |

FIG. 9

REFERENCE PICTURE SET (RPS) SIGNALING FOR SCALABLE HIGH EFFICIENCY VIDEO CODING (HEVC)

CROSS REFERENCE TO RELATED APPLICATIONS

This application is a continuation application of U.S. Non-Provisional application Ser. No. 13/755,460, filed Jan. 31, 2013, which claims the benefit of U.S. Provisional Application No. 61/593,256, titled "METHOD AND APPARATUS OF SIGNALING REFERENCE PICTURE FOR HEVC SCALABLE CODING", filed on Jan. 31, 2012, and U.S. Provisional Application No. 61/639,776 titled "METHOD AND APPARATUS FOR REFERENCE PICTURE SET PREDICTION SIGNALING FOR VIDEO CODING", filed on Apr. 27, 2012, the contents of both applications being hereby incorporated by reference herein in their respective entirety, for all purposes.

BACKGROUND

Over the past two decades, various digital video compression technologies have been developed and standardized to enable efficient digital video communication, distribution and consumption. Most of the commercially widely deployed standards are developed by ISO/IEC and ITU-T, such as H.261, MPEG-1, MPEG-2, H.263, MPEG-4 (part-2) and H.264 (MPEG-4 part 10). Due to the emergence and maturity of new advanced video compression technologies, a new video coding standard, High Efficiency Video Coding (HEVC, as set forth in JCTVC-F803. WD4: Working Draft 4 of High-Efficiency Video Coding. July 2011), is under joint development by ITU-T Video Coding Experts Group (VCEG) and MPEG. HEVC is expected to be in final standard stage in early 2013.

High Efficiency Video Coding (HEVC) is a video compression standard being developed as a successor of H.264. HEVC has substantially higher compression capability than H.264.

SUMMARY

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments contemplate methods and systems that may provide inter-layer prediction for HEVC scalable coding, temporal reference picture signaling design for HEVC scalable coding, inter-layer reference picture signaling design for HEVC scalable coding, and/or inter-layer reference picture list construction processes.

Embodiments contemplate signaling inter-layer reference pictures in reference picture set(s) (RPS) may be configured to support inter-layer motion compensation prediction (or estimation) for scalable HEVC. In some embodiments, the encoder and/or decoder may predict (e.g. obtain or estimate) higher layer RPS from lower layer RPS in scalable HEVC coding to save syntax overhead bit(s).

Embodiments contemplate that one or more techniques of coding video data may include generating a video encoded bitstream that may include reference picture set (RPS) extensions for inter-layer reference pictures, where the extensions may include or indicate inter-layer delta Picture Order Counts (POCs). Techniques may also include signaling RPS extensions that may include pictures in a lower layer decoder buffer. Alternatively or additionally, techniques may include signaling lower layer reference pictures that may be available in a lower layer decoder picture buffer (DPB), or an aggregate DPB, that may be added to the RPS set of a higher layer. The bitstream may include a signal indicating whether the higher layer RPS may be specified by a lower layer RPS, and the lower layer RPS may be temporal, inter-layer prediction (ILP), or both.

Embodiments contemplate one or more techniques of decoding a video stream. Techniques may include parsing a bitstream that may contain an inter-layer reference picture set (RPS) extension signal. Techniques may also include adding delta POCs of a lower layer reference picture into higher layer RPS set according to one or more extension signals. Techniques may also include decoding video data and receiving a bitstream that may include reference picture set (RPS) extensions for inter-layer reference pictures. Techniques may also include retaining reference pictures in a decoded picture buffer according to the RPS extensions and/or decoding the encoded video using at least some of the retained reference pictures. Techniques may also include receiving signaling in an encoded video bitstream that may include pointers to lower layer reference pictures that may be kept available in a lower layer decoder picture buffer (DPB), or an aggregate DPB. Techniques may also include adding the lower layer reference pictures to an RPS set of a higher layer. In some embodiments, a signal, such as a flag, may be used to indicate that the higher layer RPS may be specified by a lower layer RPS. One or more embodiments may signal that the lower layer RPS may be temporal, or may be an inter-layer prediction, or both.

Embodiments contemplate coding video data by generating a video encoded bitstream that may include reference picture set (RPS) extensions for inter-layer reference pictures, and the extensions may include inter-layer delta Picture Order Counts (POCs). Embodiments may also include signaling that lower layer reference pictures may be available in a lower layer decoder picture buffer (DPB), and/or an aggregate DPB, that may be added to the RPS set of a higher layer. The bitstream may include a signal indicating whether the higher layer RPS may be specified by a lower layer RPS, and the lower layer RPS may be temporal, inter-layer prediction (ILP), or both.

Embodiments contemplate a device for video data coding that may be configured at least in part, to generate a bitstream. The bitstream may include one or more reference picture set (RPS) extensions that may indicate one or more inter-layer reference pictures for one or more decoding picture buffers (DPBs). The one or more DPBs may be respectively associated with one or more video coding layers.

Embodiments contemplate a device for video data coding that may be configured at least in part to generate a bitstream. The bitstream may include one or more reference picture set (RPS) extensions that may indicate one or more inter-layer delta picture order counts (POCs). The one or more POCs may respectively be associated with one or more video coding layers.

Embodiments contemplate a device for video data processing that may be configured at least in part, to generate a first video coding layer. The first video coding layer may include a first reference picture set (RPS). The first RPS may include one or more temporal reference pictures in a first decoding picture buffer (DPB). The device may also be configured to generate a second video coding layer, based at least in part, on the temporal reference pictures of the first RPS. The second video coding layer may include a second RPS. The second RPS may include one or more temporal reference pictures and one or more inter-layer reference pictures in a second DPB. The device may also be configured to generate a third video coding layer, based at least in part, on at least one of the first RPS or the second RPS.

BRIEF DESCRIPTION OF THE DRAWINGS

A more detailed understanding may be had from the following description, given by way of example in conjunction with the accompanying drawings wherein:

FIG. 8 is a tabular illustration of a Layer-2 inter-layer picture (ILP) reference picture list (POC) construction example consistent with embodiments;

FIG. 9 is a tabular illustration of a Layer-2 consolidated reference picture lists (POC) construction example consistent with embodiments;

DETAILED DESCRIPTION OF ILLUSTRATIVE EMBODIMENTS

A detailed description of illustrative embodiments will now be described with reference to the various Figures. Although this description provides a detailed example of possible implementations, it should be noted that the details are intended to be exemplary and in no way limit the scope of the application. As used herein, the articles "a" and "an", absent further qualification or characterization, may be understood to mean "one or more" or "at least one", for example.

Figure 1A:
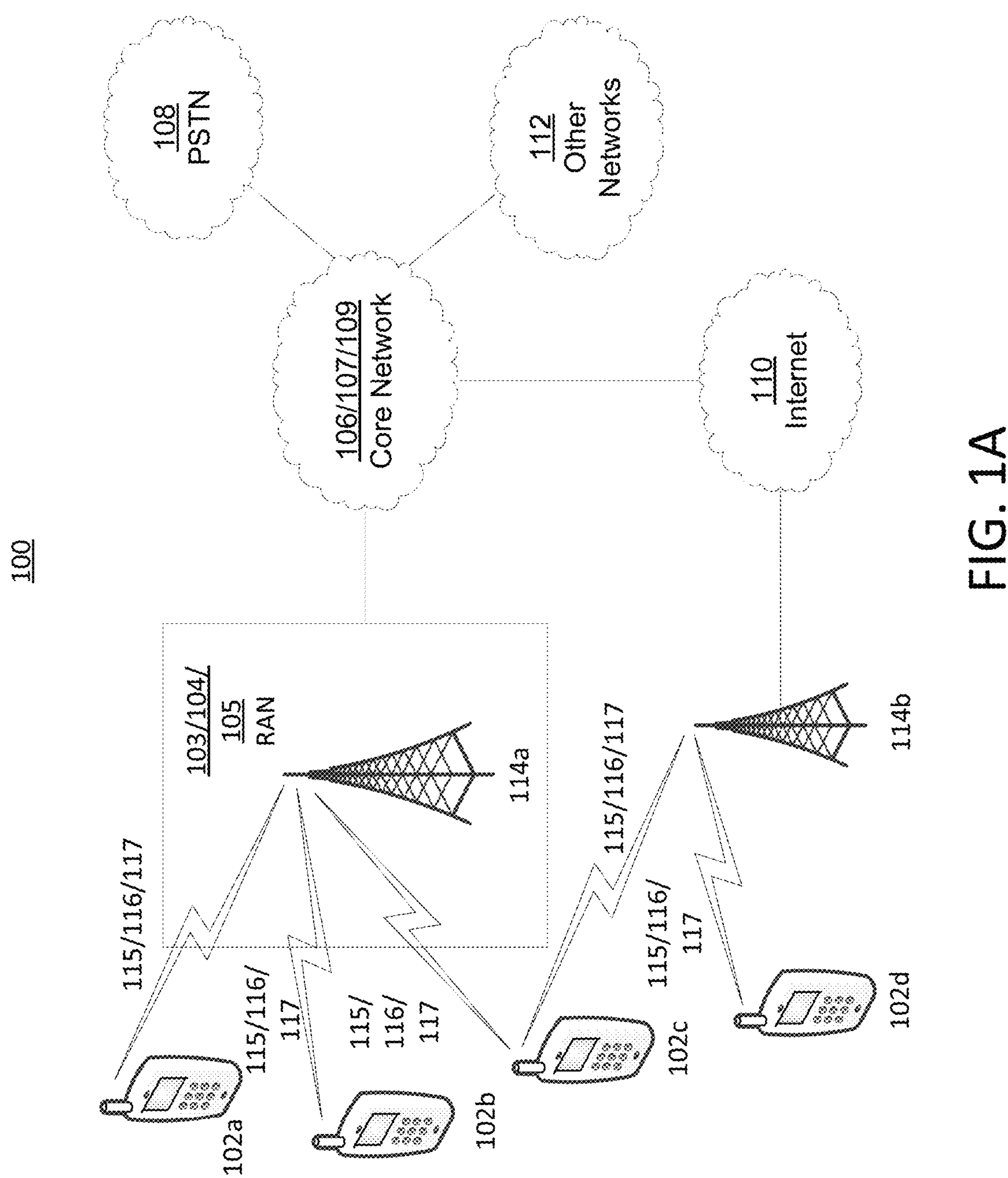
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102*a*, 102*b*, 102*c*, and/or 102*d* (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d* may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114*a* and a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the core network 106/107/109, the Internet 110, and/or the networks 112. By way of example, the base stations 114*a*, 114*b* may be a base transceiver station (BTS), a Node-B, an eNode B, a Home Node B, a Home eNode B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 103/104/105, which may also include other base stations and/or network elements (not shown), such as a base station controller (BSC), a radio network controller (RNC), relay nodes, etc. The base station 114*a* and/or the base station 114*b* may be configured to transmit and/or receive wireless signals within a particular geographic region, which may be referred to as a cell (not shown). The cell may further be divided into cell sectors. For example, the cell associated with the base station 114*a* may be divided into three sectors. Thus, in one embodiment, the base station 114*a* may include three transceivers, i.e., one for each sector of the cell. In another embodiment, the base station 114*a* may employ multiple-input multiple output (MIMO) technology and, therefore, may utilize multiple transceivers for each sector of the cell.

The base stations 114*a*, 114*b* may communicate with one or more of the WTRUs 102*a*, 102*b*, 102*c*, 102*d* over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114*a* and the WTRUs 102*a*, 102*b*, 102*c* may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114*a* and the WTRUs 102*a*, 102*b*, 102*c* may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*b* may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

One or more or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
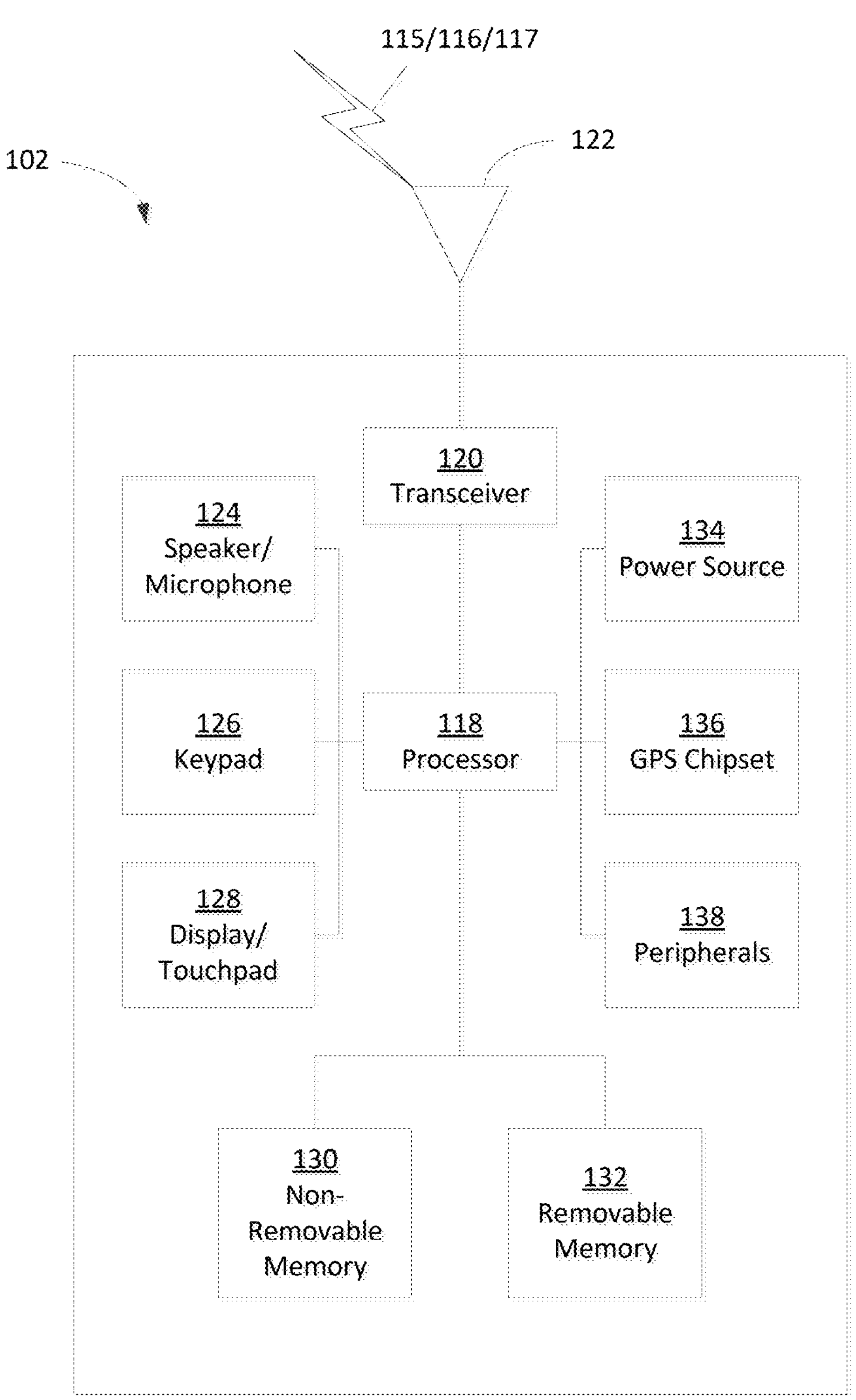
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include one or more or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
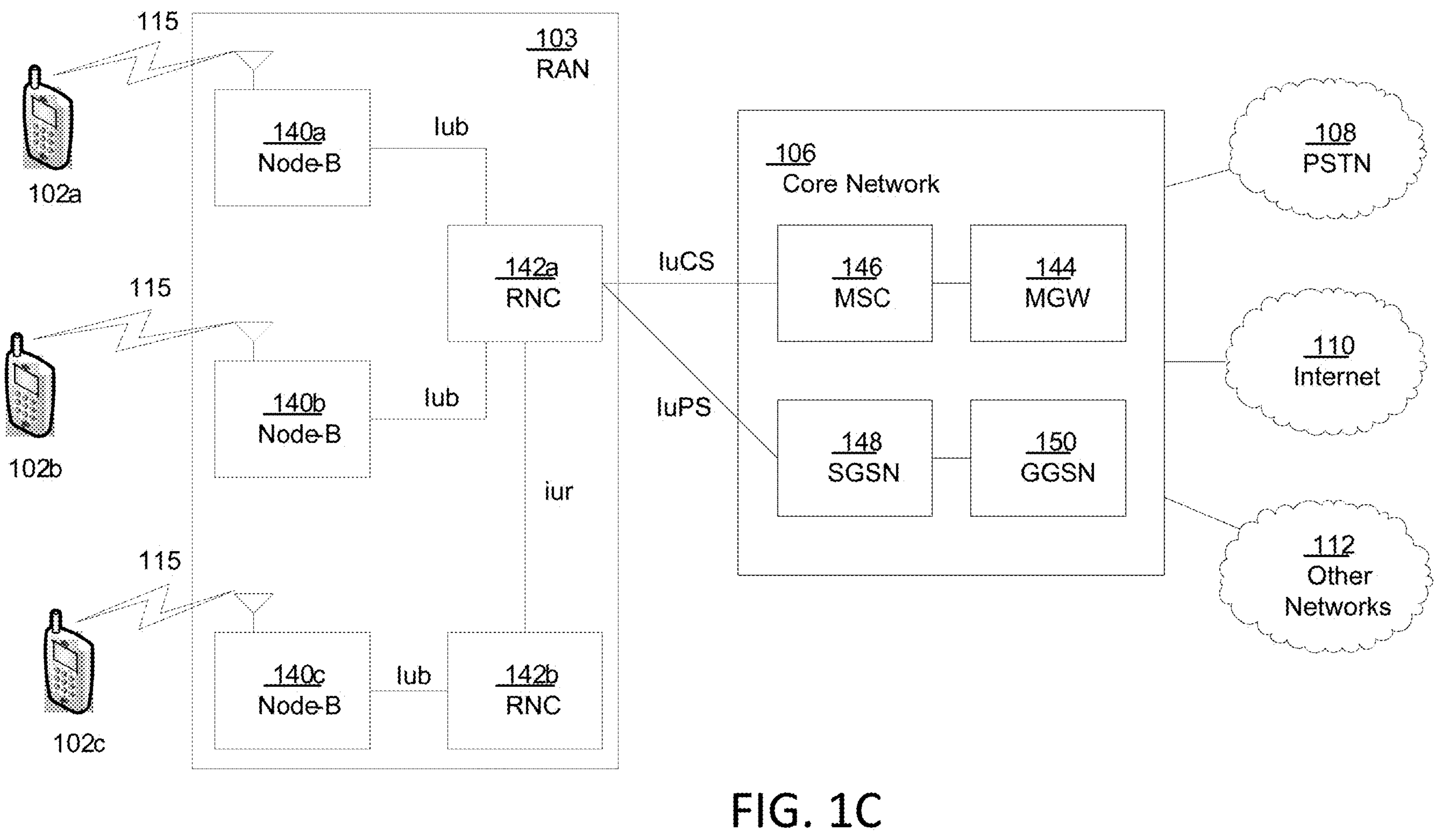
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102*a*, 102*b*, 102*c* over the air interface 115. The RAN 103 may also be in communication with the core network 106. As shown in FIG. 1C, the RAN 103 may include Node-Bs 140*a*, 140*b*, 140*c*, which may each include one or more transceivers for communicating with the WTRUs 102*a*, 102*b*, 102*c* over the air interface 115. The Node-Bs 140*a*, 140*b*, 140*c* may each be associated with a particular cell (not shown) within the RAN 103. The RAN 103 may also include RNCs 142*a*, 142*b*. It will be appreciated that the RAN 103 may include any number of Node-Bs and RNCs while remaining consistent with an embodiment.

As shown in FIG. 1C, the Node-Bs 140*a*, 140*b* may be in communication with the RNC 142*a*. Additionally, the Node-B 140*c* may be in communication with the RNC 142*b*. The Node-Bs 140*a*, 140*b*, 140*c* may communicate with the respective RNCs 142*a*, 142*b* via an Iub interface. The RNCs 142*a*, 142*b* may be in communication with one another via an Iur interface. Each of the RNCs 142*a*, 142*b* may be configured to control the respective Node-Bs 140*a*, 140*b*, 140*c* to which it is connected. In addition, each of the RNCs 142*a*, 142*b* may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142*a* in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices.

The RNC 142*a* in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, 102*c* with access to packet-switched networks, such as the Internet 110, to facilitate communications between and the WTRUs 102*a*, 102*b*, 102*c* and IP-enabled devices.

As noted above, the core network 106 may also be connected to the networks 112, which may include other wired or wireless networks that are owned and/or operated by other service providers.

Figure 1D:
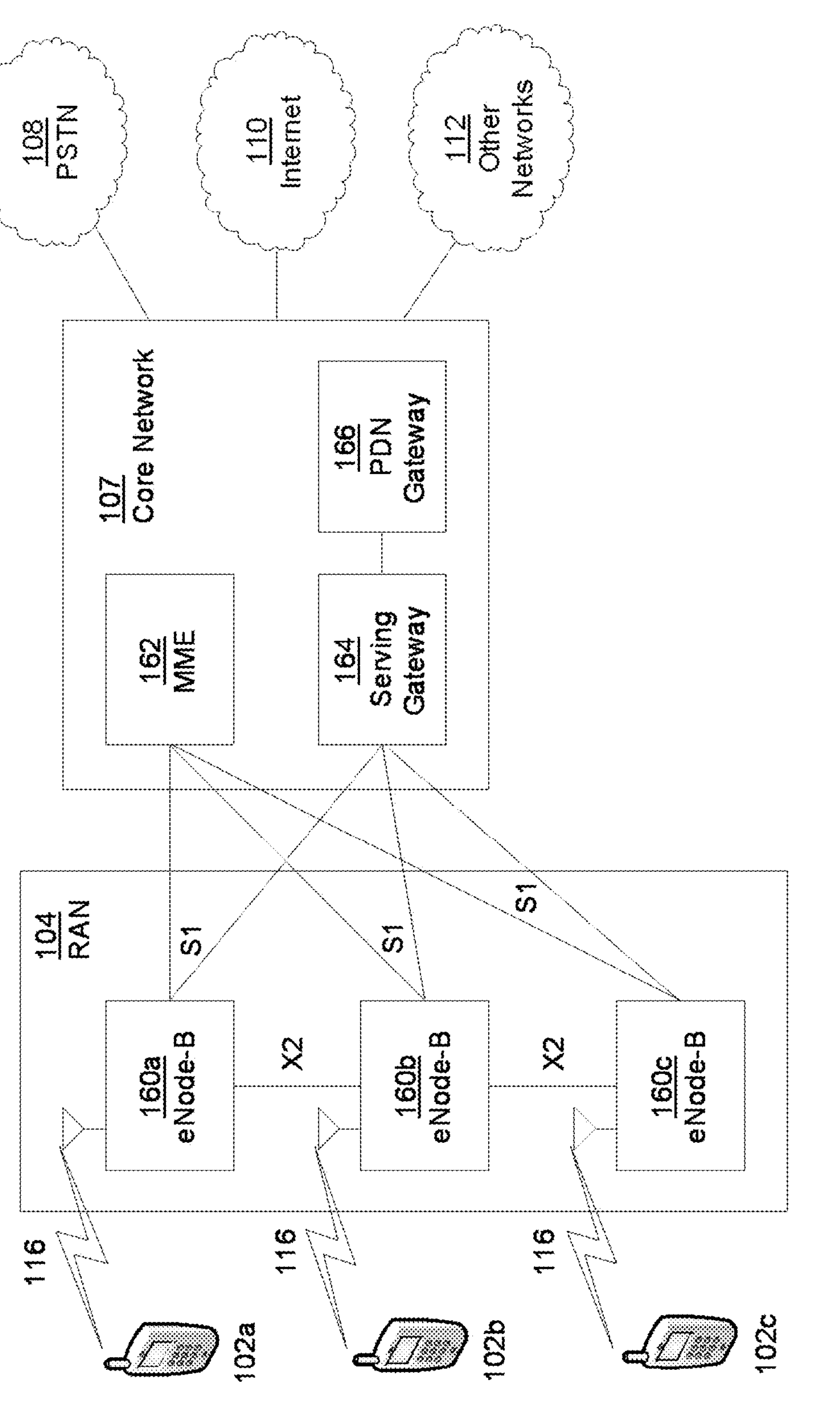
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102*a*, 102*b*, 102*c* over the air interface 116. The RAN 104 may also be in communication with the core network 107.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the uplink and/or downlink, and the like. As shown in FIG. 1D, the eNode-Bs 160*a*, 160*b*, 160*c* may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160*a*, 160*b*, 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*, 160*b*, 160*c* in the RAN 104 via the S1 interface. The serving gateway 164 may generally route and forward user data packets to/from the WTRUs 102*a*, 102*b*, 102*c*. The serving gateway 164 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 164 may also be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 107 may facilitate communications with other networks. For example, the core network 107 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102*a*, 102*b*, 102*c* with access to the networks 112, which may include other wired or wireless networks that are owned and/or operated by other service providers.

Figure 1E:
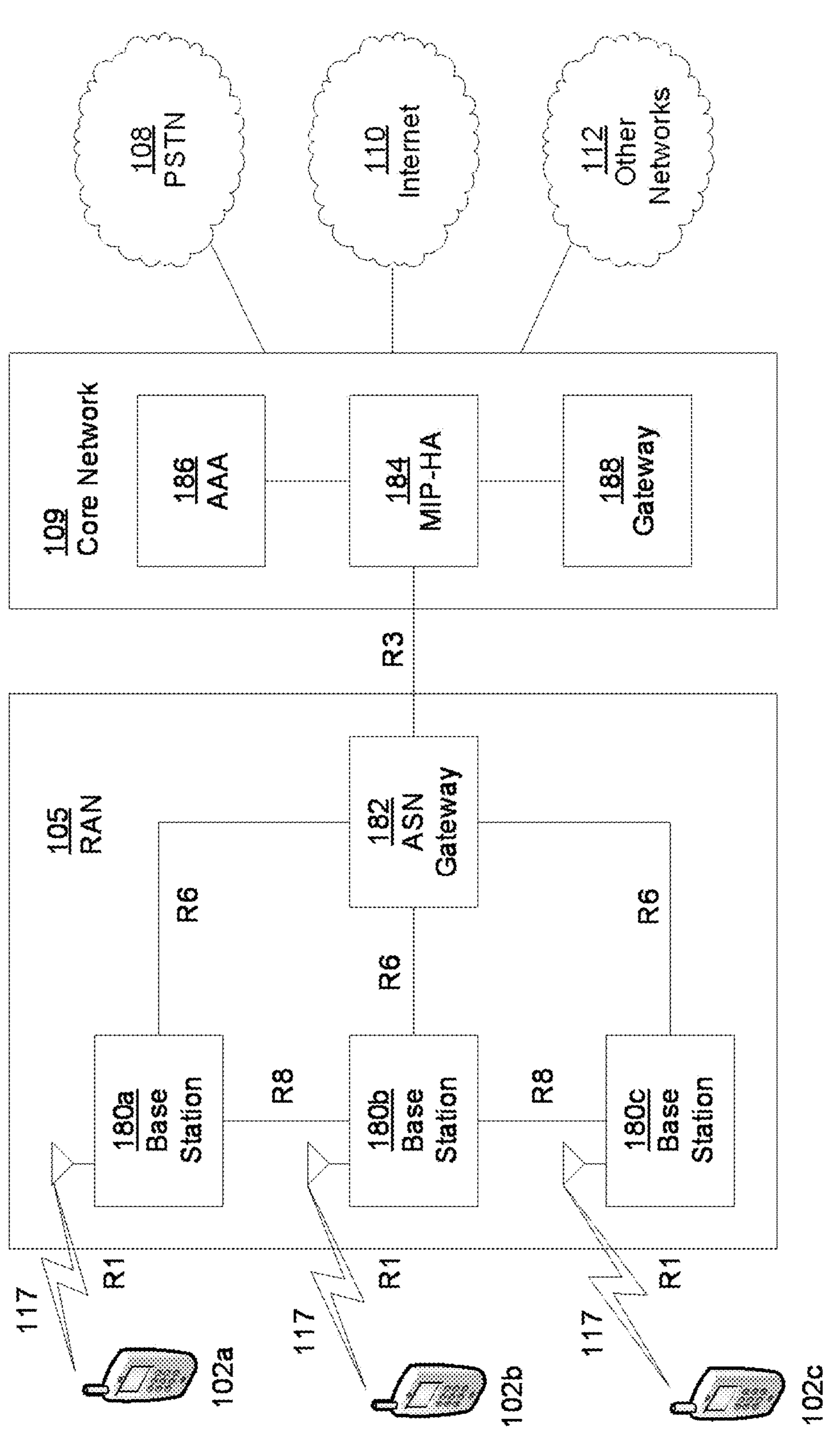
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102*a*, 102*b*, 102*c* over the air interface 117. As will be further discussed below, the communication links between the different functional entities of the WTRUs 102*a*, 102*b*, 102*c*, the RAN 105, and the core network 109 may be defined as reference points.

As shown in FIG. 1E, the RAN 105 may include base stations 180*a*, 180*b*, 180*c*, and an ASN gateway 182, though it will be appreciated that the RAN 105 may include any number of base stations and ASN gateways while remaining consistent with an embodiment. The base stations 180*a*, 180*b*, 180*c* may each be associated with a particular cell (not shown) in the RAN 105 and may each include one or more transceivers for communicating with the WTRUs 102*a*, 102*b*, 102*c* over the air interface 117. In one embodiment, the base stations 180*a*, 180*b*, 180*c* may implement MIMO technology. Thus, the base station 180*a*, for example, may use multiple antennas to transmit wireless signals to, and receive wireless signals from, the WTRU 102*a*. The base stations 180*a*, 180*b*, 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, 102*c* may establish a logical interface (not shown) with the core network 109. The logical interface between the WTRUs 102*a*, 102*b*, 102*c* and the core network 109 may be defined as an R2 reference point, which may be used for authentication, authorization, IP host configuration management, and/or mobility management.

The communication link between each of the base stations 180*a*, 180*b*, 180*c* may be defined as an R8 reference point that includes protocols for facilitating WTRU handovers and the transfer of data between base stations. The communication link between the base stations 180*a*, 180*b*, 180*c* and the ASN gateway 182 may be defined as an R6 reference point. The R6 reference point may include protocols for facilitating mobility management based on mobility events associated with each of the WTRUs 102*a*, 102*b*, 102*c*.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102*a*, 102*b*, 102*c* to roam between different ASNs and/or different core networks. The MIP-HA 184 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 186 may be responsible for user authentication and for supporting user services. The gateway 188 may facilitate interworking with other networks. For example, the gateway 188 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 188 may provide the WTRUs 102*a*, 102*b*, 102*c* with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102*a*, 102*b*, 102*c* between the RAN 105 and the other ASNs. The communication link between the core network 109 and the other core networks may be defined as an R5 reference, which may include protocols for facilitating interworking between home core networks and visited core networks.

Embodiments recognize that perhaps compared to digital video services over satellite, cable, and/or terrestrial transmission channels, more and more other video applications, such as video chat, mobile video, and streaming video, may be employed in environments that may be heterogeneous on the client side as well as the network side. The three screens of, for example, a smart phone, tablet, and TV, may dominate the client side, where the video could be transmitted across the Internet, the mobile network, and/or a combination of both. To improve the user experience and/or the video quality of service, scalable video coding may be used. Scalable video coding encodes the signal once at a high (e.g. perhaps "highest" resolution), and/or may enable decoding from subsets of the streams, perhaps depending on the specific rate and resolution required by certain applications that may be supported by the client devices, among other factors. Embodiments recognize that the international video standards MPEG-2 Video, H.263, MPEG4 Visual and H.264 have tools and/or profiles to support scalability modes.

Figure 2:
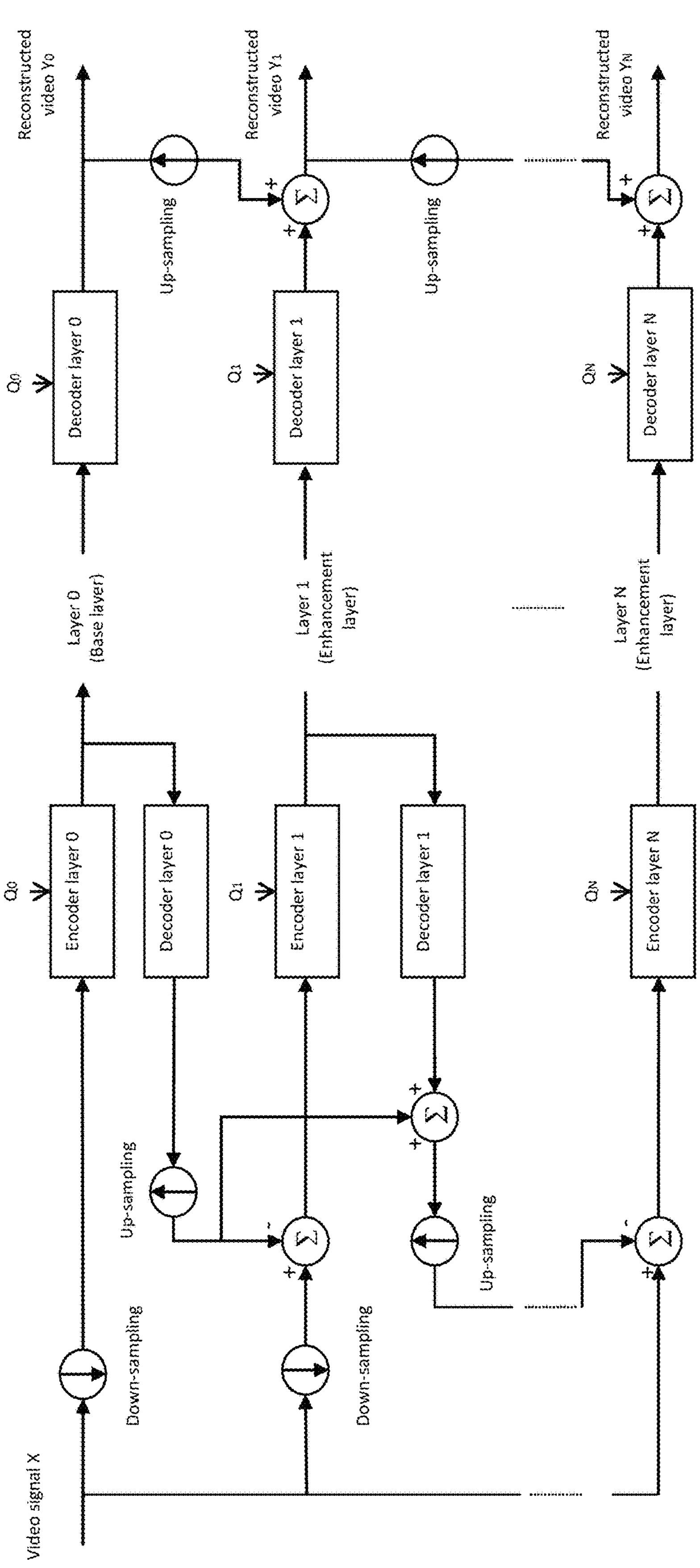
FIG. 2 illustrates a block diagram illustrating an example of multi-layer video encoder that may implement exemplary Reference Picture Set signaling and prediction techniques consistent with embodiments.

FIG. 2 depicts an exemplary block diagram of a generic block-based hybrid scalable video encoding system. The spatial/temporal signal resolution to be represented by the layer-0 (base layer) may be first generated by down-sampling the input video signal. In the subsequent encoding stage, an appropriate setting of the quantizer (Q0) may lead to a certain quality level of the base information (e.g. video signal) The base-layer reconstruction Y0 may be an approximation of one or more, or all, the higher layer resolution levels and can be utilized in the encoding and/or decoding of the subsequent layers. The up-sampling unit may perform up-sampling of the base layer reconstruction signal to match the resolution at one or more, or any, of the higher layers. Down-sampling and up-sampling may be performed throughout one or more, or all, layers (e.g. 0, 1, 2, . . . N), whereas the down sampling and/or up sampling ratios may be different, perhaps depending on the relative dimension of the video signals at different layers, among other factors. For example, for a terminal device that may have a decoding capability of layer-n (0<=n<=N), the subset of the bitstream from layer-0 to layer-n (or in some embodiments, perhaps only such a subset) may be transmitted to that terminal device. The sub-stream of higher layers (e.g. n+1, . . . N) can be discarded, perhaps without transmission, to save bandwidth, among other reasons. Perhaps when the video signals represented by two layers, n1 and n2, have the same or similar spatial resolution, corresponding down-sampling and up-sampling operations may be by-passed, for example.

Figure 3:
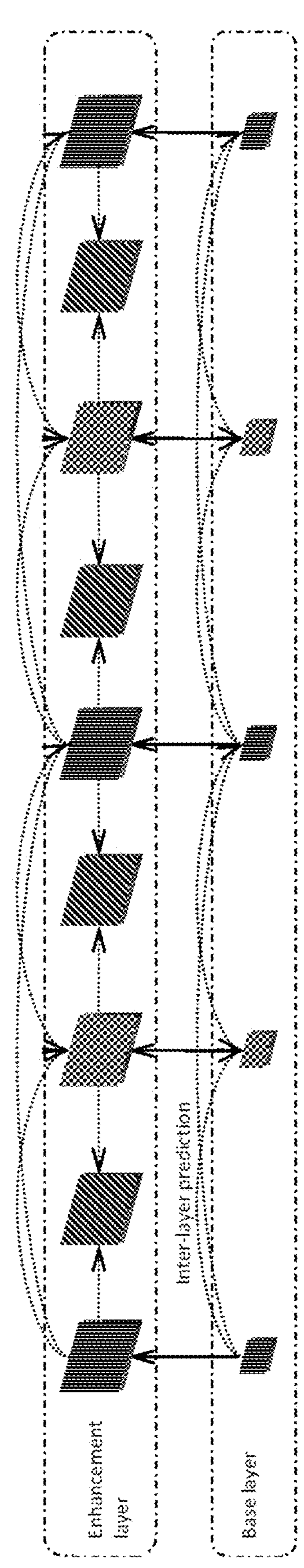
FIG. 3 illustrates an exemplary scalable structure with an additional inter-layer prediction for scalable video coding (SVC) spatial scalable coding consistent with embodiments.

Embodiments recognize that Scalable Video Coding (SVC) is an extension of the H.264 that may enable the transmission and decoding of partial bitstreams to provide video services with lower temporal or spatial resolutions or reduced fidelity while retaining a reconstruction quality that may be high relative to the rate of the partial bitstreams. FIG. 3 illustrates an exemplary two layer SVC inter-layer prediction mechanism to improve scalable coding efficiency. In some embodiments, the same mechanism can be applied to multiple layers SVC coding structure as well. In FIG. 3, a base layer and an enhancement layer may represent two adjacent spatial scalable layers with different resolutions. Within one or more, or each, single layer, the motion-compensated prediction and an intra-prediction may be employed as a standard H.264 encoder (represented by dotted line in the figure). The inter-layer prediction may utilize as much base layer information as possible, such as but not limited to spatial texture, motion vector predictors, reference picture indexes, and residual signals, to improve rate-distortion efficiency of the enhancement layer. In some embodiments, SVC may not require a reference picture from lower layers to be fully reconstructed.

Embodiments contemplate systems and methods that may include signaling reference pictures for temporal prediction (or estimation) and/or inter-layer prediction (or estimation) to support multiple layer scalable enhancement extension of HEVC (scalable enhancement extension of HEVC may be referred to as Scalable HEVC Video Coding (SHVC), which may be referred to herein as scalable HEVC for explanation but not limitation). Some embodiments may be compatible with single layer HEVC reference picture buffering and/or list construction procedures, and may also support inter-layer prediction for the multiple layer scalable coding. In some embodiments, the signaling may be compatible with single layer HEVC reference picture buffering and/or list construction and/or may support inter-layer temporal reference picture set prediction (e.g. to save bandwidth) and/or support the inter-layer picture prediction between the enhancement layer and/or lower reference layers, for example.

Figure 4:
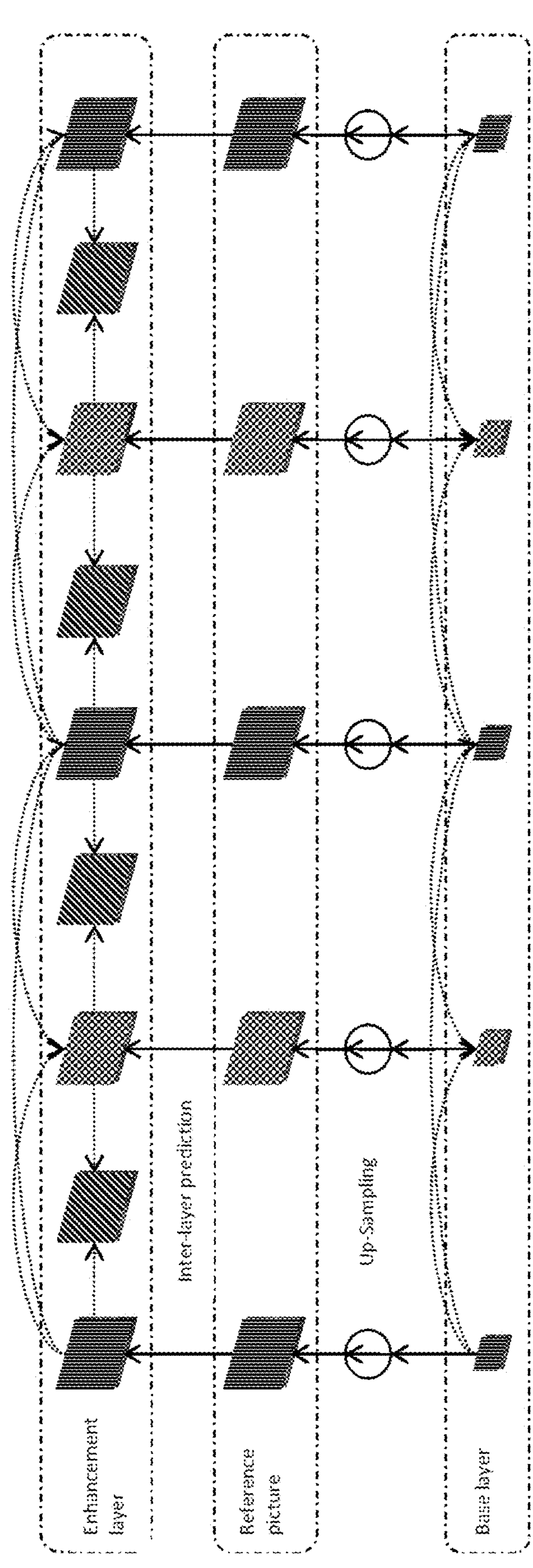
FIG. 4 illustrates an exemplary inter-layer prediction structure consistent with embodiments.

Embodiments contemplate that inter-layer prediction methodology may be employed in HEVC scalable coding extension in order to improve the efficiency, among other reasons. FIG. 4 shows an exemplary inter-layer prediction structure contemplated for HEVC scalable coding. The prediction (or estimation) of an enhancement layer may be either formed by motion-compensated prediction from the reconstructed base layer signal (e.g. after up-sampling if the spatial resolutions between the two layers are different), or from temporal reference pictures within the current enhancement layer, by averaging such a base layer reconstruction signal with a temporal prediction signal, and/or from a combination of more than one prediction source. In some embodiments, perhaps compared to SVC (such as described with reference to FIG. 3), this approach may require at least some reconstruction, or perhaps full reconstruction, of the lower layer pictures. In some embodiments, the same mechanism can be deployed for multiple layer (e.g. more than 2 layers) HEVC scalable coding structure as well.

Embodiments recognize that HEVC signaling for reference picture buffering and list construction to support temporal motion-compensation prediction within a single layer. Embodiments also recognize the simplification of reference picture buffering management by removing frame_num from the slice header and memory management control operation (MMCO) commands adopted by H.264/SVC. Embodiments further recognize the added signaling of reference picture set (RPS) in a Parameter Set syntax and slice header, where one or more, or each, set may contain a number of reference pictures used by a current picture or may be saved for future pictures' prediction (or estimation), for example.

Table 1 illustrates an exemplary reference picture set syntax. One or more, or each, reference picture may be identified through delta POC (picture order count), which may be the distance between the current picture and the reference picture. For example, a POC for a first picture may be 0, the POC for a second picture may be 1, and a POC for a third picture may be 2—where the distance between the first picture and the third picture may be 2. Also by way of example, assume that the POC of the current picture is 10 and that the encoder wants to include two reference pictures with POC={9, 7}. The encoder may signal num_negative_pics=2 and num_positive_pics=0. The value of delta_poc_s0_minus1[0] is 0 since POC 10 minus POC 9 is 1. And delta_poc_s0_minus1[1] becomes 1 since POC 9 minus POC 7 is 2.

TABLE 1

Example reference picture set syntax

| | Descriptor |
|---|---|
| ref_pic_set( idx) { | |
| num_negative_pics | ue(v) |
| num_positive_pics | ue(v) |
| for( i = 0; i < num_negative_pics; i++ ) { | |
| delta_poc_s0_minus1[ i ] | ue(v) |
| used_by_curr_pic_sO_flag[ i ] | u(1) |
| } | |
| for( i = 0; i < num_positive_pics; i++ ) { | |
| delta_poc_s1_minus1[ i ] | ue(v) |
| used_by_curr_pic_s1_flag[ i ] | u(1) |
| } | |
| } | |

Figure 5:
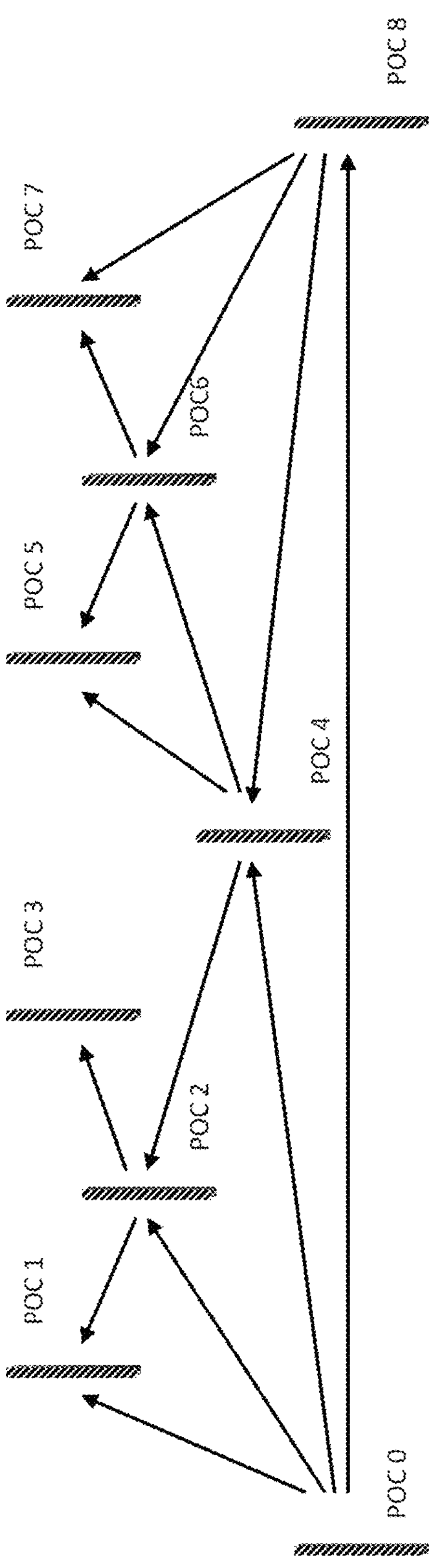
FIG. 5 illustrates an exemplary dyadic and nested temporal scalable coding structure consistent with embodiments.

FIG. 5 is an example of dyadic and nested temporal scalable coding structure. In some embodiments, perhaps for simplification, delta POC may be used for the reference picture set configuration defined in Table 2 (e.g. from RPS 0 to RPS 10). One or more, or each, picture can have at least one reference picture in RefPicList0 and RefPicList1.

TABLE 2

Exemplary reference Picture Set (RPS)

| index | Delta POC |
|---|---|
| 0 | (−8, −10, −12, −16) |
| 1 | (−4, −6, 4) |
| 2 | (−2, −4, 2, 6) |
| 3 | (−1, 1, 3, 7) |
| 4 | (−1, −3, 1, 5) |
| 5 | (−2, −4, −6, 2) |
| 6 | (−1, −5, 1, 3) |
| 7 | (−1, −3, −7, 1) |
| 8 | (−8) |
| 9 | (−4, 4) |
| 10 | (−2, 2, 6) |

Table 3 shows an exemplary reference picture set index that may be used by one or more, or each, coding picture and the corresponding reference picture available in decoded picture buffer (DPB). In some embodiments, one or more, or each, reference picture list (RefPicList0/1) may select one or multiple reference pictures from DPB, perhaps depending on the number of active reference pictures setting (num_ref_idx_l0_default_active_minus1, num_ref_idx_l1_default_active_minus1) in a parameter set and/or a slice header, among other factors.

TABLE 3

Exemplary reference picture list of temporal scalability with 1 reference picture per list

| Current picture (POC) | RPS index | Reference pictures in DPB (POC) | RefPicList0 | RefPicList1 | Other pictures marked as "used for reference" |
|---|---|---|---|---|---|
| 0 | — | — | — | — | |
| 8 | 8 | 0 | 0 | 0 | |
| 4 | 9 | 0, 8 | 0 | 8 | |
| 2 | 10 | 0, 4, 8 | 0 | 4 | 8 |
| 1 | 3 | 0, 2, 4, 8 | 0 | 2 | 4, 8 |
| 3 | 4 | 2, 0, 4, 8 | 2 | 4 | 8 |
| 6 | 5 | 4, 2, 0, 8 | 4 | 8 | — |

TABLE 3-continued

| Current picture (POC) | RPS index | Reference pictures in DPB (POC) | RefPicList0 | RefPicList1 | Other pictures marked as "used for reference" |
|---|---|---|---|---|---|
| 5 | 6 | 4, 0, 6, 8 | 4 | 6 | 8 |
| 7 | 7 | 6, 4, 0, 8 | 6 | 8 | — |

Figure 6:
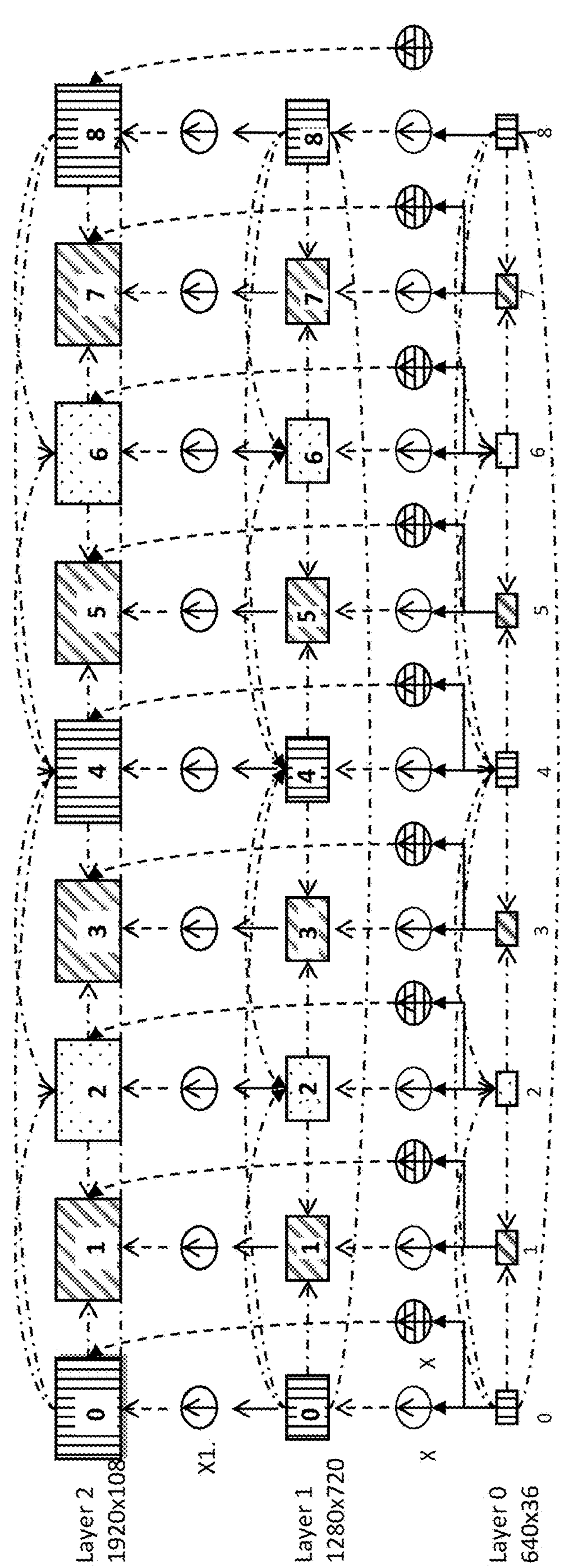
FIG. 6 illustrates an HEVC spatial scalable coding structure example with an inter-layer prediction consistent with embodiments.
Figure 7:
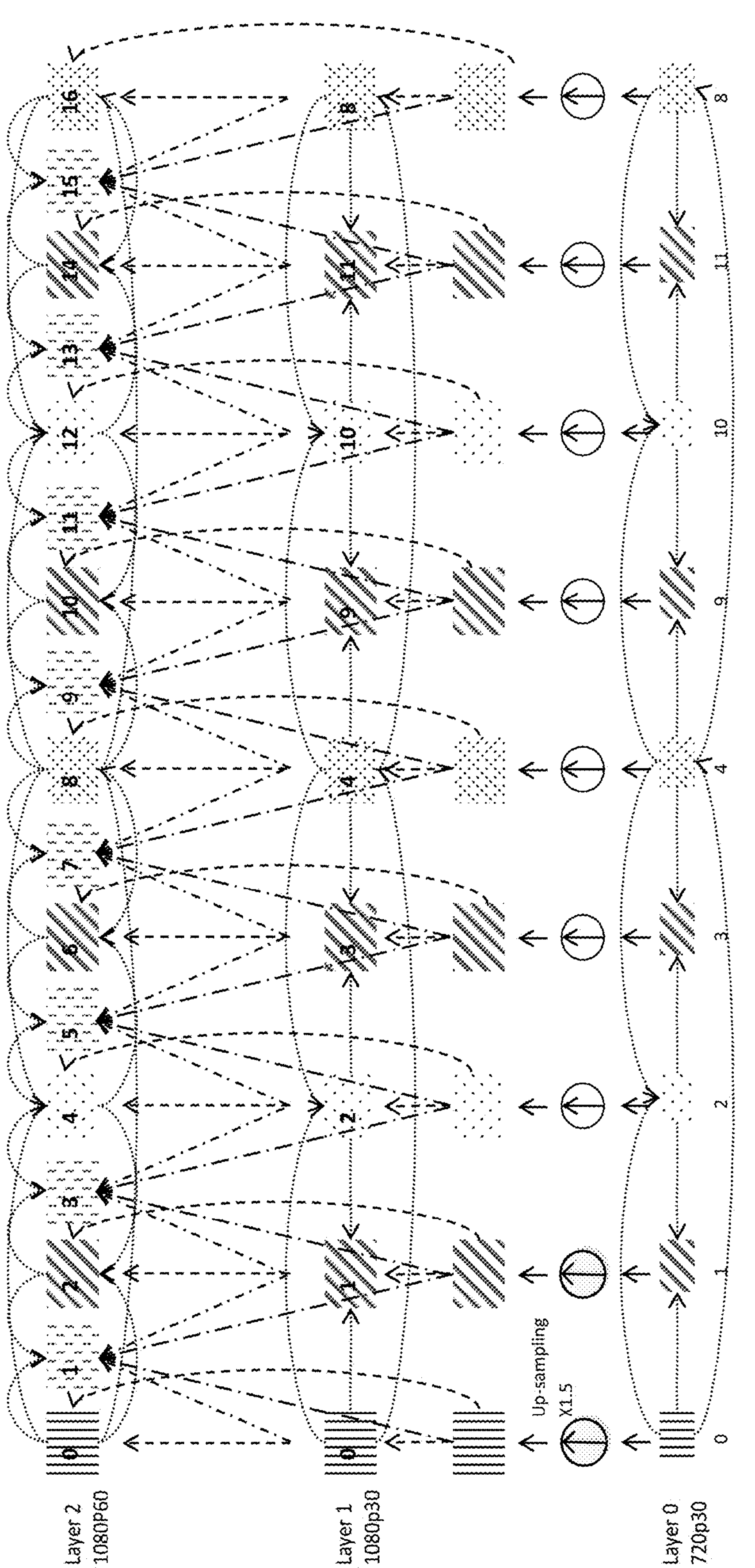
FIG. 7 illustrates an exemplary HEVC spatial/temporal combined scalable coding structure with inter-layer prediction consistent with embodiments.

Exemplary reference picture list of temporal scalability with 1 reference picture per list Embodiments contemplate one or more Inter-layer prediction techniques for HEVC scalable coding. Embodiments recognize one or more scalable scenarios for the scalable enhancement of HEVC, such as spatial scalability, SNR or quality scalability, and/or temporal scalability. FIG. 6 and FIG. 7 show two exemplary inter-layer prediction coding structures for spatial scalability and combined temporal/spatial scalability. FIG. 6 has 3 spatial scalable layers and one or more, or each, layer may have a different spatial resolution. Base layer (layer 0) may have the lowest spatial resolution, and layer 2 may have the highest spatial resolution. The reconstructed picture from the lower layer may be up-sampled to match enhancement layer's spatial resolution as reference picture for inter-layer prediction, for example.

Table 4 illustrates an example of temporal reference pictures buffered in DPB without inter-layer prediction. In some embodiments, the RPS configuration may be the same, or similar, to that as illustrated in Table 2. In this example, one or more, or each layer, may have the same frame rate (e.g. temporal resolution) and may use the same GOP (Group of Picture) structure of size 8. In some embodiments, the reference pictures buffered in DPB may be the same or similar for one or more, or each, layer.

TABLE 4

Temporal reference pictures list example 1 (1 reference picture per list)

| Current picture (POC) | RPS index | Reference picture set | Reference pictures in DPB (POC) | RefPicList0 | RefPicList1 |
|---|---|---|---|---|---|
| 0 | — | — | — | — | — |
| 8 | 8 | (−8) | 0 | 0 | 0 |
| 4 | 9 | (−4, 4) | 0, 8 | 0 | 8 |
| 2 | 10 | (−2, 2, 6) | 0, 4, 8 | 0 | 4 |
| 1 | 3 | (−1, 1, 3, 7) | 0, 2, 4, 8 | 0 | 2 |
| 3 | 4 | (−1, −3, 1, 5) | 2, 0, 4, 8 | 2 | 4 |
| 6 | 5 | (−2, −4, −6, 2) | 4, 2, 0, 8 | 4 | 8 |
| 5 | 6 | (−1, −5, 1, 3) | 4, 0, 6, 8 | 4 | 6 |
| 7 | 7 | (−1, −3, −7, 1) | 6, 4, 0, 8 | 6 | 8 |

Table 5 is an exemplary inter-layer prediction reference picture and inter-layer prediction reference picture lists (IlpRefPicList0/1) for the scalable coding structure shown in FIG. 6. In some embodiments, perhaps because enhancement layer may be able to use reconstructed and/or upscaled reference pictures from a lower reference layer, the reference pictures may be more complicated than the one in Table 4. In such scenarios, layer-2 can be predicted from up-scaled reconstructed reference pictures from either, or both, of layer-0 and layer-1. In some embodiments, a particular lower layer may be specified to be the reference layer for inter-layer prediction. For example, layer-2's picture can be predicted (or estimated) from layer-1 (or in some embodiments, perhaps restricted to be predicated only from layer-1) so as to reduce the complexity, among other reasons.

TABLE 5

Inter-layer prediction reference pictures and lists example 1 (1 reference picture per reference layer per list)

| Layer ID | Current picture (POC) | Inter-layer Reference pictures in DPB (LayerID(POC)) | IlpRefPicList0 (POC) | | | IlpRefPicList1 (POC) | | |
|---|---|---|---|---|---|---|---|---|
| | | | Layer2 | Layer1 | Layer0 | Layer2 | Layer1 | Layer0 |
| 0 | 0 | — | — | — | — | — | — | — |
| 1 | 0 | — | — | — | 0 | — | — | 0 |
| 2 | 0 | — | — | 0 | 0 | — | 0 | 0 |

TABLE 5-continued

Inter-layer prediction reference pictures and lists example 1 (1 reference picture per reference layer per list)

| Layer ID | Current picture (POC) | Inter-layer Reference pictures in DPB (LayerID(POC)) | IlpRefPicList0 (POC) Layer2 | IlpRefPicList0 (POC) Layer1 | IlpRefPicList0 (POC) Layer0 | IlpRefPicList1 (POC) Layer2 | IlpRefPicList1 (POC) Layer1 | IlpRefPicList1 (POC) Layer0 |
|---|---|---|---|---|---|---|---|---|
| 0 | 8 | 0(0) | — | — | 0 | — | — | 0 |
| 1 | 8 | 0(0, 8), 1(0) | — | 0 | 0 | — | 0 | 8 |
| 2 | 8 | 0(0, 8), 1(0, 8), 2(0) | — | 0 | 0 | — | 8 | 8 |
| 0 | 4 | 0(0, 8) | — | — | 0 | — | — | 8 |
| 1 | 4 | 0(0, 8, 4), 1(0, 8) | — | 0 | 0 | — | 8 | 4 |
| 2 | 4 | 0(0, 8, 4), 1(0, 8, 4), 2(0, 8) | 0 | 0 | 0 | 8 | 4 | 4 |
| 0 | 2 | 0(0, 4, 8) | — | — | 0 | — | — | 4 |
| 1 | 2 | 0(0, 4, 8, 2), 1(0, 4, 8) | — | 0 | 0 | — | 4 | 2 |
| 2 | 2 | 0(0, 4, 8, 2), 1(0, 4, 8, 2), 2(0, 4, 8) | 0 | 0 | 0 | 4 | 2 | 2 |
| 0 | 1 | 0(0, 2, 4, 8) | — | — | 0 | — | — | 2 |
| 1 | 1 | 0(0, 2, 4, 8, 1), 1(0, 2, 4, 8) | — | 0 | 0 | — | 2 | 1 |
| 2 | 1 | 0(0, 2, 4, 8, 1), 1(0, 2, 4, 8, 1), 2(0, 2, 4, 8) | 0 | 0 | 0 | 2 | 1 | 1 |
| 0 | 3 | 0(2, 0, 4, 8) | — | — | 2 | — | — | 4 |
| 1 | 3 | 0(2, 0, 4, 8, 3), 1(2, 0, 4, 8) | — | 2 | 2 | — | 4 | 3 |
| 2 | 3 | 0(2, 0, 4, 8, 3), 1(2, 0, 4, 8, 3), 2(2, 0, 4, 8) | 2 | 2 | 2 | 4 | 3 | 3 |
| 0 | 6 | 0(4, 2, 0, 8) | — | — | 4 | — | — | 8 |
| 1 | 6 | 0(4, 2, 0, 8, 6), 1(4, 2, 0, 8) | — | 4 | 4 | — | 8 | 6 |
| 2 | 6 | 0(4, 2, 0, 8, 6), 1(4, 2, 0, 8, 6), 2(4, 2, 0, 8) | 4 | 4 | 4 | 8 | 6 | 6 |
| 0 | 5 | 0(4, 0, 6, 8) | — | — | 4 | — | — | 6 |
| 1 | 5 | 0(4, 0, 6, 8, 5), 1(4, 0, 6, 8) | — | 4 | 4 | — | 6 | 5 |
| 2 | 5 | 0(4, 0, 6, 8, 5), 1(4, 0, 6, 8, 5), 2(4, 0, 6, 8) | 4 | 5 | 4 | 6 | 5 | 5 |
| 0 | 7 | 0(6, 4, 0, 8) | — | — | 6 | — | — | 8 |
| 1 | 7 | 0(6, 4, 0, 8, 7), 1(6, 4, 0, 8) | — | 6 | 7 | — | 8 | 7 |
| 2 | 7 | 0(6, 4, 0, 8, 7), 1(6, 4, 0, 8, 7), 2(6, 4, 0, 8) | 6 | 7 | 6 | 8 | 7 | 7 |

FIG. 7 is an example of combined spatial and temporal scalable structure. It has 3 layers, the base layer (layer-0) may have low spatial resolution at a low frame rate (e.g. 720p30), layer-1 may have a high spatial resolution and the same frame rate as the base layer (e.g. 1080P30), layer-2 may have the same high spatial resolution as layer-1, but a higher frame rate (e.g. 1080p60). The reconstructed pictures of layer-0 can be up-sampled as reference picture for layer-1 and/or layer-2 inter-layer prediction (or estimation). Since the spatial resolution of layer-1 and layer-2 may be the same, among other reasons, the reconstructed picture of layer-1 may be used as reference picture for layer-2's inter-layer prediction (or estimation). One or more, or each, picture of an enhancement layer (layer-1 and/or layer-2) can perform motion compensated prediction temporally within the same layer, and/or from the reference pictures of lower reference layers, perhaps as long as the reference pictures are available in the DPB, or use a weighted average of the two types of reference signals (e.g. same layer and inter-layer).

Layer-2 may use the same reference picture sets configurations defined in Table 2, while layer-0 and layer-1 may use the different reference picture sets as defined in Table 6. Exemplary temporal reference pictures list of one or more, or each, single layer without inter-layer prediction is shown in Table 6.

TABLE 6

Temporal reference pictures list example 2 (1 reference picture per list)

| Layer | Current picture (POC) | RPS index | Reference picture set (deltaPOC) | Reference pictures in DPB (POC) | RefPicList0 (POC) | RefPicList1 (POC) |
|---|---|---|---|---|---|---|
| 0 | 0 | — | — | — | — | — |
| 0 | 4 | 0 | (−4) | 0 | 0 | 0 |
| 0 | 2 | 1 | (−2, 2) | 0, 4 | 0 | 4 |
| 0 | 1 | 2 | (−1, 1, 3) | 0, 2, 4 | 0 | 2 |
| 0 | 3 | 3 | (−1, −2, −3, 1) | 2, 1, 0, 4 | 2 | 4 |
| 0 | 8 | 0 | (−4) | 4 | 4 | 4 |
| 0 | 6 | 1 | (−2, 2) | 4, 8 | 4 | 8 |
| 0 | 5 | 2 | (−1, 1, 3) | 4, 6, 8 | 4 | 6 |
| 0 | 7 | 3 | (−1, −2, −3, 1) | 6, 5, 4, 8 | 6 | 8 |
| 1 | 0 | | — | — | — | — |
| 1 | 4 | 0 | (−4) | 0 | 0 | 0 |
| 1 | 2 | 1 | (−2, 2) | 0, 4 | 0 | 4 |
| 1 | 1 | 2 | (−1, 1, 3) | 0, 2, 4 | 0 | 2 |
| 1 | 3 | 3 | (−1, −2, −3, 1) | 2, 1, 0, 4 | 2 | 4 |
| 1 | 8 | 0 | (−4) | 4 | 4 | 4 |
| 1 | 6 | 1 | (−2, 2) | 4, 8 | 4 | 8 |
| 1 | 5 | 2 | (−1, 1, 3) | 4, 6, 8 | 4 | 6 |
| 1 | 7 | 3 | (−1, −2, −3, 1) | 6, 5, 4, 8 | 6 | 8 |
| 2 | 0 | — | — | — | — | — |
| 2 | 8 | 8 | (−8) | 0 | 0 | 0 |

TABLE 6-continued

Temporal reference pictures list example 2 (1 reference picture per list)

| Layer | Current picture (POC) | RPS index | Reference picture set (deltaPOC) | Reference pictures in DPB (POC) | RefPicList0 (POC) | RefPicList1 (POC) |
|---|---|---|---|---|---|---|
| 2 | 4 | 9 | (−4, 4) | 0, 8 | 0 | 8 |
| 2 | 2 | 10 | (−2, 2, 6) | 0, 4, 8 | 0 | 4 |
| 2 | 1 | 3 | (−1, 1, 3, 7) | 0, 2, 4, 8 | 0 | 2 |
| 2 | 3 | 4 | (−1, −3, 1, 5) | 2, 0, 4, 8 | 2 | 4 |
| 2 | 6 | 5 | (−2, −4, −6, 2) | 4, 2, 0, 8 | 4 | 8 |
| 2 | 5 | 6 | (−1, −5, 1, 3) | 4, 0, 6, 8 | 4 | 6 |
| 2 | 7 | 7 | (−1, −3, −7, 1) | 6, 4, 0, 8 | 6 | 8 |
| 2 | 16 | 0 | (−8, −10, −12, −16) | 8, 6, 4, 0 | 8 | 8 |
| 2 | 12 | 1 | (−4, −6, 4) | 8, 6, 16 | 8 | 16 |
| 2 | 10 | 2 | (−2, −4, 2, 6) | 8, 6, 12, 16 | 8 | 12 |
| 2 | 9 | 3 | (−1, 1, 3, 7) | 8, 10, 12, 16 | 8 | 10 |
| 2 | 11 | 4 | (−1, −3, 1, 5) | 10, 8, 12, 16 | 10 | 12 |
| 2 | 14 | 5 | (−2, −4, −6, 2) | 12, 10, 8, 16 | 12 | 16 |
| 2 | 13 | 6 | (−1, −5, 1, 3) | 12, 8, 14, 16 | 12 | 14 |
| 2 | 15 | 7 | (−1, −3, −7, 1) | 14, 12, 8, 16 | 14 | 16 |

In some embodiments, perhaps to be compatible with HEVC, the reference pictures in base layer DPB may not be changed. The enhancement layer DPB may include the additional inter-layer reference pictures from lower reference layers for inter-layer prediction as shown in Table 7.

TABLE 7

Inter-layer reference picture and lists example 2 (1 reference pictures per reference layer per list)

| Layer | Current picture | Inter-layer Reference pictures in DPB | IlpRefPicList0 (POC) | | | IlpRefPicList1 (POC) | | |
|---|---|---|---|---|---|---|---|---|
| ID | (POC) | (LayerID(POC)) | Layer2 | Layer1 | Layer0 | Layer2 | Layer1 | Layer0 |
| 0 | 0 | — | — | — | — | — | — | — |
| 1 | 0 | — | — | — | 0 | — | — | 0 |
| 2 | 0 | — | — | 0 | 0 | — | 0 | 0 |
| 0 | 4 | 0(0) | — | — | 0 | — | — | 0 |
| 1 | 4 | 0(0, 4), 1(0) | — | 0 | 0 | — | 0 | 4 |
| 2 | 8 | 0(0, 4), 1(0, 4), 2(0) | 0 | 0 | 0 | 0 | 4 | 4 |
| 0 | 2 | 0(0, 4), | — | — | 0 | — | — | 4 |
| 1 | 2 | 0(0, 4, 2), 1(0, 4) | — | 0 | 0 | — | 4 | 2 |
| 2 | 4 | 0(0, 4, 2), 1(0, 4, 2), 2(0, 8) | 0 | 0 | 0 | 8 | 2 | 2 |
| 0 | 1 | 0(0, 2, 4) | — | — | 0 | — | — | 2 |
| 1 | 1 | 0(0, 2, 4, 1), 1(0, 2, 4) | — | 0 | 0 | — | 2 | 1 |
| 2 | 2 | 0(0, 2, 4, 1), 1(0, 2, 4, 1), 2(0, 4, 8) | 0 | 0 | 0 | 4 | 1 | 1 |
| 2 | 1 | 0(0, 2, 4, 1), 1(0, 2, 4, 1), 2(0, 2, 4, 8) | 0 | 0 | 0 | 2 | 1 | 1 |
| 2 | 3 | 0(0, 2, 4, 1), 1(0, 2, 4, 1), 2(2, 0, 4, 8) | 2 | 1 | 1 | 4 | 2 | 2 |
| 0 | 3 | 0(2, 1, 0, 4) | — | — | 2 | — | — | 4 |
| 1 | 3 | 0(2, 1, 0, 4, 3), 1(2, 1, 0, 4). | — | 2 | 2 | — | 4 | 3 |
| 2 | 6 | 0(2, 1, 0, 4, 3), 1(2, 1, 0, 4, 3), 2(4, 2, 0, 8) | 4 | 2 | 2 | 8 | 3 | 3 |
| 2 | 5 | 0(2, 1, 0, 4, 3), 1(2, 1, 0, 4, 3), 2(4, 0, 6, 8) | 4 | 2 | 2 | 6 | 3 | 3 |
| 2 | 7 | 0(2, 1, 0, 4, 3), 1(2, 1, 0, 4, 3), 2(6, 4, 0, 8) | 6 | 3 | 3 | 8 | 4 | 4 |
| 0 | 8 | 0(4) | — | — | 4 | — | — | 4 |
| 1 | 8 | 0(4, 8), 1(4) | — | 4 | 4 | — | 4 | 8 |
| 2 | 16 | 0(4, 8), 1(4, 8), 2(8, 6, 4, 0) | 8 | 4 | 4 | 8 | 8 | 8 |
| 0 | 6 | 0(4, 8) | — | — | 4 | — | — | 8 |
| 1 | 6 | 0(4, 8, 6), 1(4, 8) | — | 4 | 4 | — | 8 | 6 |
| 2 | 12 | 0(4, 8, 6), 1(4, 8, 6), 2(8, 6, 16) | 8 | 4 | 4 | 16 | 6 | 6 |
| 0 | 5 | 0(4, 6, 8), | — | — | 4 | — | — | 6 |
| 1 | 5 | 0(4, 6, 8, 5), 1(4, 6, 8) | — | 4 | 4 | — | 6 | 5 |
| 2 | 10 | 0(4, 6, 8, 5), 1(4, 6, 8, 5), 2(8, 6, 12, 16) | 8 | 4 | 4 | 12 | 5 | 5 |
| 2 | 9 | 0(4, 6, 8, 5), 1(4, 6, 8, 5), 2(8, 10, 12, 16) | 8 | 4 | 4 | 10 | 5 | 5 |
| 2 | 11 | 0(4, 6, 8, 5), 1(4, 6, 8, 5), 2(10, 8, 14, 16) | 10 | 5 | 5 | 12 | 6 | 6 |
| 0 | 7 | 0(6, 5, 4, 8) | — | — | 6 | — | — | 8 |
| 1 | 7 | 0(6, 5, 4, 8, 7), 1(6, 5, 4, 8) | — | 6 | 6 | — | 8 | 7 |
| 2 | 14 | 0(6, 5, 4, 8, 7), 1(6, 5, 4, 8, 7), 2(12, 10, 8, 16) | 12 | 6 | 6 | 16 | 7 | 7 |
| 2 | 13 | 0(6, 5, 4, 8, 7), 1(6, 5, 4, 8, 7), 2(12, 8, 14, 16) | 12 | 6 | 6 | 14 | 7 | 7 |
| 2 | 15 | 0(6, 5, 4, 8, 7), 1(6, 5, 4, 8, 7), 2(14, 12, 8, 16) | 14 | 7 | 7 | 16 | 8 | 8 |

Table 7 gives an example of the inter-layer reference pictures (ILR) available in DPB of one or more, or each, layer with inter-layer prediction and the relative IlpRefPicList0/1. In such scenarios, at least one reference picture from one or more, or each, reference layer may be selected for IlpRefPicList0/1. In some embodiments, an encoder may determine the number of pictures of one or more, or each, list and which reference pictures to be included into the list, perhaps depending on the rate-distortion cost of the motion estimation.

Embodiments contemplate temporal reference picture signaling for HEVC scalable coding. One or more embodiments contemplate that the temporal reference picture sets of base layer and enhancement layers could be identical, perhaps when one or more, or each, layer may be using the same prediction structure, such as low-delay prediction or dyadic coding structure, and same GOP size and frame rate. For multi-layer scalable coding, the temporal reference picture set of the enhancement layer may be predicted from the temporal reference picture set of the base layer and/or any lower reference layer with the same temporal reference set specified in the parameter set.

Table 8, Table 9, Table 10, and Table 11 are examples of a sequence parameter set (SPS) syntax, picture parameter set (PPS) syntax, and slice header syntax recognized by embodiment. The syntax that may be related to a temporal reference picture set and/or a temporal reference picture list are marked with a double asterisk.

TABLE 8

| Exemplary HEVC Sequence parameter set syntax | |
|---|---|
| | Descriptor |
| seq_parameter_set_rbsp( ) { | |
| profile_idc | u(8) |
| reserved_zero_8bits /* equal to 0 */ | u(8) |
| level_idc | u(8) |
| seq_parameter_set_id | ue(v) |
| max_temporal_layers_minus1 | u(3) |
| pic_width_in_luma_samples | u(16) |
| pic_height_in_luma_samples | u(16) |
| bit_depth_luma_minus8 | ue(v) |
| bit_depth_chroma_minus8 | ue(v) |
| pcm_bit_depth_luma_minus1 | u(4) |
| pcm_bit_depth_chroma_minus1 | u(4) |
| log2_max_pic_order_cnt_lsb_minus4 | ue(v) |
| **max_num_ref_frames | ue(v) |
| log2_min_coding_block_size_minus3 | ue(v) |
| log2_diff_max_min_coding_block_size | ue(v) |
| log2_min_transform_block_size_minus2 | ue(v) |
| log2_diff_max_min_transform_block_size | ue(v) |
| log2_min_pcm_coding_block_size_minus3 | ue(v) |
| max_transform_hierarchy_depth_inter | ue(v) |
| max_transform_hierarchy_depth_intra | ue(v) |
| chroma_pred_from_luma_enabled_flag | u(1) |
| loop_filter_across_slice_flag | u(1) |
| sample_adaptive_offset_enabled_flag | u(1) |
| adaptive_loop_filter_enabled_flag | u(1) |
| pcm_loop_filter_disable_flag | u(1) |
| cu_qp_delta_enabled_flag | u(1) |
| temporal_id_nesting_flag | u(1) |
| inter_4x4_enabled_flag | u(1) |
| rbsp_trailing_bits( ) | |
| } | |

TABLE 9

| Exemplary HEVC Picture parameter set syntax | |
|---|---|
| | Descriptor |
| pic_parameter_set_rbsp( ) { | |
| pic_parameter_set_id | ue(v) |
| seq_parameter_set_id | ue(v) |
| entropy_coding_mode_flag | u(1) |
| **num_short_term_ref_pic_sets | ue(v) |
| **for(idx = 0; idx < num_short_term_ref_pic_sets; idx++) | |
| ** short_term_ref_pic_set( idx) | |
| ** long_term_ref_pics_present_flag | u(1) |
| num_temporal_layer_switching_point_flags | ue(v) |
| for( i = 0; i < num_temporal_layer_switching_point_flags; i++ ) | |
| temporal_layer_switching_point_flag[ i ] | u(1) |
| num_ref_idx_l0_default_active_minus1 | ue(v) |
| num_ref_idx_l1_default_active_minus1 | ue(v) |
| pic_init_qp_minus26 /* relative to 26 */ | se(v) |
| constrained_intra_pred_flag | u(1) |
| slice_granularity | u(2) |
| shared_pps_info_enabled_flag | u(1) |
| if( shared_pps_info_enabled_flag) | |
| if( adaptive_loop_filter_enabled_flag) | |
| alf_param() | |
| if( cu_qp_delta_enabled_flag) | |
| max_cu_qp_delta_depth | u(4) |
| rbsp_trailing_bits( ) | |
| } | |

TABLE 10

Exemplary Short-term reference picture set syntax

```
                                                        Descriptor
short_term_ref_pic_set( idx ) {
  num_negative_pics                                     ue(v)
  num_positive_pics                                     ue(v)
  for( i = 0; i < num_negative_pics; i++ ) {
    delta_poc_s0_minus1[ i ]                            ue(v)
    used_by_curr_pic_s0_flag[ i ]                       u(1)
  }
  for( i = 0; i < num_positive_pics; i++ ) {
    delta_poc_s1_minus1[ i ]                            ue(v)
    used_by_curr_pic_s1_flag[ i ]                       u(1)
  }
}
```

TABLE 11

Exemplary HEVC slice header syntax

```
                                                              Descriptor
slice_header( ) {
      lightweight_slice_flag                                  u(1)
      if( !lightweight_slice_flag ) {
        slice_type                                            ue(v)
        pic_parameter_set_id                                  ue(v)
        if( IdrPicFlag ) {
          idr_pic_id                                          ue(v)
          no_output_of_prior_pics_flag                        u(1)
        }
        else {
**          pic_order_cnt_lsb                                 u(v)
**          ref_pic_set_pps_flag                              u(1)
**          if( ! ref_pic_set_pps_flag )
**            ref_pic_set( num_ref_pic_sets )
**          else
**            ref_pic_set_pps_idx                             u(v)
**        if( slice_type = = P || slice_type = = B ) {
**          num_ref_idx_active_override_flag                  u(1)
**          if( num_ref_idx_active_override_flag ) {
**            num_ref_idx_l0_active_minus1                    ue(v)
**            if( slice_type = = B )
**              num_ref_idx_l1_active_minus1                  ue(v)
**          }
**        }
          ref_pic_list_modification( )
          ref_pic_list_combination( )
      }
      if( entropy_coding_mode_flag && slice_type != I)
        cabac_init_idc                                        ue(v)
      first_slice_in_pic_flag                                 u(1)
      if( first_slice_in_pic_flag == 0 )
        slice_address                                         u(v)
      if( !lightweight_slice_flag ) {
        slice_qp_delta                                        se(v)
        if( sample_adaptive_offset_enabled_flag )
          sao_param( )
        if( deblocking_filter_control_present_flag ) {
          disable_deblocking_filter_idc
          if( disable_deblocking_filter_idc != 1 ) {
            slice_alpha_c0_offset_div2
            slice_beta_offset_div2
          }
        }
        if( slice_type = = B )
          collocated_from_l0_flag                             u(1)
        if( adaptive_loop_filter_enabled_flag ) {
          if( !shared_pps_info_enabled_flag )
            alf_param( )
          alf_cu_control_param( )
        }
      }
}
```

Embodiments contemplate one or more syntaxes for prediction (or estimation) of the reference picture set and/or the reference picture list of an enhancement layer from a lower reference layer (e.g. one or more syntaxes heretofore undefined for such prediction (or estimation)). The following tables illustrate the one or more contemplated syntaxes.

TABLE 12

Exemplary Sequence parameter set syntax supporting scalable enhancement extension of HEVC

```
                                                    Descriptor
seq_parameter_set_rbsp( ) {
  profile_idc                                       u(8)
  reserved_zero_8bits /* equal to 0 */              u(8)
  level_idc                                         u(8)
  seq_parameter_set_id                              ue(v)
  layer_index                                       ue(v)
  max_temporal_layers_minus1                        u(3)
  pic_width_in_luma_samples                         u(16)
  pic_height_in_luma_samples                        u(16)
  bit_depth_luma_minus8                             ue(v)
  bit_depth_chroma_minus8                           ue(v)
  pcm_bit_depth_luma_minus1                         u(4)
  pcm_bit_depth_chroma_minus1                       u(4)
  log2_max_pic_order_cnt_lsb_minus4                 ue(v)
** max_num_ref_frames                               ue(v)
  log2_min_coding_block_size_minus3                 ue(v)
  log2_diff_max_min_coding_block_size               ue(v)
  log2_min_transform_block_size_minus2              ue(v)
  log2_diff_max_min_transform_block_size            ue(v)
  log2_min_pcm_coding_block_size_minus3             ue(v)
  max_transform_hierarchy_depth_inter               ue(v)
  max_transform_hierarchy_depth_intra               ue(v)
  chroma_pred_from_luma_enabled_flag                u(1)
  loop_filter_across_slice_flag                     u(1)
  sample_adaptive_offset_enabled_flag               u(1)
  adaptive_loop_filter_enabled_flag                 u(1)
  pcm_loop_filter_disable_flag                      u(1)
  cu_qp_delta_enabled_flag                          u(1)
  temporal_id_nesting_flag                          u(1)
  inter_4x4_enabled_flag                            u(1)
  rbsp_trailing_bits( )
}
```

In one or more embodiments, the layer_index syntax may specify in which layer a current sequence is located. In some embodiments, the range may be from 0 to a maximum of layers that may be allowed by a related standard.

Table 13 is a temporal short-term reference picture set (RPS) syntax for HEVC scalable coding contemplated by one or more embodiments. In some embodiments, it can be switched between original HEVC RPS structure and inter-layer temporal reference picture set prediction. In some embodiments, perhaps when "st_rps_prediction_flag" equals 0, the layer may define its own RPS in its active PPS header and/or slice header. In some embodiments, perhaps when "st_rps_prediction_flag" equals 1, the short-term temporal RPS may be the same as at least one short-term RPS of a lower reference layer. In some embodiments, the lower reference layer number can be retrieved by "abs_diff_layer_idx_minus1", and the short-term RPS index may be given by "short_term_ref_pic_set_idx".

In some embodiments, perhaps when st_rps_prediction_flag equals 1, the short-term RPS of a current layer can be predicted from the short-term RPS from a lower reference layer. In some embodiments, perhaps when st_rps_prediction_flag equals 0, the inter-layer prediction of a current layer short-term reference picture set may be disabled.

TABLE 13

Exemplary Short term temporal reference picture set syntax supporting scalable enhancement extension of HEVC

| | Descriptor |
|---|---|
| short_term_ ref_pic_set( idx ) { | |
| st_rps_prediction_flag | u(1) |
| If (st_rps_prediction_flag) { | |
| abs_diff_layer_idx_minus1 | ue(v) |
| short_term_ ref_pic_set_idx | u(v) |
| } | |
| else { | |
| num_negative_pics | ue(v) |
| num_positive_pics | ue(v) |
| for( i = 0; i < num_negative_pics; i++ ) { | |
| delta_poc_s0_minus1[ i ] | ue(v) |
| used_by_curr_pic_s0_flag[ i ] | u(1) |
| } | |
| for( i = 0; i < num_positive_pics; i++ ) { | |
| delta_poc_s1_minus1[ i ] | ue(v) |
| used_by_curr_pic_s1_flag[ i ] | u(1) |
| } | |
| } | |
| } | |

One or more embodiments contemplate that abs_diff_layer_idx_minus1 plus 1 may specify the absolute difference between a current layer index and a lower reference layer index. In some embodiments, the value of abs_diff_layer_idx_minus1 may not exceed the total number of layers minus 2, for example.

One or more embodiments contemplate that short_term_ref_pic_set_idx may specify the index to the list of the short-term reference picture sets specified in the active parameter set that may be used for creation of the inter-layer reference picture set of the current picture.

Table 14 is an example of a short-term temporal RPS value for scalable coding contemplated by one or more embodiments. A base layer (layer-0) may use the short-term RPS as defined in 0. One or both of the layer-1 and/or layer-2's short-term temporal RPS may be predicted (or estimated) from a base layer temporal RPS. A layer-2 short-term temporal RPS could also be predicted from a layer-1's RPS which in some embodiments may involve recursive parsing of the RPS, since layer-1's RPS may be further predicted from a layer-0, for example.

TABLE 14

Exemplary short-term temporal RPS example of scalable coding

| | | | | | | | | | | | |
|---|---|---|---|---|---|---|---|---|---|---|---|
| Layer-1 short-termRPS idx | 0 | 1 | 2 | 3 | 4 | 5 | 6 | 7 | 8 | 9 | 10 |
| st_rps_prediction_flag | 1 | 1 | 1 | 1 | 1 | 1 | 1 | 1 | 1 | 1 | 1 |
| abs_diff_layer_idx_minus1 | 0 | 0 | 0 | 0 | 0 | 0 | 0 | 0 | 0 | 0 | 0 |
| short_term_ref_pic_set_idx | 0 | 1 | 2 | 3 | 4 | 5 | 6 | 7 | 8 | 9 | 10 |
| Layer-2 short-termRPS idx | 0 | 1 | 2 | 3 | 4 | 5 | 6 | 7 | 8 | 9 | 10 |
| st_rps_prediction_flag | 1 | 1 | 1 | 1 | 1 | 1 | 1 | 1 | 1 | 1 | 1 |
| abs_diff_layer_idx_minus1 | 1 | 1 | 1 | 1 | 1 | 1 | 1 | 1 | 1 | 1 | 1 |
| short_term_ref_pic_set_idx | 0 | 1 | 2 | 3 | 4 | 5 | 6 | 7 | 8 | 9 | 10 |

Embodiments contemplate inter-layer reference picture signaling for HEVC scalable coding. In some embodiments, perhaps in order to identify the reference pictures from different lower reference layers, among other reasons, corresponding inter-layer prediction (ILP) signaling may be added into the bitstream syntax. The signaling may enable an enhancement layer DPB to include one or more, or all, useful (or in some embodiments perhaps needed) reconstructed reference pictures from one or more lower reference layers so that the enhancement picture can be predicted from any up-sampled (e.g. perhaps if useful or in some embodiments if required) inter-layer reference pictures to further improve the coding efficiency, among other reasons, for example.

Embodiments contemplate a sequence parameter set syntax for HEVC scalable coding. In one or more embodiments, the SPS syntax for inter-layer picture prediction may be the same as shown in Table 12, which may include an additional layer index to specify which layer a current sequence may be located. In some embodiments, the layer index may be used to identify the reference pictures from different reference layers.

Embodiments contemplate one or more picture parameter set syntaxes for HEVC scalable coding. Table 15 illustrates an exemplary contemplated PPS syntax enabling inter-layer picture prediction for HEVC scalable coding.

TABLE 15

Exemplary picture parameter set syntax supporting scalable enhancement extension of HEVC

| | Descriptor |
|---|---|
| pic_parameter_set_rbsp( ) { | |
| pic_parameter_set_id | ue(v) |
| seq_parameter_set_id | ue(v) |
| entropy_coding_mode_flag | u(1) |
| **num_short_term_ref_pic_sets | ue(v) |
| **for(idx = 0; idx < num_short_term_ref_pic_sets; idx++) | |
| ** short_term_ref_pic_set( idx ) | |
| ** long_term_ref_pics_present_flag | u(1) |
| num_st_ilp_ref_pic_sets | ue(v) |
| for(idx = 0; idx < num_st_ilp_ref_pic_sets; idx++) | |
| short_term_ilp_ref_pic_set( idx ) | |
| long_term_ilp_ref_pics_present_flag | u(1) |
| num_temporal_layer_switching_point_flags | ue(v) |
| for( i = 0; i < num_temporal_layer_switching_point_flags; i++ ) | |
| temporal_layer_switching_point_flag[ i ] | u(1) |
| num_ref_idx_l0_default_active_minus1 | ue(v) |
| num_ref_idx_l1_default_active_minus1 | ue(v) |
| num_ilp_ref_idx_l0_default_active_minus1 | ue(v) |
| num_ilp_ref_idx_l1_default_active_minus1 | ue(v) |
| pic_init_qp_minus26 /* relative to 26 */ | se(v) |
| constrained_intra_pred_flag | u(1) |
| slice_granularity | u(2) |
| shared_pps_info_enabled_flag | u(1) |
| if( shared_pps_info_enabled_flag ) | |
| if( adaptive_loop_filter_enabled_flag ) | |
| alf_param( ) | |
| if( cu_qp_delta_enabled_flag ) | |
| max_cu_qp_delta_depth | u(4) |
| rbsp_trailing_bits( ) | |
| } | |

In one or more embodiments, num_st_ilp_ref_pic_sets may specify the number of short term inter-layer reference picture sets that may be specified in the PPS. In some embodiments, the value of num_st_ilp_ref_pic_sets may be in the range of 0 to 64, inclusive, for example.

In one or more embodiments, long_term_ilp_ref_pics_present_flag equaling 0 may specify (or indicate) that no long-term reference pictures may be used for inter-layer prediction of any coded picture referring to the picture parameter. In some embodiments, the flag equaling 1 may specify (or indicate) that long-term reference pictures may be used for inter-layer prediction of any coded picture referring to the picture parameter, for example.

In one or more embodiments, num_ilp_ref_idx_l0_default_active_minus1 plus 1 may specify (or indicate) how many reference pictures may be allowed in an inter-layer reference picture list 0 (IlpRefPicList0), perhaps by default. In some embodiments, the value may be in the range of 0 to 31, inclusive, for example.

In one or more embodiments, num_ilp_ref_idx_l1_default_active_minus1 plus 1 may specify (or indicate) how many reference pictures may be allowed in an inter-layer reference picture list 1 (IlpRefPicList1), perhaps by default. The value may be in the range of 0 to 31, inclusive, for example.

Embodiments contemplate one or more scenarios for a Short-term ILP reference picture set (including a scenario 1). Table 16 illustrates a contemplated inter-layer reference picture set which may be present in a parameter set and/or in a slice header.

TABLE 16

Short term ILP reference picture set syntax (example scenario 1)

| | Descriptor |
|---|---|
| Short_term_ilp_ref_pic_set( idx ) { | |
| abs_diff_layer_idx_minus1 | ue(v) |
| fps_ratio_minus1 | ue(v) |
| num_negative_pics | ue(v) |
| num_positive_pics | ue(v) |
| for( i = 0; i < num_negative_pics; i++ ) { | |
| delta_poc_s0 [ i ] | ue(v) |
| used_by_curr_pic_ilp_s0_flag[ i ] | u(1) |
| } | |
| for( i = 0; i < num_positive_pics; i++ ) { | |
| delta_poc_s1[ i ] | ue(v) |
| used_by_curr_pic_ilp_s1_flag[ i ] | u(1) |
| } | |
| } | |

One or more embodiments contemplate that abs_diff_layer_idx_minus1 plus 1 may specify (or indicate) the absolute difference between a current layer index and a lower reference layer index. In some embodiments, the value of abs_diff_layer_idx_minus1 may not exceed the total number of layers minus 2, for example.

One or more embodiments contemplate that fps_ratio_minus1 plus 1 may specify (or indicate) the frame rate ratio between a current layer and the reference layer. For example, the enhancement layer frame rate may be 30 frames per second and the base layer frame rate may be 15 frames per second, then fps_ratio_minus1 is 1.

One or more embodiments contemplate that num_negative_pics may specify (or indicate) the number of the following delta_poc_s0[i] and used_by_curr_pic_s0_flag[i] syntax elements. In some embodiments, the value of num_negative_pics may be in the range of 0 to max_num_ref_frames that may be specified in the sequence parameter set (SPS) syntax, inclusive, for example.

One or more embodiments contemplate that num_positive_pics may specify (or indicate) the number of the following delta_poc_s1 [i] and used_by_curr_pic_s1_flag1 [i] syntax elements. In some embodiments, the value of num_positive_pics may be in the range of 0 to max_num_ref_frame−num_negative_pics, inclusive, for example.

One or more embodiments contemplate that delta_poc_s0 [i] may specify (or indicate) an absolute difference between two picture order count values. In some embodiments, the value of delta_poc_s0 [i] may be in the range of 0 to $2^{15}-1$, inclusive, for example.

One or more embodiments contemplate that used_by_curr_pic_ilp_s0_flag[i] equaling 1 may specify (or indicate) that the i-th inter-layer reference picture from a reference layer may be used for inter-layer prediction by the current picture. One or more embodiments contemplate that used_by_curr_pic_s0_flag[i] equaling 0 may specify that the i-th reference picture may not be used by inter-layer prediction of current picture, for example.

One or more embodiments contemplate that delta_poc_s1 [i] may specify an absolute difference between two picture order count values. In some embodiments, the value of delta_poc_s1_minus1[i] may be in the range of 0 to $2^{15}-1$, inclusive, for example.

One or more embodiments contemplate that used_by_curr_pic_ilp_s1_flag[i] equaling 1 may specify (or indicate) that the i-th inter-layer reference picture from a reference layer may not be used for an inter-layer prediction by the current picture. One or more embodiments also contemplate that used_by_curr_pic_s1_flag[i] equaling 0 may specify (or indicate) that the i-th reference picture may not be used by an inter-layer prediction of a current picture.

Embodiments contemplate that a short-term ILP reference picture set signaling may be a flexible approach that may enable an enhancement layer to store any reconstructed reference pictures from one or more lower reference layers into its DPB. In some embodiments, the corresponding reference picture could be removed from a lower reference layer's DPB. Such signaling may also support a hybrid coding structure where the base layer could be encoded in H.264 and enhancement layers may be encoded in HEVC. In some embodiments, it may be useful in such signaling if one or more, or each, enhancement layer may have its own short-term ILP reference picture set or sets. In some embodiments, the same reference picture could be duplicated in multiple layers' DPB, for example.

In one or more embodiments, a reference picture set may use delta POC to indicate the location of the reference picture. For inter-layer prediction, the different layer may have a different frame rate. The ILP reference picture POC of a lower layer may be calculated as IlpRefPicPOC=(CurrPicPOC+deltaPOC)/(fps_ratio_minus1+1). Table 17 illustrates an example of an inter-layer prediction of layer-2 whose ILP reference pictures may be from layer-1. The frame rate of layer-2 may be 60 fps and the frame rate of layer-1 may be 30. The example shows how to retrieve an ILP reference picture POC value from a current picture POC and/or the ILP reference picture set.

TABLE 17

ILP reference picture (POC) example for FIG. 7 scalable structure

| Layer-2 POC (CurrPicPOC) | IlpRps (layer-1) | fps_ratio_minus1 (layer-1) | POC w/o frame rate adjustment | ILP reference picture POC from layer-1 |
|---|---|---|---|---|
| 0 | (0) | 1 | 0 | 0 |
| 8 | (−8, 0) | 1 | 0, 8 | 0, 4 |
| 4 | (−4, 0, 4) | 1 | 0, 4, 8 | 0, 2, 4 |
| 2 | (−2, 0, 2, 6) | 1 | 0, 2, 4, 8 | 0, 1, 2, 4 |
| 1 | (−1, 1, 3, 7) | 1 | 0, 2, 4, 8 | 0, 1, 2, 4 |
| 3 | (−1, −3, 1, 5) | 1 | 2, 0, 4, 8 | 1, 0, 2, 4 |
| 6 | (−2, −4, −6, 0, 2) | 1 | 4, 2, 0, 6, 8 | 2, 1, 0, 3, 4 |
| 5 | (−1, −5, 1, 3) | 1 | 4, 0, 6, 8 | 2, 0, 3, 4 |
| 7 | (−1, −3, −7, 1) | 1 | 6, 4, 0, 8 | 3, 2, 0, 4 |

Embodiments that contemplate one or more scenarios for a Short-term ILP reference picture set also include an example scenario 2. Some embodiments contemplate that the delta POC of some (or perhaps most) inter-prediction reference pictures could be the same as temporal prediction reference pictures of the lower reference layer, except perhaps for the co-located reference picture of the reference layer. An example scenario 2 for a short term ILP reference picture set is illustrated in Table 18.

TABLE 18

Short term ILP reference picture set syntax (example scenario 2)

| | Descriptor |
|---|---|
| Short_term_ilp_ref_pic_set( idx ) { | |
| abs_diff_layer_idx_minus1 | ue(v) |
| fps_ratio_minus1 | ue(v) |
| colocated_ref_pic_present_flag | u(1) |
| If (colocated_ref_pic_present_flag) { | |
| colocated_ref_pic_used_by_curr_pic_s0_flag | u(1) |
| colocated_ref_pic_used_by_curr_pic_s1_flag | u(1) |
| } | |
| st_rps_used_by_curr_inter_layer_flag | u(1) |
| If (st_rps_used_by_cur_inter_layer_flag) { | |
| short_term_ ref_pic_set_idx | u(v) |
| } | |
| } | |

One or more embodiments contemplate that abs_diff_layer_idx_minus1 and/or fps_ratio_minus1 may have the same definition as in Table 16.

One or more embodiments contemplate that colocated_ref_pic_present_flag equaling 0 may specify (or indicate) that the co-located reference picture from the reference layer may not be included in the short term ILP reference picture set. One or more embodiments contemplate that colocated_ref_pic_present_flag equaling 1 may specify (or indicate) that the co-located reference picture from the reference layer may be included in the short term ILP reference picture set, for example.

Some embodiments contemplate that colocated_ref_pic_used_by_curr_pic_s0_flag equaling 0 may specific (or indicate) that the co-located reference picture may not be used for inter-layer prediction by the current picture, for example.

Some embodiments contemplate that colocated_ref_pic_used_by_curr_pic_s1_flag equaling 0 may specify (or indicate) that the co-located reference picture may not be used for inter-layer prediction by the current picture, for example.

Some embodiments contemplate that st_rps_used_by_curr_inter_layer_flag equaling 0 may specify (or indicate) that no reference picture set that may be specified in the active parameter set may be used for short term inter-layer reference picture set.

Some embodiments contemplate that short_term_ref_pic_set_idx may specify (or indicate) the index to the short-term temporal reference picture set or sets that may be specified in the active parameter set of a corresponding reference layer that may be used for creation of the inter-layer reference picture set of the current picture, for example.

TABLE 19

Layer-2 short term ILP reference picture set (example scenario 2) for FIG. 7

| short-term ILP RPS index | 0 | 1 | 2 | 3 | 4 | 5 | 6 | 7 | 8 | 9 | 10 |
|---|---|---|---|---|---|---|---|---|---|---|---|
| abs_diff_layer_idx_minus1 | 0 | 0 | 0 | 0 | 0 | 0 | 0 | 0 | 0 | 0 | 0 |
| colocated_ref_pic_present_flag | 1 | 1 | 1 | 0 | 0 | 1 | 0 | 0 | 1 | 1 | 1 |
| st_rps_used_by_curr_inter_layer_flag | 1 | 1 | 1 | 1 | 1 | 1 | 1 | 1 | 1 | 1 | 1 |
| short_term_ref_pic_set_idx | 0 | 1 | 2 | 3 | 4 | 5 | 6 | 7 | 8 | 9 | 10 |
| idx | 11 | 12 | 13 | 14 | 15 | 16 | 17 | 18 | 9 | 20 | 21 |
| abs_diff_layer_idx_minus1 | 1 | 1 | 1 | 1 | 1 | 1 | 1 | 1 | 1 | 1 | 1 |
| colocated_ref_pic_present_flag | 1 | 1 | 1 | 0 | 0 | 1 | 0 | 0 | 1 | 1 | 1 |
| st_rps_used_by_curr_inter_layer_flag | 1 | 1 | 1 | 1 | 1 | 1 | 1 | 1 | 1 | 1 | 1 |
| short_term_ref_pic_set_idx | 0 | 1 | 2 | 3 | 4 | 5 | 6 | 7 | 8 | 9 | 10 |

Table 19 is an example of layer-2's short-term ILP reference picture sets using the example scenario 2 signaling syntax structure for the scalable structure example in FIG. 7. This short-term ILP reference picture set signaling may be designed for scenarios in which an ILP reference picture set may be the same as the temporal reference picture set of the lower reference layer so that extra bits can be saved and/or no duplicated ILP reference pictures may be stored in the enhancement layers (or in some embodiments no duplicated ILP reference pictures may need to be stored in the enhancement layers).

One or more embodiments contemplate at least one approach to handle a different frame rate of a different layer may be the same as described herein with respect to the short-term ILP reference picture set (e.g. example scenario 1).

Embodiments that contemplate one or more scenarios for a short-term ILP reference picture set also include an example scenario 3. Embodiments contemplate that to combine the example scenario 1 and the example scenario 2, an extra flag ilp_rps_prediction_flag may be set to switch between example scenario 1 and example scenario 2 as shown in Table 20. In some embodiments, a similar flag can be moved to an SPS or PPS header so that the decision can be made for the entire sequence or picture, for example.

TABLE 20

Short term (ILP) reference picture set syntax (example scenario 3)

| | Descriptor |
|---|---|
| Short_term_ilp_ref_pic_set( idx ) { | |
| abs_diff_layer_idx_minus1 | ue(v) |
| fps_ratio_minus1 | ue(v) |
| ilp_rps_prediction_flag | u(1) |
| If (ilp_rps_prediction_flag) { | |
| colocated_ref_pic_present_flag | u(1) |
| If (colocated_ref_pic_present_flag) { | |
| colocated_ref_pic_used_by_curr_pic_s0_flag | u(1) |
| colocated_ref_pic_used_by_curr_pic_s1_flag | u(1) |
| } | |
| st_rps_used_by_curr_inter_layer_flag | u(1) |
| If (st_rps_used_by_cur_inter_layer_flag) { | |
| short_term_ ref_pic_set_idx | u(v) |
| } | |
| } | |

TABLE 20-continued

| Short term (ILP) reference picture set syntax (example scenario 3) | |
|---|---|
| | Descriptor |
| else ( | |
| num_negative_pics | ue(v) |
| num_positive_pics | ue(v) |
| for( i = 0; i < num_negative_pics; i++ ) { | |
| delta_poc_s0 [ i ] | ue(v) |
| used_by_curr_pic_ilp_s0_flag[ i ] | u(1) |
| } | |
| for( i = 0; i < num_positive_pics; i++ ) { | |
| delta_poc_s1[ i ] | ue(v) |
| used_by_curr_pic_ilp_s1_flag[ i ] | u(1) |
| } | |
| } | |

Embodiments contemplate one or more slice header syntaxes for HEVC scalable coding. Table 21 illustrates a contemplated slice header syntax that may support short term and/or long term inter-layer prediction for the scalable enhancement extension of HEVC.

TABLE 21

| Exemplary Slice header syntax supporting scalable enhancement extension of HEVC | |
|---|---|
| | Descriptor |
| slice_header( ) { | |
| lightweight_slice_flag | u(1) |
| if( !lightweight_slice_flag ) { | |
| slice_type | ue(v) |
| pic_parameter_set_id | ue(v) |
| if( IdrPicFlag ) { | |
| idr_pic_id | ue(v) |
| no_output_of_prior_pics_flag | u(1) |
| } | |
| else { | |
| pic_order_cnt_lsb | u(v) |
| ** short_term_ref_pic_set_pps_flag | u(1) |
| ** if( !short_term_ref_pic_set_pps_flag ) | |
| ** short_term_ref_pic_set( num_short_term_ref_pic_sets ) | |
| ** else | |
| ** short_term_ref_pic_set_idx | u(v) |
| ** if( long_term_ref_pics_present_flag ) { | |
| ** num_long_term_pics | ue(v) |
| ** for( i = 0; i < num_long_term_pics; i++ ) { | |
| ** delta_poc_lsb_lt_minus1[ i ] | ue(v) |
| ** used_by_curr_pic_lt_flag[ i ] | u(1) |
| ** } | |
| ** } | |
| ** short_term_ilp_ref_pic_set_pps_flag | u(1) |
| ** if( !short_term_ilp_ref_pic_set_pps_flag ) | |
| ** short_term_ilp_ref_pic_set( num_st_ilp_ref_pic_sets ) | |
| ** else | |
| ** short_term_ilp_ref_pic_set_idx | u(v) |
| ** if( long_term_ilp_ref_pics_present_flag ) { | |
| ** num_long_term_ilp_pics | ue(v) |
| ** for( i = 0; i < num_long_term_ilp_pics; i++ ) { | |
| abs_diff_layer_idx_minus1 | ue(v) |
| fps_ratio_minus1 | ue(v) |
| ** delta_poc_lsb_inter_layer_lt[ i ] | ue(v) |
| ** used_by_curr_pic_ilp_lt_flag[ i ] | u(1) |
| ** } | |
| ** } | |
| } | |
| if( slice_type = = P \|\| slice_type = = B ) { | |
| num_ref_idx_active_override_flag | u(1) |
| if( num_ref_idx_active_override_flag ) { | |
| num_ref_idx_l0_active_minus1 | ue(v) |
| if( slice_type = = B ) | |
| num_ref_idx_l1_active_minus1 | ue(v) |
| } | |
| num_ilp_ref_idx_active_override_flag | u(1) |
| if( num_ilp_ref_idx_active_override_flag ) { | |

TABLE 21-continued

Exemplary Slice header syntax supporting scalable enhancement extension of HEVC

```
                                                              Descriptor
          num_ilp_ref_idx_l0_active_minus1                    ue(v)
          if( slice_type = = B )
            num_ilp_ref_idx_l1_active_minus1                  ue(v)
        }
      }
      ref_pic_list_modification( )
      ref_pic_list_combination( )
  }
  if( entropy_coding_mode_flag && slice_type != I)
      cabac_init_idc                                          ue(v)
  first_slice_in_pic_flag                                     u(1)
  if( first_slice_in_pic_flag == 0 )
      slice_address                                           u(v)
  if( !lightweight_slice_flag ) {
      slice_qp_delta                                          se(v)
      if( sample_adaptive_offset_enabled_flag )
        sao_param( )
      if( deblocking_filter_control_present_flag ) {
        disable_deblocking_filter_idc
        if( disable_deblocking_filter_idc != 1 ) {
          slice_alpha_c0_offset_div2
          slice_beta_offset_div2
        }
      }
      if( slice_type = = B )
        collocated_from_l0_flag                               u(1)
      if( adaptive_loop_filter_enabled_flag ) {
        if( !shared_pps_info_enabled_flag )
          alf_param( )
        alf_cu_control_param( )
      }
  }
}
```

Some embodiments contemplate that short_term_ilp_ref_pic_set_pps_flag equaling 1 may specify (or indicate) that the short-term inter-layer reference picture set of the current picture may be created using syntax elements in the active parameter set. In some embodiments, short_term_ilp_ref_pic_set_pps_flag equaling 0 may specify (or indicate) that the short-term inter-layer reference picture set of the current picture may be created using syntax elements in the short_term_ilp_ref_pic_set( ) syntax structure in the slice header, for example.

Some embodiments contemplate that short_term_ilp_ref_pic_set_idx may specify (or indicate) the index to the list of the short-term inter-layer reference picture sets that may be specified in the active parameter set that may be used for creation of the inter-layer reference picture set of the current picture. In some embodiments, the syntax element short_term_ilp_ref_pic_set_idx may be represented by ceil (log 2(num_st_ilp_ref_pic_sets)) bits. The value of short_term_ref_pic_set_idx may be in the range of 0 to num_st_inter_layer_ref_pic_sets−1, inclusive, where num_st_ilp_ref_pic_sets may be the syntax element from the active parameter set, for example.

Some embodiments contemplate that num_long_term_ilp_pics may specify (or indicate) the number of the long-term reference pictures that may be included in the long-term reference picture set of the current picture. In some embodiments, the value of num_long_term_ilp_pics may be in the range of 0 to max_num_ref_frames−NumNegativePics[StRpsIdx]−NumPositivePics[StRpsIdx]−NumNegativeInterLayerPics[StRpsIlpIdx]−NumPositivePics[StIlpRpsIdx], inclusive, for example. In some embodiments, perhaps when not present, the value of num_long_term_ilp_pics may be inferred to be equal to 0.

In one or more embodiments, the variable StRpsIdx may be derived as follows:

```
if( short_term_ref_pic_set_pps_flag )
  StRpsIdx = short_term_ref_pic_set_idx
else
    StRpsIdx = num_short_term_ref_pic_sets.
```

In one or more embodiments, the variable StRpsIlpIdx may be derived as follows:

```
if( short_term_ilp_ref_pic_set_pps_flag )
  StIlpRpsIdx = short_term_ilp_ref_pic_set_idx
else
    StIlpRpsIdx = num_st_ilp_ref_pic_sets.
```

In such scenarios, the max_num_ref_frames may be shared by temporal reference pictures and/or ILP reference pictures. Some embodiments may define a separate number of reference pictures in the SPS header for temporal reference pictures and/or ILP reference pictures respectively.

In one or more embodiments, delta_poc_lsb_ilp_lt [i] may be used to determine the value of the least significant bits of the picture order count value of the i-th long-term inter-layer reference picture that may be included in the long-term inter-layer reference picture set of the current picture, for example.

In some embodiments, used_by_curr_pic_ilp_lt_flag[i] equaling 0 may specify (or indicate) that the i-th long-term reference picture that may be included in the long-term inter-layer reference picture set of the current picture may not be used for inter-layer prediction by the current picture. In some embodiments, the flag equaling 1 may specify (or indicate) that the i-th long-term reference picture that may be included in the long-term inter-layer reference picture set of the current picture may be used for inter-layer prediction by the current picture.

One or more embodiments contemplate that num_ilp_ref_idx_active_override_flag equaling 1 may specify (or indicate) that the syntax element num_ilp_ref_idx_l0_ active_minus1 may be present for P and/or B slices and that the syntax element num_ilp_ref_idx_l1_active_minus1 may be present for B slices. Some embodiments contemplate that num_ilp_ref_idx_active_override_flag equaling 0 may specify (or indicate) that the syntax elements num_ilp_ ref_idx_l0_active_minus1 and/or num_ilp_ref_idx_ l1_active_minus1 may not be present.

One or more embodiments contemplate one or more inter-layer prediction (ILP) reference picture lists construction techniques. Embodiments recognize that HEVC may specify the decoding process for temporal reference picture set and/or reference picture lists construction. Embodiments contemplate that at least two reference picture lists, RefPicList0 and RefPicList1, may be constructed and/or updated during the decoding process for P and B pictures. One or more embodiments contemplate, perhaps for HEVC scalable coding, at least two more reference picture lists for inter-layer prediction (ILP), ILPRefPicList0 and ILPRfePicList1. In some embodiments, the inter-layer reference picture lists may include short-term and/or long-term inter-layer reference pictures, or both.

Embodiments contemplate one or more decoding techniques for an ILP reference picture set. In some embodiments, such decoding techniques may be invoked once per picture, perhaps after decoding of a slice header and/or perhaps prior to the decoding of any coding unit. In some embodiments, such processes can be parallel to the decoding process for a temporal reference picture set that may be specified in HEVC. In some embodiments, such processes may result in marking one or more reference pictures as "unused for reference", for example.

In one or more embodiments, the ILP reference picture set may include at least six subsets, namely IlpRpsStCurr0, IlpRpsStCurr1, IlpRpsStFoll0, IlpRpsStFoll1, IlpRpsLtCurr, and IlpRpsLtFoll, for example and not by way of limitation.

In some embodiments, IlpRpsStCurr0 may include one or more, or all, ILP reference pictures that may be prior to the current picture in decoding order and/or output order from a lower reference layer, and that may be used in an inter-layer prediction of the current picture.

In some embodiments, IlpRpsStCurr1 may include one or more, or all, ILP reference pictures that may be prior to the current picture in decoding order, that may succeed the current picture in output order from a lower reference layer, and/or that may be used in an inter-layer prediction of the current picture.

In some embodiments, IlpRpsStFoll0 may include one or more, or all, ILP reference pictures that may be prior to the current picture in decoding order and/or output order from the lower reference layer, that may be used in an inter-layer prediction of one or more of the pictures following the current picture in decoding order, and/or that may not be used in an inter-layer prediction of the current picture.

In some embodiments, IlpRpsStFoll1 may include one or more, or all, reference pictures that may be prior to the current picture in decoding order, that may succeed the current picture in output order from a lower reference layer, that may be used in an inter-layer prediction of one or more of the pictures following the current picture in decoding order, and/or that may not be used in an inter-layer prediction of the current picture.

In some embodiments, IlpRpsLtCurr may include one or more, or all, long term ILP reference pictures that may be used in an inter-layer prediction of the current picture.

In some embodiments, IlpRpsLtFoll may include one or more, or all, long term ILP reference pictures that may not be used in inter-layer prediction of the current picture.

One or more embodiments contemplate that the number of entries in IlpRpsStCurr0, IlpRpsStCurr1, IlpRpsStFoll0, IlpRpsStFoll1, IlpRpsLtCurr, and/or IlpRpsLtFoll may be NumIlpRpsStCurr0, NumIlpRpsStCurr1, NumIlpRpsStFoll0, NumIlpRpsStFoll1, NumIlpRpsLtCurr, and/or NumIlpRpsLtFoll respectively.

In some embodiments, IlpRpsStCurr0, IlpRpsStCurr1, IlpRpsStFoll0 and IlpRpsStFoll1 may be collectively referred to as the short-term subset of the inter-layer reference picture set that may be available from one or more, or each reference layer. In some embodiments, IlpRpsLtCurr and/or IlpRpsLtFoll may collectively be referred to as the long-term subset of the inter-layer reference picture set from one or more, or each, reference layer.

One or more embodiments contemplate that the following may apply for derivation of the six subsets and/or the numbers of entries.

```
for(layer = layer_index − 1; layer >= 0; layer --) {
  for( i = 0, j = 0, k = 0; i < NumNegativePics[layer][ StIlpRpsIdx ] ; i++ ) {
    if( UsedByCurrPicIlpS0[layer][ StIlpRpsIdx ][ i ] )
      IlpRpsStCurr0[layer][ j++ ] = (CurrPicPOC + DeltaPocS0[layer][ StIlpRpsIdx ][ i ])/
( fps_ratio_minus1 + 1 )
    else
        IlpRpsStFoll0[layer][ k++ ] = (CurrPicPOC + DeltaPocS0[layer][ StIlpRpsIdx ][ i ])/
( fps_ratio_minus1 + 1 )
  }
  NumIlpRpsStCurr0 [layer]=j
  NumIlpRpsStFoll0[layer] = k
}
for(layer = layer_index − 1; layer >= 0; layer --) {
    for( i = 0, j = 0, k = 0; i < NumPositivePics[layer][ StIlpRpsIdx ]; i++ ) {
    if( UsedByCurrPicIlpS1[layer][ StIlpRpsIdx ][ i ] )
        IlpRefPicSetStCurr1[layer][ j++ ] = (CurrPicPOC +
DeltaPocS1[layer][ StIlpRpsIdx ][ i ]) / (fps_ratio_minus1 + 1 )
    else
        IlpRefPicSetStFoll1[layer][ k++ ] = (CurrPicPOC +
DeltaPocS1[layer][ StIlpRpsIdx ][ i ]) / (fps_ratio_minus1 + 1 )
    }
```

-continued

```
    NumIlpRpsStCurr1[layer] = j
    NumIlpRpsStFoll1[layer] = k
}
for(layer = layer_index − 1; layer >= 0; layer --) {
  for( i = 0, j = 0, k = 0; i < num_long_term_pics; i++ ) {
    if( used_by_curr_pic_ilp_lt_flag[layer][ i ] )
        IlpRpsLtCurr[layer][ j++ ] = ((CurrPicPOC − DeltaPocLt[layer][ i ])/ ( fps_ratio_minus1
+ 1 )+ MaxPicOrderCntLsb[layer] ) % MaxPicOrderCntLsb[layer]
    else
        IlpRpsLtFoll[layer][ k++ ] = ((CurrPicPOC − DeltaPocLt[layer][ i ])/ ( fps_ratio_minus1
+ 1 )+ MaxPicOrderCntLsb[layer] ) % MaxPicOrderCntLsb[layer]
  }
NumRpsLtCurr[layer] = j
NumRpsLtFoll[layer] = k
}
```

In some embodiments, MaxPicOrderCntLsb may be specified in HEVC Sequence parameter set semantics.

One or more embodiments contemplate that a co-located ILP reference picture whose deltaPOC may be zero may be counted as positive pictures, perhaps by default. In some embodiments, it could also be counted as negative pictures.

slice, there may be at least one ILP reference picture from the lower reference layer in IlpRpsStCurr0, IlpRpsStCurr1, and/or IlpRpsLtCurr.

In some embodiments, the following technique may be used to construct the initial IlpRefPicList0:

```
cIdx = 0
while( cIdx <= num_ilp_ref_idx_l0_active_minus1 )
{
  for(layer = layer_index −1; layer >= 0; layer --) {
    for( i=0; i < NumIlpRpsStCurr0[layer] && cIdx <= num_ilp_ref_idx_l0_active_minus1;
cIdx++, i++ )
      IlpRefPicList0[layer][ cIdx ] = IlpRpsStCurr0[layer][ i ]
  }
    for(layer = layer_index −1; layer >= 0; layer --) {
  for( i=0; i < NumIlpRpsStCurr1[layer] && cIdx <= num_ilp_ref_idx_l0_active_minus1;
cIdx++, i++ )
      IlpRefPicList0[layer][ cIdx ] = IlpRpsStCurr1[layer][ i ]
  }
  for(layer = layer_index −1; layer >= 0; layer --) {
    for( i=0; i < NumRpsLtCurr[layer] && cIdx <= num_ref_idx_10_active_minus1; cIdx++,
i++ )
      IlpRefPicList0[ cIdx ] = IlpRpsLtCurr[ i ]
  }
}
```

Some embodiments contemplate that a value of StIlpRpsIdx in the range from 0 to num_st_inter_layer_refpic_sets−1, inclusive, may indicate that a short-term inter-layer reference picture set from the active parameter set may be used. StIlpRpsIdx may be the index of the short-term inter-layer reference picture set to the list of short-term inter-layer reference picture sets in the order in which they may be signaled in the parameter set (e.g. Table 15). Some embodiments contemplate that StIlpRpsIdx equaling to num_st_inter_layer_ref_pic_sets may indicate that a short-term inter-layer reference picture that may be signaled (e.g. implicitly or explicitly) in the slice header (e.g. Table 21) may be used.

One or more embodiments contemplate that, perhaps after an inter-layer reference picture set may be derived, one or more, or all, inter-layer reference pictures that may be marked as "used for reference" that may not be included in the inter-layer reference picture set may be marked as "unused for reference", for example.

Embodiments contemplate one or more techniques for decoding ILP reference picture lists construction. In one or more embodiments, the decoding process for inter-layer prediction reference picture lists construction may be invoked at the beginning of the decoding process for one or more, or each P, or B slice. When decoding a P and/or B In some embodiments, the following procedure may be conducted to construct the initial IlpRefPicList1:

```
cIdx = 0
while( cIdx <= num_ilp_ref_idx_l1_active_minus1 )
{
  for(layer = layer_index −1; layer >= 0; layer −−) {
    for( i=0; i < NumIlpRpsCurr1[layer] && cIdx <=
num_ilp_ref_idx_l1_active_minus1; cIdx++, i++ )
      IlpRefPicList1[layer][ cIdx ] = IlpRpsCurr1[layer][ i ]
  }
  for(layer = layer_index −1; layer >= 0; layer −−) {
    for( i=0; i < NumIlpRpsCurr0[layer] && cIdx <=
num_ilp_ref_idx_l1_active_minus1; cIdx++, i++ )
      IlpRefPicList1[layer][ cIdx ] = IlpRpsCurr0[layer][ i ]
  }
}
```

In some embodiments, the default list order may be arranged by the layer index first, then the picture index. The list could also be arranged to be ordered by picture index first, then by the layer index, for example.

Embodiments contemplate that the modification of inter-layer reference lists can be carried out with the same reference picture lists modification process specified in HEVC for one or more, or each individual reference layer.

Table 22 below and Table 23 (illustrated in FIG. 8) are examples of layer-2 ILP reference picture sets and lists construction for the scalable coding structure shown in FIG. 7. The ILP reference pictures from layer-1 are indicated with an asterisk (*) and ILP reference pictures from layer-0 are indicated with two asterisks (**).

In this example, picture POC-0 from layer-1 may be set to be the long term ILP reference picture. The number of active entities of IlpRefPicList0 and IlpRefPicList1 may be set to maximum. One or more, or every ILP reference picture may be set to be used by the current picture.

The ILP reference picture list 0 may include the negative ILP reference pictures from layer-1, followed by negative ILP reference pictures from layer-0, then the positive ILP reference pictures (including co-located picture if available) from layer-1 and the positive ILP reference pictures from layer-0, and then the long-term ILP reference pictures (if available).

The ILP reference picture list 1 may include positive ILP reference pictures (including co-located picture if available) from layer-1, followed by positive ILP reference pictures from layer-0, then the negative ILP reference pictures from layer-1 and negative ILP reference pictures from layer-0.

HEVC scalable coding. In some embodiments, the PPS syntax structure may be the same as that illustrated in Table 9.

Embodiments contemplate a consolidated short-term reference picture set (stRPS) syntax for HEVC scalable coding. In some embodiments, the short-term reference picture set syntax may be the same as the example illustrated in Table 24. In some embodiments, the example of Table 24 may cover a short-term reference picture set for temporal picture prediction and/or inter-layer picture prediction, or both.

Some embodiments contemplate that rps_prediction_flag equaling 1 may specify (or indicate) that the current stRPS may be predicted from stRPS of a lower reference layer. Some embodiments contemplate that rps_prediction_flag equaling 0 may specify (or indicate) that a current stRPS may not be predicted from stRPS of a lower reference layer.

Some embodiments contemplate that abs_diff_layer_idx may specify (or indicate) the absolute difference between a current layer index and the reference layer index. Some embodiments contemplate that abs_diss_layer_idx may equal 0 if a current layer and a reference layer may be the same layer.

TABLE 22

Layer-2 ILP reference picture (POC) example

| Layer-2 POC | IlpRps (layer-1) | IlpRps (layer-0) | fps_ratio_minus1 | ILP reference picture POC (layer-1) | ILP reference picture POC (layer-0) |
|---|---|---|---|---|---|
| 0 | (0) | (0) | 1 | 0 | 0 |
| 8 | (−8, 0) | (−8, 0) | 1 | 0, 4 | 0, 4 |
| 4 | (−4, 0, 4) | (−4, 0, 4) | 1 | 0, 2, 4 | 0, 2, 4 |
| 2 | (−2, 0, 2, 6) | (−2, 0, 2, 6) | 1 | 0, 1, 2, 4 | 0, 1, 2, 4 |
| 1 | (−1, 1, 3, 7) | (−1, 1, 3, 7) | 1 | 0, 1, 2, 4 | 0, 1, 2, 4 |
| 3 | (−1, −3, 1, 5) | (−1, −3, 1, 5) | 1 | 1, 0, 2, 4 | 1, 0, 2, 4 |
| 6 | (−2, −4, −6, 0, 2) | (−2, −4, −6, 0, 2) | 1 | 2, 1, 0, 3, 4 | 2, 1, 0, 3, 4 |
| 5 | (−1, −5, 1, 3) | (−1, −5, 1, 3) | 1 | 2, 0, 3, 4 | 2, 0, 3, 4 |
| 7 | (−1, −3, −7, 1) | (−1, −3, −7, 1) | 1 | 3, 2, 0, 4 | 3, 2, 0,4 |

Embodiments contemplate combined temporal and/or inter-layer prediction signaling for HEVC scalable coding. As described herein, temporal reference picture signaling for HEVC scalable coding may specify the signaling supporting inter-layer prediction of temporal reference picture sets (RPS). As described herein, inter-layer reference picture signaling for HEVC scalable coding may specify the signaling supporting inter-layer picture prediction. Embodiments contemplate that at least two separate groups of reference picture sets and/or reference picture lists may be designed for different purposes. Some embodiments contemplate that stRPS and/or RefPicList0/1 may be designed for an inter-layer temporal RPS prediction. Some embodiments contemplate that stIlpRps and/or IlpRefPicList0/1 may be designed for inter-layer picture prediction.

One or more embodiments contemplate that separate reference picture lists may cause more complicated signaling in the slice level since one or more, or each, coding unit may add more syntax signaling to indicate which list (RefPicList0/1 or IlpRefPicList0/1) it may refer to, perhaps in order to consolidate the temporal and/or inter-layer picture prediction into an existing reference picture list framework.

Embodiments contemplate a consolidated sequence parameter set (SPS) syntax for HEVC scalable coding. In some embodiments, the SPS syntax structure may be the same as that illustrated in Table 12. Embodiments contemplate a consolidated picture parameter set (PPS) syntax for Some embodiments contemplate that fps_ratio_minus1 plus 1 may specify (or indicate) the frame rate ratio between the current layer and the reference layer. Some embodiments contemplate that fps_ratio_minus1 may equal 0 if the current layer and a reference layer may be the same layer.

Some embodiments contemplate that collocated ref_pic_present_flag equaling 1 may specify (or indicate) that a co-located reference picture from a lower reference layer may be included in the stRPS. Some embodiments contemplate that Collocated ref_pic_present_flag equaling 0 may specify (or indicate) that a co-located reference picture from a lower reference layer may not be included in the stRPS.

Some embodiments contemplate that colocated_ref_pic_used_by_curr_pic_s0_flag equaling 0 may specify (or indicate) that the co-located reference picture may not be used for an inter-layer prediction by the current picture, for example. Some embodiments contemplate that colocated_ref_pic_used_by_curr_pic_s1_flag equaling 0 may specify (or indicate) the co-located reference picture may not be used for inter-layer prediction by the current picture, for example.

Some embodiments contemplate that st_rps_ilp_flag equaling 0 may specify (or indicate) that no short term reference picture set that may be specified in the active parameter set of a corresponding reference layer may be used for a short term inter-layer reference picture set of a current layer. Some embodiments contemplate that st_rps_ilp_flag equaling 1 may specify (or indicate) that a short term reference picture set that may be specified in the active parameter set of a corresponding reference layer may be used for a short term inter-layer reference picture set of a current layer.

Some embodiments contemplate that short_term_ref_pic_ set_idx may specify the index to the short-term reference picture sets that may be specified in the active parameter set of a corresponding reference layer that may be used for creation of the short-term reference picture set of the current picture.

In some embodiments, the syntax num_negative_pics, num_positive_pics, delta_pc_s0, used_by_curr_pic_s0_flag, and/or used_by_curr_pic_s1_flag may be the same as specified in HEVC, for example.

TABLE 24

Consolidated short term reference picture set syntax

| | Descriptor |
|---|---|
| Short_term_ref_pic_set( idx) { | |
| rps_prediction_flag | u(1) |
| If (rps_prediction_flag) { | |
| abs_diff_layer_idx | ue(v) |
| fps_ratio_minus1 | ue(v) |
| colocated_ref_pic_present_flag | u(1) |
| If (colocated_ref_pic_present_flag) { | |
| colocated_ref_pic_used_by_curr_pic_s0_flag | u(1) |
| colocated_ref_pic_used_by_curr_pic_s1_flag | u(1) |
| } | |
| st_rps_ ilp_flag | u(1) |
| If (st_rps_ilp_flag) { | |
| short_term_ ref_pic_set_idx | u(v) |
| } | |
| } | |
| else ( | |
| abs_diff_layer_idx | ue(v) |
| fps_ratio_minus1 | ue(v) |
| num_negative_pics | ue(v) |
| num_positive_pics | ue(v) |
| for( i = 0; i < num_negative_pics; i++ ) { | |
| delta_poc_s0 [ i ] | ue(v) |
| used_by_curr_pic_s0_flag[ i ] | u(1) |
| } | |
| for( i = 0; i < num_positive_pics; i++ ) { | |
| delta_poc_s1[ i ] | ue(v) |
| used_by_curr_pic_s1_flag[ i ] | u(1) |
| } | |
| } | |
| } | |

Embodiments contemplate a consolidated slice header syntax for HEVC scalable coding. An exemplary consolidated slice header is show in Table 25. Among other parameters, embodiments contemplate that at least two signals "abs_diff_layer_idx" and "fps_ratio_minus1" may be added into long term reference pictures. The semantics of these two signals may be the same as described herein.

TABLE 25

Exemplary Consolidated slice header syntax supporting scalable enhancement extension of HEVC

| | | Descriptor |
|---|---|---|
| | slice_header( ) { | |
| | lightweight_slice_flag | u(1) |
| | if( !lightweight_slice_flag ) { | |
| | slice_type | ue(v) |
| | pic_parameter_set_id | ue(v) |
| | if( IdrPicFlag ) { | |
| | idr_pic_id | ue(v) |
| | no_output_of_prior_pics_flag | u(1) |
| | } | |
| | else { | |
| | pic_order_cnt_lsb | u(v) |
| ** | short_term_ref_pic_set_pps_flag | u(1) |
| ** | if( !short_term_ref_pic_set_pps_flag ) | |
| ** | short_term_ref_pic_set( num_short_term_ref_pic_sets ) | |
| ** | else | |
| ** | short_term_ref_pic_set_idx | u(v) |
| ** | if( long_term_ref_pics_present_flag ) { | |
| ** | num_long_term_pics | ue(v) |
| ** | for( 1 = 0; i < num_long_term_pics; 1++ ) { | |
| | abs_diff_layer_idx | ue(v) |
| | fps_ratio_minus1 | ue(v) |
| ** | delta_poc_lsb_lt_minus1[ i ] | ue(v) |
| ** | used_by_curr_pic_lt_flag[ i ] | u(1) |
| | } | |
| | } | |
| | if( slice_type = = P \| \| slice_type = = B ) { | |
| | num_ref_idx_active_override_flag | u(1) |
| | if( num_ref_idx_active_override_flag ) { | |
| | num_ref_idx_l0_active_minus1 | ue(v) |
| | if( slice_type = = B ) | |
| | num_ref_idx_l1_active_minus1 | ue(v) |
| | } | |
| | } | |
| | ref_pic_list_modification( ) | |
| | ref_pic_list_combination( ) | |
| | } | |
| | if( entropy_coding_mode_flag && slice_type != I) | |
| | cabac_init_idc | ue(v) |
| | first_slice_in_pic_flag | u(1) |
| | if( first_slice_in_pic_flag == 0 ) | |
| | slice _address | u(1) |
| | if( !lightweight_slice_flag ) { | |
| | slice_qp_delta | se(v) |
| | if( sample_adaptive_offset_enabled_flag ) | |
| | sao_param( ) | |
| | if( deblocking_filter_control_present_flag ) { | |
| | disable_deblocking_filter_idc | |
| | if( disable_deblocking_filter_idc != 1 ) { | |
| | slice_alpha_c0_offset_div2 | |
| | slice _beta_offset_div2 | |
| | } | |
| | } | |
| | if( slice_type = = B ) | |
| | collocated_from_l0_flag | u(1) |
| | if( adaptive_loop_filter_enabled_flag ) { | |
| | if( !shared_pps_info_enabled_flag ) | |
| | alf_param( ) | |
| | alf_cu_control_param( ) | |
| | } | |
| | } | |
| | } | |

Embodiments contemplate one or more consolidated reference lists construction techniques. The construction process of two additional ILP reference picture lists (IlpRefPicList0 and IlpRefPicList1) is described herein. Because the consolidated short-term and long term reference picture set can be applied to picture predictions within the same layer and/or across different layers, or both, the reference picture lists can also be consolidated to include the reference pictures from the current layer for temporal prediction, and/or the reference pictures from lower reference layers for inter-layer prediction.

One or more embodiments contemplate the variables defined as follows:

```
If (!rps__prediction__flag ) {
   NumNegativePics[currLayer][idx] = num__negative__pics;
   NumPositivePics[currLayer][idx] = num__positive__pics;
   UsedByCurrPicS0[currLayer][idx][i] = used__by__curr__pic__s0__flag[i];
   UsedByCurrPicS1[currLayer][idx][i] = used__by__curr__pic__s1__flag[i];
}
else {  refLayer = currLayer – abs__diff__ref__layer__idx;
        rpsIdx = short__term__ ref__pic__set__idx;
        NumNegativePics[currLayer][idx] = NumNegativePics[refLayer][ rps__idx];
        NumPositivePics[currLayer][idx] = NumpositivePics[refLayer][ rps__idx];
        UsedByCurrPicS0[currLayer][idx][i] = used__by__curr__pic__s0__flag[refLayer][ rps__idx] [i];
        UsedByCurrPicS1[currLayer][idx][i] = used__by__curr__pic__s1__flag[refLayer][ rps__idx] [i];
        If (collocated__ref__pic__present__flag) {
           NumPositivePics[currLayer][idx] ++;
           UsedByCurrPicS0[currLayer][idx][i] =
colocated__ref__pic__used__by__curr__pic__s0__flag[idx][i];
           UsedByCurrPicS1[currLayer][idx][i] =
colocated__ref__pic__used__by__curr__pic__s1__flag[idx][i];
}
```

One or more embodiments contemplate that the reference picture set may include at least six subsets, namely RpsStCurr0, RpsStCurr1, RpsStFoll0, RpsStFoll1, RpsLtCurr, and/or RpsLtFoll.

In some embodiments, RpsStCurr0 may include one or more, or all, reference pictures that may be prior to the current picture in decoding order and/or output order from a current or a lower reference layer, and that may be used in a temporal or an inter-layer prediction of the current picture.

In some embodiments, RpsStCurr1 may include one or more, or all, reference pictures that may be prior to the current picture in decoding order, that may succeed the current picture in output order from a current layer and/or a lower reference layer, and that may be used in a temporal or an inter-layer prediction of the current picture.

In some embodiments, RpsStFoll0 may include one or more, or all, reference pictures that may be prior to the current picture in decoding order and/or output order from a current or a lower reference layer, that may be used in a temporal or an inter-layer prediction of one or more of the pictures following the current picture in a decoding order, and that may not be used in a temporal or an inter-layer prediction of the current picture.

In some embodiments, RpsStFoll1 may include one or more, or all, reference pictures that may be prior to the current picture in a decoding order, that may succeed the current picture in an output order from a current or a lower reference layer, that may be used in a temporal or an inter-layer prediction of one or more of the pictures following the current picture in the decoding order, and that may not be used in a temporal or an inter-layer prediction of the current picture.

In some embodiments, RpsLtCurr may include one or more, or all, long term ILP reference pictures that may be used in a temporal or an inter-layer prediction of the current picture.

In some embodiments, RpsLtFoll may include one or more, or all, long term ILP reference pictures that are not used in temporal or inter-layer prediction of the current picture.

In some embodiments, the number of entries in RpsStCurr0, RpsStCurr1, RpsStFoll0, RpsStFoll1, RpsLtCurr, and/or RpsLtFoll may be NumRpsStCurr0, NumRpsStCurr1, NumRpsStFoll0, NumRpsStFoll1, NumRpsLtCurr, and/or NumRpsLtFoll respectively.

One or more embodiments contemplate that the following may apply for derivation of the at least six subsets and/or the numbers of entries:

```
for(layer = currLayer; layer >= 0; layer --) {
   for( i = 0, j = 0, k = 0; i < NumNegativePics[currLayer][ stRpsIdx ] ; i++ ) {
      if( UsedByCurrPicS0[currLayer][stRpsIdx ][ i ] )
         RpsStCurr0[currLayer][ j++ ] = (CurrPicPOC + DeltaPocS0[currLayer][ stRpsIdx ][ i ])/ (
fps__ratio__minus1 + 1 )
      else
           RpsStFoll0[currLayer][ k++ ] = (CurrPicPOC + DeltaPocS0[currLayer][ stRpsIdx ][ i ])/
( fps__ratio__minus1 + 1 )
   }
   NumRpsStCurr0 [currLayer]= j
   NumRpsStFoll0[currLayer] = k
}
for(layer = currLayer; layer >= 0; layer --) {
    for( i = 0, j = 0, k = 0; i < NumPositivePics[currLayer][ stRpsIdx ]; i++ ) {
      if( UsedByCurrPicS1[currLayer][stRpsIdx ][ i ] )
           RefPicSetStCurr1[currLayer][ j++ ] = (CurrPicPOC +
DeltaPocS1[currLayer][ stRpsIdx ][ i ]) / ( fps__ratio__minus1 + 1 )
      else
           efPicSetStFoll1[currLayer][ k++ ] = (CurrPicPOC +
DeltaPocS1[currLayer][ stRpsIdx ][ i ]) / ( fps__ratio__minus1 + 1 )
      }
    NumRpsStCurr1[currLayer] = j
    NumRpsStFoll1[currLayer] = k
}
for(layer = currLayer; layer >= 0; layer --) {
   for( i = 0, j = 0, k = 0; i < num__long__term__pics; i++ ) {
      if( used__by__curr__pic__ lt__flag[layer][ i ] )
```

-continued

```
        RpsLtCurr[currLayer][ j++ ] = ((CurrPicPOC − DeltaPocLt[currLayer][ i ] +
MaxPicOrderCntLsb[currLayer] ) / ( fps_ratio_minus1 + 1 )) %
(MaxPicOrderCntLsb[currLayer] / ( fps_ratio_minus1 + 1 ))
    else
        RpsLtFoll[currLayer][ k++ ] = ((CurrPicPOC − DeltaPocLt[currLayer][ i ] +
MaxPicOrderCntLsb[currLayer] ) / ( fps_ratio_minus1 + 1 )) %
MaxPicOrderCntLsb[currLayer]
  }
NumRpsLtCurr[layer] = j
NumRpsLtFoll[layer] = k
}
```

In some embodiments, MaxPicOrderCntLsb may be specified in HEVC Sequence parameter set semantics.

One or more embodiments contemplate that the following exemplary technique may be conducted to construct the RefPicList0:

```
cIdx = 0
while( cIdx <= num_ref_idx_l0_active_minus1 )
{
  for(layer = currLayer; layer >= 0; layer −−) {
    for( i=0; i < NumRpsStCurr0[currlayer] && cIdx <= num_ref_idx_l0_active_minus1;
cIdx++, i++ )
      RefPicList0[currLayer][ cIdx ] = RpsStCurr0[Layer][ i ]
  }
  for(layer = currLayer; layer >= 0; layer −−) {
    for( i=0; i < NumRpsStCurr1[layer] && cIdx <= num_ref_idx_l0_active_minus1; cIdx++,
i++ )
      RefPicList0[currLayer][ cIdx ] =RpsStCurr1[layer][ i ]
  }
  for(layer = currLayer; layer >= 0; layer −−) {
    for( i=0; i < NumRpsLtCurr[layer] && cIdx <= num_ref_idx_l0_active_minus1; cIdx++,
i++ )
      RefPicList0[currLayer][ cIdx ] = RpsLtCurr[layer][ i ]
  }
}
```

One or more embodiments contemplate that the following technique may be conducted to construct the initial RefPicList1:

```
cIdx = 0
while( cIdx <= num_ref_idx_l1_active_minus1 )
{
  for(layer = currLayer; layer >= 0; layer −−) {
    for( i=0; i < NumRpsCurr1[layer] && cIdx <= num_ref_idx_l1_active_minus1;
cIdx++, i++ )
      RefPicList1[currLayer][ cIdx ] = RpsCurr1[layer][ i ]
  }
  for(layer = currLayer; layer >= 0; layer −−) {
    for( i=0; i < NumRpsCurr0[layer] && cIdx <= num_ilp_ref_idx_l1_active_minus1;
cIdx++, i++ )
      RefPicList1[currLayer][ cIdx ] = RpsCurr0[layer][ i ]
  }
}
```

Table 26 and Table 27 (illustrated in FIG. 9) are examples of layer-2 consolidated reference picture sets and lists construction for the scalable coding structure shown in FIG. 7. The temporal reference pictures from layer-2 are indicated with one asterisk (*), the reference pictures from layer-1 are indicated with two asterisks () and reference pictures from layer-0 are indicated (*).

In this example, picture POC-0 from layer-1 may be set to be the long term ILP reference picture. The number of active entities of RefPicList0 and/or RefPicList1 may be set to a maximum so that one or more, or all, reference pictures in the reference picture set can be included into the lists. Also, one or more, or all, reference pictures may be set to be used by a current picture.

The reference picture list 0 may include negative reference pictures from a current layer, a layer-1 and/or a layer-0, then followed by the positive ILP reference pictures (including co-located picture if available) from a current layer, a layer-1 and a layer-0, and then (in some embodiments perhaps last) the long-term ILP reference pictures, if available, for example.

The reference picture list 1 may include positive reference pictures from a current layer-2, a layer-1, and/or a layer-0

(including co-located picture of layer-1 and layer-0, if available), then followed by the negative reference pictures from a current layer-2, a layer-1, and/or layer-0.

One or more embodiments contemplate that the default reference picture construction can also be ordered by the index of reference picture in the reference picture subset. For example, the first negative picture of one or more, or each, layer's RPS can be included into the list0 first, then followed by the second negative pictures of one or more, or each, layer's RPS, and so on, for example. Taking layer-2 POC 6 as an example, the default lists from Table 27 may be like RefPicList0={4*, 2*, 0*, 2, 1, 2*, 1*, 0***, 8*, 3, 4, 3*, 4*}. Alternatively or additionally, it could also be constructed like this: RefPicList0={4*, 2, 2*, 2*, 1, 1*, 0*, 0***, 8*, 3, 3*, 4, 4*}. In some embodiments, the same construction order can applied to RefPicList1 as well, for example.

cable and terrestrial transmission channels), more and more other video applications, such as video chat, mobile video, and streaming video, maybe deployed in heterogeneous environments. Such heterogeneity may exist on the clients' side as well as in the network. On the client side, the three-screen scenario (e.g., smart phone, tablet, and/or TV) is an example. On the network side, video may be transmitted across the Internet, WiFi networks, mobile (3G and 4G) networks, and/or any combination of them. To improve the user experience and/or video quality of service, among other benefits, embodiments contemplate scalable video coding. In some embodiments, scalable video coding may involve encoding the signal into multiple streams at an overall high resolution, while enabling decoding from subsets of the streams depending on the specific rate and resolution that may be useful (or in some embodiments required by) a certain application and supported by the client device.

TABLE 26

Layer-2 reference pictures (POC) example including both temporal and inter-layer prediction

| Layer-2 POC | RPS (layer-2) | RPS (layer-1) | RPS (layer-0) | Reference picture POC (layer-2) * | reference picture POC (layer-1) ** | reference picture POC (layer-0) *** |
|---|---|---|---|---|---|---|
| 0 | — | (0) | (0) | — | 0 | 0 |
| 8 | (−8) | (−8, 0) | (−8, 0) | 0 | 0, 4 | 0, 4 |
| 4 | (−4, 4) | (−4, 0, 4) | (−4, 0, 4) | 0, 8 | 0, 2, 4 | 0, 2, 4 |
| 2 | (−2, 2, 6) | (−2, 0, 2, 6) | (−2, 0, 2, 6) | 0, 4, 8 | 0, 1, 2, 4 | 0, 1, 2, 4 |
| 1 | (−1, 1, 3, 7) | (−1, 1, 3, 7) | (−1, 1, 3, 7) | 0, 2, 4, 8 | 0, 1, 2, 4 | 0, 1, 2, 4 |
| 3 | (−1, −3, 1, 5) | (−1, −3, 1, 5) | (−1, −3, 1, 5) | 2, 0, 4, 8 | 1, 0, 2, 4 | 1, 0, 2, 4 |
| 6 | (−2, −4, −6, 2) | (−2, −4, −6, 0, 2) | (−2, −4, −6, 0, 2) | 4, 2, 0, 8 | 2, 1, 0, 3, 4 | 2, 1, 0, 3, 4 |
| 5 | (−1, −5, 1, 3) | (−1, −5, 1, 3) | (−1, −5, 1, 3) | 4, 0, 6, 8 | 2, 0, 3, 4 | 2, 0, 3, 4 |
| 7 | (−1, −3, −7, 1) | (−1, −3, −7, 1) | (−1, −3, −7, 1) | 6, 4, 0, 8 | 3, 2, 0, 4 | 3, 2, 0, 4 |

Embodiments recognize that video coding systems may be used to compress digital video signals to reduce the storage need and/or transmission bandwidth of such signals. Embodiments recognize various types of video coding systems, such as block-based, wavelet-based, and object-based systems, and/or block-based hybrid video coding systems. Examples of block-based video coding systems include international video coding standards such as the MPEG1/2/4 part 2, H.264/MPEG-4 part 10 AVC and VC-1 standards. Embodiments contemplate that digital video capabilities can be incorporated into a wide range of devices, including digital televisions, digital direct broadcast systems, wireless broadcast systems, personal digital assistants (PDAs), laptop or desktop computers, digital cameras, digital recording devices, video gaming devices, video game consoles, cellular, and/or satellite radio telephones, and the like. Embodiments recognize that many digital video devices may implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently. Embodiment recognize that wireless communications technology may increase the wireless bandwidth and may improve the quality of service for users of mobile devices, and embodiments also recognize the fast-growing demand of video content, such as high-definition (HD) video content, over mobile Internet imparts challenges for mobile video content providers, distributors, and carrier service providers.

Embodiments recognize that, perhaps compared to digital video services (such as sending TV signals over satellite, Some embodiments contemplate that the term "resolution" may be defined by a number of video parameters, including but not limited to, spatial resolution (e.g. picture size), temporal resolution (e.g. frame rate), and/or video quality (e.g. subjective quality such as MOS, and/or objective quality such as PSNR or SSIM or VQM). Embodiments also contemplate other video parameters such as chroma format (e.g. such as YUV420 or YUV422 or YUV444), bit-depth (e.g. such as 8-bit or 10-bit video), and/or aspect ratio (e.g. 16:9 or 4:3). Embodiments recognize that international video standards MPEG-2 Video, H.263, MPEG4 Visual and H.264 may have tools and/or profiles that may support scalability modes. Scalable coding may include at least temporal scalability (e.g. the scalable bitstream may contain video signals at one or more frame rates), spatial scalability (e.g. the scalable bitstream may contain signals at one or more spatial resolutions), and/or quality scalability (e.g. the scalable bitstream may contain signals at one or more quality levels). Additionally, view scalability (e.g. the scalable bitstream may contain 2D and/or 3D video signals) may be included. Without loss of generality, although spatial scalability may be used to describe one or more scalable HEVC embodiments, the contemplate embodiments described herein may be extended to other types of scalabilities (e.g. such as quality scalability, or others as described herein).

Figure 10:
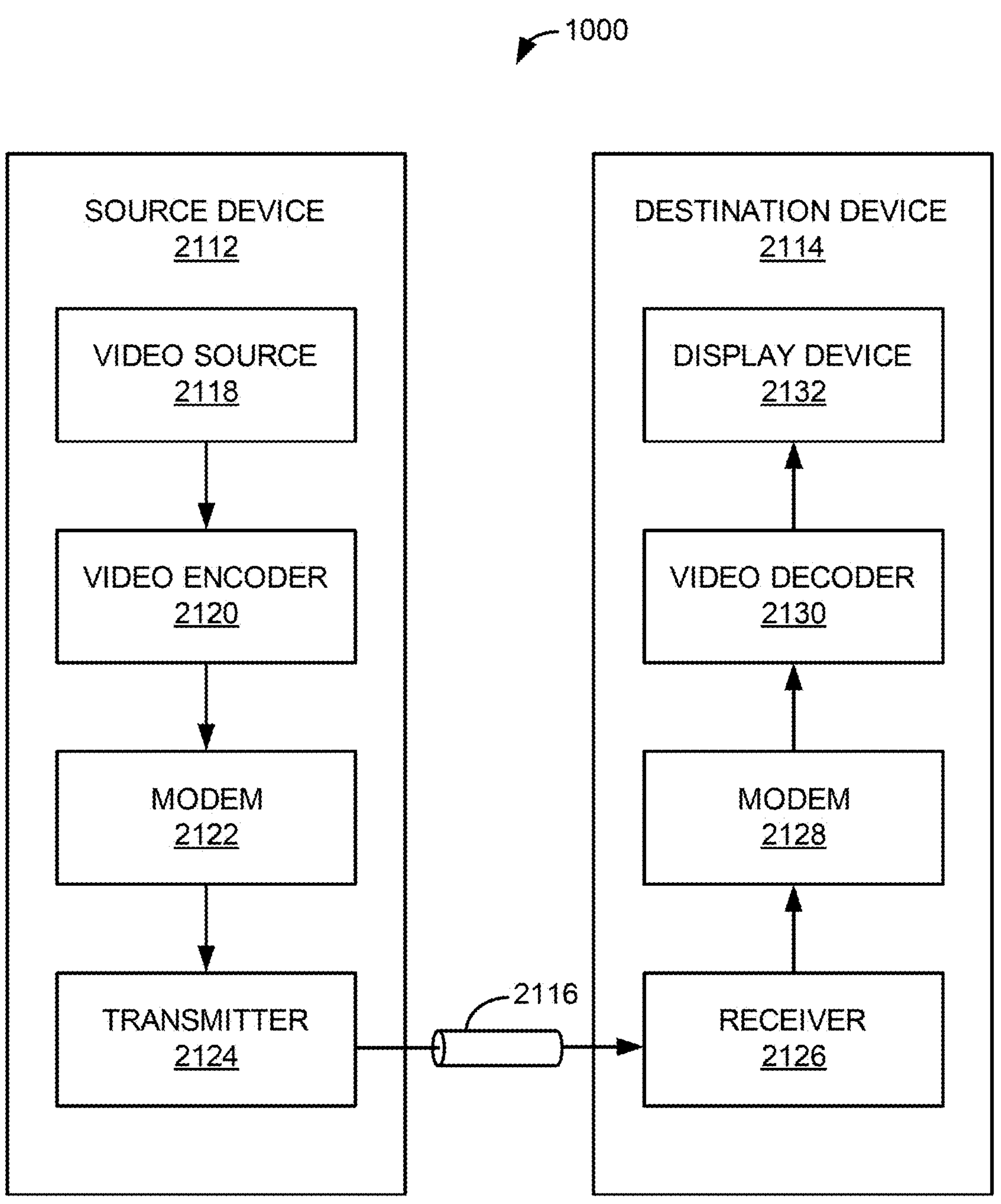
FIG. 10 is a block diagram illustrating an example video encoding and decoding system that may utilize the motion prediction techniques contemplate by embodiments.

FIG. 10 is a block diagram illustrating an example video encoding and decoding system 1000 that may utilize the video encoding/decoding techniques described herein. As shown in FIG. 10, system 1000 includes a source device 2112 that may transmit encoded video to a destination device 2114 via a communication channel 2116. Source device 2112 and/or destination device 2114 may comprise any of a wide range of devices. In some cases, source device 2112 and/or destination device 2114 may comprise wireless receive/transmit units (WRTUs), such as wireless handsets or any wireless devices that can communicate video information over a communication channel 2116, in which case communication channel 2116 may be wireless. The systems and methods described herein are not limited to wireless applications or settings. For example, these techniques may apply to over-the-air television broadcasts, cable television transmissions, satellite television transmissions, Internet video transmissions, encoded digital video on a storage medium (such as DVD or SD card, for example), and/or other scenarios. Accordingly, communication channel 2116 may include any combination of wireless or wired media suitable for transmission of encoded video data.

In the example of FIG. 10, source device 2112 may include a video source 2118, video encoder 2120, a modulator (e.g. a modem) 2122 and/or a transmitter 2124. Destination device 2114 may include a receiver 2126, a demodulator (e.g. a modem) 2128, a video decoder 2130, and/or a display device 2132. In one or more embodiments, video encoder 2120 of source device 2112 may be configured to apply the motion prediction techniques described herein. In other examples, a source device and a destination device may include other components or arrangements. For example, source device 2112 may receive video data from an external video source 2118, such as an external camera. Likewise, destination device 2114 may interface with an external display device, rather than including an integrated display device. In some embodiments, the data stream generated by the video encoder may be conveyed to other devices without modulating the data onto a carrier signal, such as by direct digital transfer, where the other devices may or may not modulate the data for transmission.

The techniques described herein may be performed by any digital video encoding and/or decoding device. As such, the systems and methods described herein may be used with video data coded for, without limitation, wireless transmissions, wired transmissions and/or accessible from a storage medium. Furthermore, although the techniques of this disclosure may be performed by a video encoding device, the techniques may also be performed by a video encoder/decoder, which may be referred to as a "CODEC." Moreover, the techniques of this disclosure may also be performed by a video processor and/or preprocessor. Source device 2112 and/or destination device 2114 are examples of such coding devices in which source device 2112 may generate coded video data for transmission to destination device 2114. In some examples, devices 2112, 2114 may operate in a substantially symmetrical manner such that each of devices 2112, 2114 may include video encoding and decoding components. In some embodiments, system 1000 may support one-way or two-way video transmission between devices 2112, 2114, e.g., for video streaming, video playback, video broadcasting, and/or video telephony. In some embodiments, the source device may be a video streaming server for generating encoded video data for one or more destination devices, where the destination devices may be in communication with the source device over wired and/or wireless communication systems.

Video source 2118 of source device 2112 may include a video capture device, such as a video camera, a video archive containing previously captured video, and/or a video feed from a video content provider. In some embodiments, video source 2118 may generate computer graphics-based data as the source video, or a combination of live video, archived video, and/or computer-generated video. In some cases, if video source 2118 is a video camera, source device 2112 and/or destination device 2114 may form so-called camera phones and/or video phones. In a further transcoding embodiment, source 2118 may be an encoded bitstream that may conform to another video standard, such as H.264 for example. The encoder 2120 may include an initial decoding stage to obtain uncoded video data that may then be encoded according to the techniques described herein. As mentioned, the techniques described in this disclosure may be applicable to video coding in general, and may be applied to wireless and/or wired applications. In some embodiments, the captured, pre-captured, decoded, and/or computer-generated video may be encoded by video encoder 2120. The encoded video information may then be modulated by modem 2122 according to a communication standard, and may be transmitted to destination device 2114 via transmitter 2124. Modem 2122 may include various mixers, filters, amplifiers or other components designed for signal modulation. Transmitter 2124 may include circuits designed for transmitting data, including amplifiers, filters, and one or more antennas.

Receiver 2126 of destination device 2114 may receive information over channel 2116, and modem 2128 may demodulate the information. The video decoding process may implement one or more of the techniques described herein. The information communicated over channel 2116 may include syntax information defined by video encoder 2120, which may also be used by video decoder 2130, that may include syntax elements that may describe characteristics and/or processing of video blocks and/or other coded units, e.g., GOPs. Display device 2132 may display the decoded video data to a user, and may comprise any of a variety of display devices such as a cathode ray tube (CRT), a liquid crystal display (LCD), a plasma display, an organic light emitting diode (OLED) display, and/or another type of display device.

In the example of FIG. 10, communication channel 2116 may comprise any wireless or wired communication medium, such as a radio frequency (RF) spectrum or one or more physical transmission lines, and/or any combination of wireless and wired media. Communication channel 2116 may form part of a packet-based network, such as a local area network, a wide-area network, or a global network such as the Internet. Communication channel 2116 may represent any suitable communication medium, and/or collection of different communication media, for transmitting video data from source device 2112 to destination device 2114, including any suitable combination of wired or wireless media. Communication channel 2116 may include routers, switches, base stations, and/or any other equipment that may be useful to facilitate communication from source device 2112 to destination device 2114.

Video encoder 2120 and/or video decoder 2130 may operate according to a video compression standard, such as the next generation video coding standard HEVC currently being developed by the JCT-VC. The techniques of this disclosure are not limited to any particular coding standard. Although not shown in FIG. 10, in some aspects, video encoder 2120 and/or video decoder 2130 may each be integrated with an audio encoder and decoder, and may include appropriate MUX-DEMUX units, or other hardware and software, to handle encoding of both audio and video in a common data stream or separate data streams. In some embodiments, MUX-DEMUX units may conform to the ITU H.223 multiplexer protocol, or other protocols such as the user datagram protocol (UDP).

Video encoder 2120 and/or video decoder 2130 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. One or more, or each, of video encoder 2120 and/or video decoder 2130 may be included in one or more encoders or decoders, either of which may be integrated as part of a combined encoder/decoder (CODEC) in a respective camera, computer, mobile device, subscriber device, broadcast device, set-top box, server, media aware network element, or the like.

In some embodiments, a video sequence may include a series of video frames. A group of pictures (GOP) may comprise a series of one or more video frames. A GOP may include syntax data in a header of the GOP, a header of one or more frames of the GOP, or elsewhere, that may describe a number of frames that may be included in the GOP. One or more, or each, frame may include frame syntax data that may describe an encoding mode for the respective frame. Video encoder 2120 may operate on video blocks within individual video frames, perhaps in order to encode the video data. The video blocks may have fixed or varying sizes, and may differ in size according to a specified coding standard. One or more, or each video frame may include a plurality of slices. One or more, or each, slice may include a plurality of video blocks.

Figure 11:
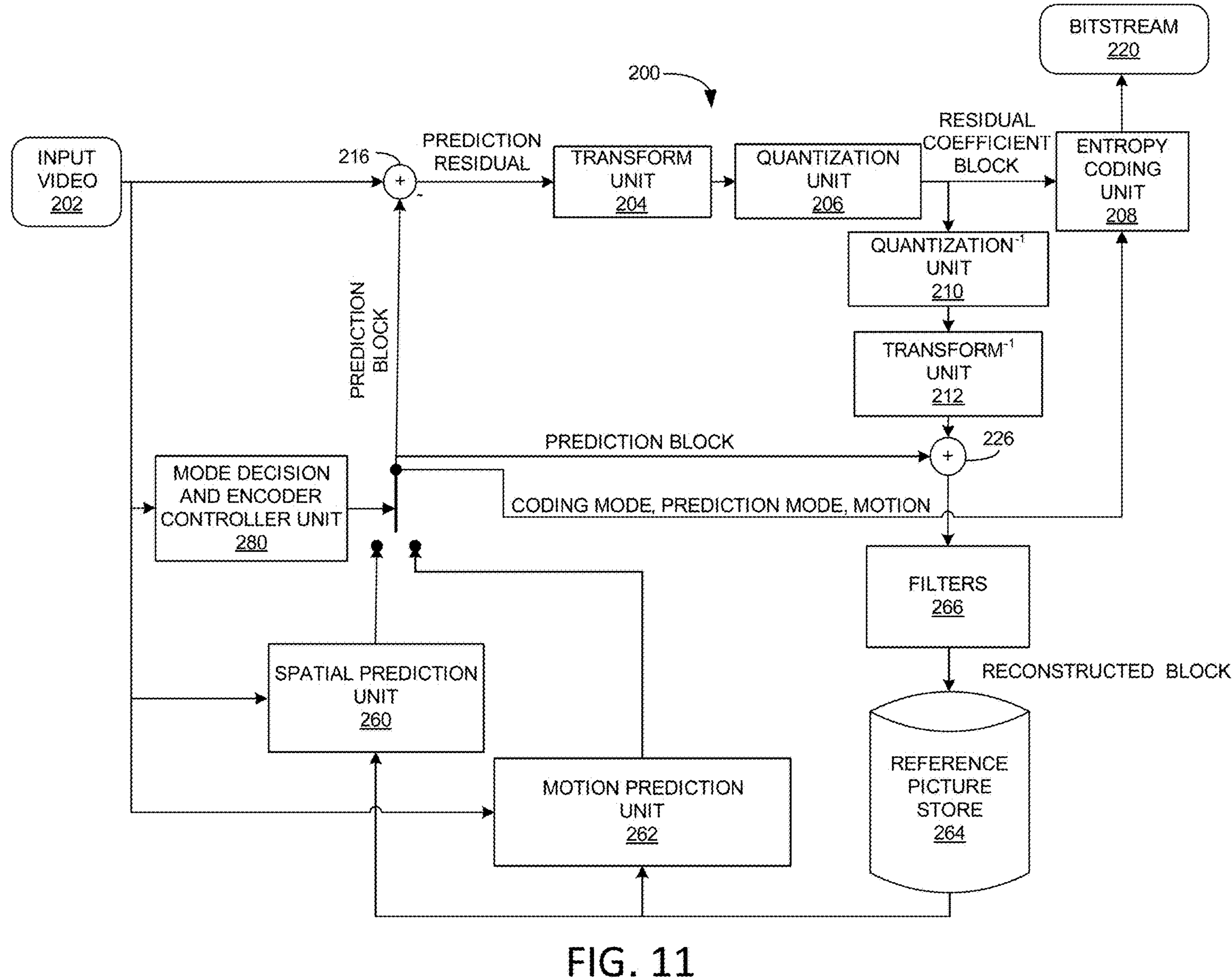
FIG. 11 and FIG. 12 are example block diagrams of portions of a video encoder and decoder consistent with embodiments.

FIG. 11 is a block diagram illustrating an example of video encoder 200 that may be used to implement the various individual layers of the scalable video encoding systems and methods described herein. Video encoder 200 may perform intra- and inter-coding of blocks within video frames, including video blocks, or partitions or sub-partitions of video blocks. Intra-coding may use spatial prediction to reduce and/or remove spatial redundancy in video within a given video frame. Inter-coding may use temporal prediction to reduce and/or remove temporal redundancy in video within adjacent frames of a video sequence. Intra-mode (e.g. I-mode) may refer to any of several spatial based compression modes and/or inter-modes such as uni-directional prediction (e.g. P-mode) or bi-directional prediction (e.g. B-mode) and/or may refer to any of several temporal-based compression modes.

In some embodiments, the input video signal 202 may be processed block by block. The video block unit may be 16 pixels by 16 pixels (e.g. a macroblock (MB)). Embodiments recognize that JCT-VC (Joint Collaborative Team on Video Coding) of ITU-T/SG16/Q.6/VCEG and ISO/IEC/MPEG may be developing the next generation video coding standard called High Efficiency Video Coding (HEVC). In HEVC, extended block sizes (called a “coding unit” or CU) may be used to compress high resolution (1080p and beyond) video signals more efficiently. In HEVC, a CU can be up to 64×64 pixels and down to 4×4 pixels. A CU can be further partitioned into prediction units or PU, for which separate prediction methods may be applied. One or more, or each, input video block (MB, CU, PU, etc.) may be processed by using spatial prediction unit 260 and/or temporal prediction unit 262.

In some embodiments, spatial prediction (e.g., intra prediction) may use pixels from the already coded neighboring blocks in the same video picture/slice to predict the current video block. Spatial prediction may reduce spatial redundancy that may be inherent in the video signal. Temporal prediction (e.g. inter prediction or motion compensated prediction) may use pixels from the already coded video pictures to predict the current video block. Temporal prediction may reduce temporal redundancy that may be inherent in the video signal. Temporal prediction for a given video block may be signaled by one or more motion vectors which may indicate the amount and/or the direction of motion between the current block and one or more of its reference block(s).

In some embodiments, perhaps if multiple reference pictures may be supported (e.g. the case for the recent video coding standards such as H.264/AVC or HEVC), then for one or more, or each, video block, its reference picture index may also be sent. The reference index may be used to identify from which reference picture in the reference picture store 264 the temporal prediction signal may come. After spatial and/or temporal and/or inter-layer prediction, the mode decision and/or encoder controller 280 in the encoder may choose the prediction mode, for example based, at least in part, on a rate-distortion optimization technique. The prediction block may be subtracted from the current video block at adder 216 and/or the prediction residual may be transformed by transformation unit 204 and/or quantized by quantization unit 206. The quantized residual coefficients may be inverse quantized at inverse quantization unit 210 and may be inverse transformed at inverse transformation unit 212 to form the reconstructed residual. The reconstructed block may be added back to the prediction block at adder 226 to form the reconstructed video block. Further in-loop filtering, such as deblocking filter and/or adaptive loop filters 266, may be applied on the reconstructed video block, perhaps before it may be put in the reference picture store 264 and may be used to code future video blocks. To form the output video bitstream 220, among other objectives, coding mode (e.g. inter or intra), prediction mode information, motion information, and/or quantized residual coefficients may be sent to the entropy coding unit 208 and may be further compressed and/or may be packed to form the bitstream 220.

Figure 12:
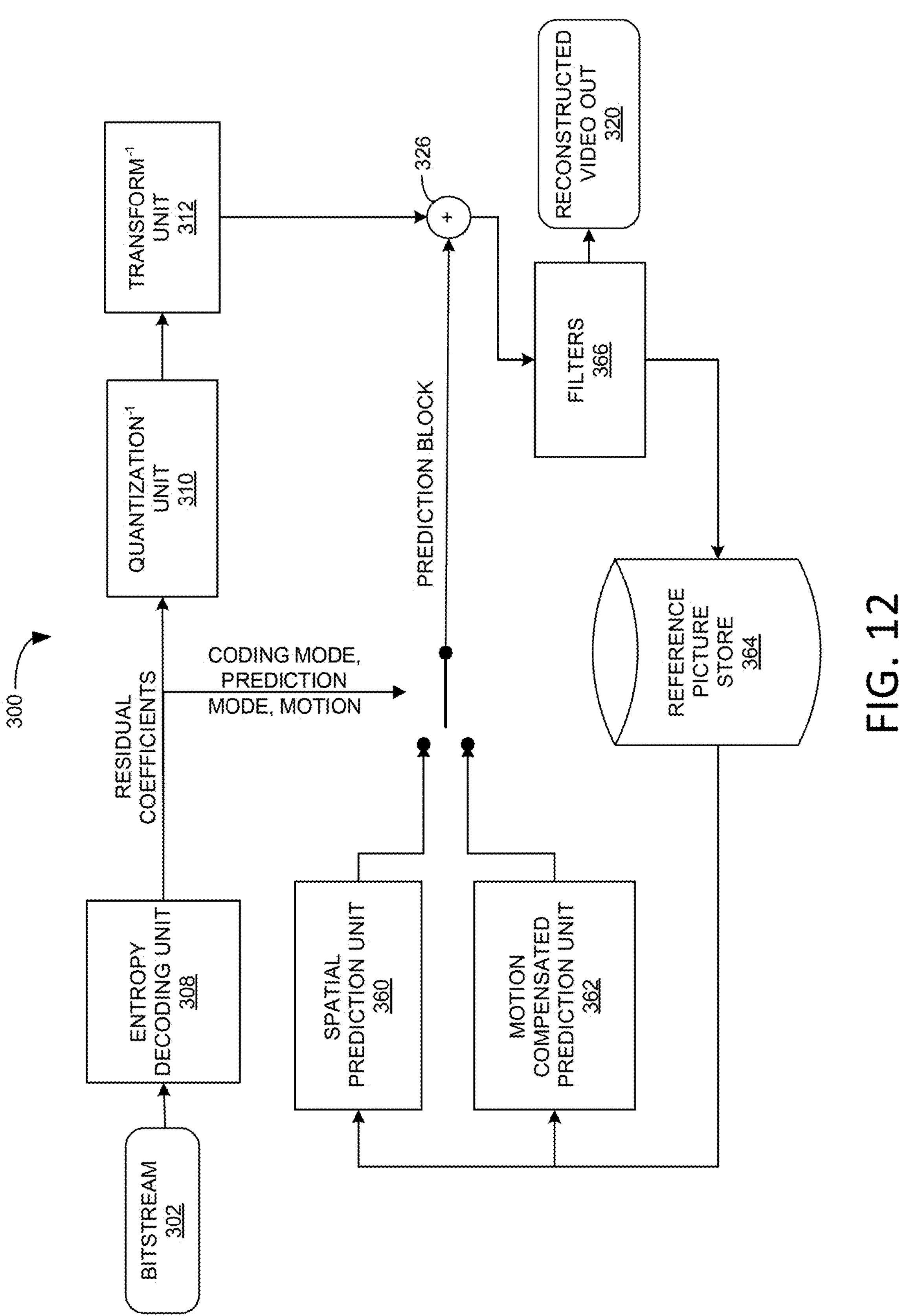

FIG. 12 is a block diagram of a block-based video decoder that may be used in one or more embodiments to decode one or more, or each, of the various layers of a scalable video encoded stream. The video bitstream 302 for the corresponding layer may be unpacked and/or entropy decoded at entropy decoding unit 308. The coding mode and/or prediction information may be sent to either the spatial prediction unit 360 (e.g. if intra coded) and/or the temporal prediction unit 362 (e.g. if inter coded) to form the prediction block. The residual transform coefficients may be sent to inverse quantization unit 310 and/or inverse transform unit 312 where they may be used to reconstruct the residual block. The prediction block and/or the residual block may be added together at 326. The reconstructed block may further go through in-loop filtering unit 366 before it may be stored in reference picture store 364. The reconstructed video 320 may be sent out to drive a display device, and/or may be used to predict future video blocks.

In some embodiments, the systems and methods described herein may be applied to video blocks of various shapes and sizes. In at least one embodiment, for example, a block may be set to a block of 16×16 pixels (e.g. a macroblock), or a Coding Unit of a given size anywhere between the Largest Coding Unit (LCU) to the Smallest Coding Unit (SCU), and/or a block of non-square size. Furthermore, the encoder may adopt any block shape and/or size that may enable more accurate weight and offset calculation. In some embodiments, the encoder may perform a top-level analysis of different regions within a picture, adopt different block shapes/sizes across different regions in the picture, and/or apply the techniques described herein to such varying block sizes.

In one or more embodiments, a Reference Picture Set (RPS) may be a set of reference pictures associated with a picture, including one or more, or all, reference pictures that may be prior to the associated picture in decoding order, that may be used for inter prediction of the associated picture, and/or any picture following the associated picture in decoding order. Embodiments recognize that the concept of reference picture was adopted by HEVC to support temporal motion-compensation prediction within a single layer. RPS may be sent in the slice header of one or more, or each, coded slice of a picture, and may be used to describe which reference pictures in the decoded picture buffer (DPB) may be used to predict the current picture and/or future pictures.

Table 28 illustrates an exemplary short-term reference picture set syntax contemplated by embodiments. One or more, or each, reference picture may be identified through a delta POC (picture order count), which may be the distance between the current picture and the reference picture (as described previously herein). By way of further POC example, assume that the POC of the current picture is 10 and that the encoder uses two reference pictures with POC={9, 7} to code the current picture. The encoder may signal num_negative_pics=2 and num_positive_pics=0. The value of delta_poc_s0_minus1[0] is 0 since POC 10 minus POC 9 is 1, and the value of delta_poc_s0_minus1[1] is 1 since POC 9 minus POC 7 is 2. The reference picture set can also be predicted from another reference picture set in the active parameter set when inter_ref_pic_set_prediction_flag is equal to 1, for example.

TABLE 28

Exemplary short-term reference picture set syntax

| | Descriptor |
|---|---|
| short_term_ref_pic_set( idx ) { | |
| inter_ref_pic_set_prediction_flag | u(1) |
| if( inter_ref_pic_set_prediction_flag ) { | |
| delta_idx_minus1 | ue(v) |
| delta_rps_sign | u(1) |
| abs_delta_rps_minus1 | ue(v) |
| for( j = 0; j <= NumDeltaPocs [ RIdx ]; j++ ) { | |
| used_by_curr_pic_flag[ j ] | u(1) |
| if( !used_by_curr_pic_flag[ j ] ) | |
| use_delta_flag[ j ] | u(1) |
| } | |
| } | |
| else { | |
| num_negative_pics | ue(v) |
| num_positive_pics | ue(v) |
| for( i = 0; i < num_negative_pics; i++ ) { | |
| delta_poc_s0_minus1[ i ] | ue(v) |
| used_by_curr_pic_s0_flag[ i ] | u(1) |
| } | |
| for( i = 0; i < num_positive_pics; i++ ) { | |
| delta_poc_s1_minus1[ i ] | ue(v) |
| used_by_curr_pic_s1_flag[ i ] | u(1) |
| } | |
| } | |
| } | |

In some embodiments, a reference picture list may be a list of reference pictures that may be used for uni-prediction of a P and/or B slice. For the decoding process of a P slice, there may be one reference picture list. For the decoding process of a B slice, there may be one or more reference picture lists (e.g. at two lists—list0 and list 1) and/or a reference picture list combination.

Table 29 shows an exemplary reference picture set index that may be used by one or more, or each, coded picture in FIG. 5, and the set of reference pictures stored in a decoded picture buffer (DPB). Given the available reference pictures as indicated by the RPS, the reference picture lists may be constructed by selecting one or more available reference pictures in the DPB. HEVC may support the use of one or more (e.g. two) reference picture lists, for example RefPicList0 and RefPicList1. In some embodiments, perhaps depending on the number of active reference pictures in one or more, or each, list (num_ref_idx_l0_active_minus1 and num_ref_idx_l1_active_minus1), one or more, or each, slice can have a variable number of reference pictures in RefPicList0 and RefPicList1.

TABLE 29

Exemplary Reference picture list of temporal scalability with 1 reference picture per list

| Current picture (POC) | Short term RPS index | Reference pictures in DPB (POC) | RefPicList0 | RefPicList1 | Other pictures marked |
|---|---|---|---|---|---|
| 0 | — | — | — | — | |
| 8 | 8 | 0 | 0 | 0 | |
| 4 | 9 | 0, 8 | 0 | 8 | |
| 2 | 10 | 0, 4, 8 | 0 | 4 | 8 |
| 1 | 3 | 0, 2, 4, 8 | 0 | 2 | 4, 8 |
| 3 | 4 | 2, 0, 4, 8 | 2 | 4 | 8 |
| 6 | 5 | 4, 2, 0, 8 | 4 | 8 | — |
| 5 | 6 | 4, 0, 6, 8 | 4 | 6 | 8 |
| 7 | 7 | 6, 4, 0, 8 | 6 | 8 | — |

Figure 13:
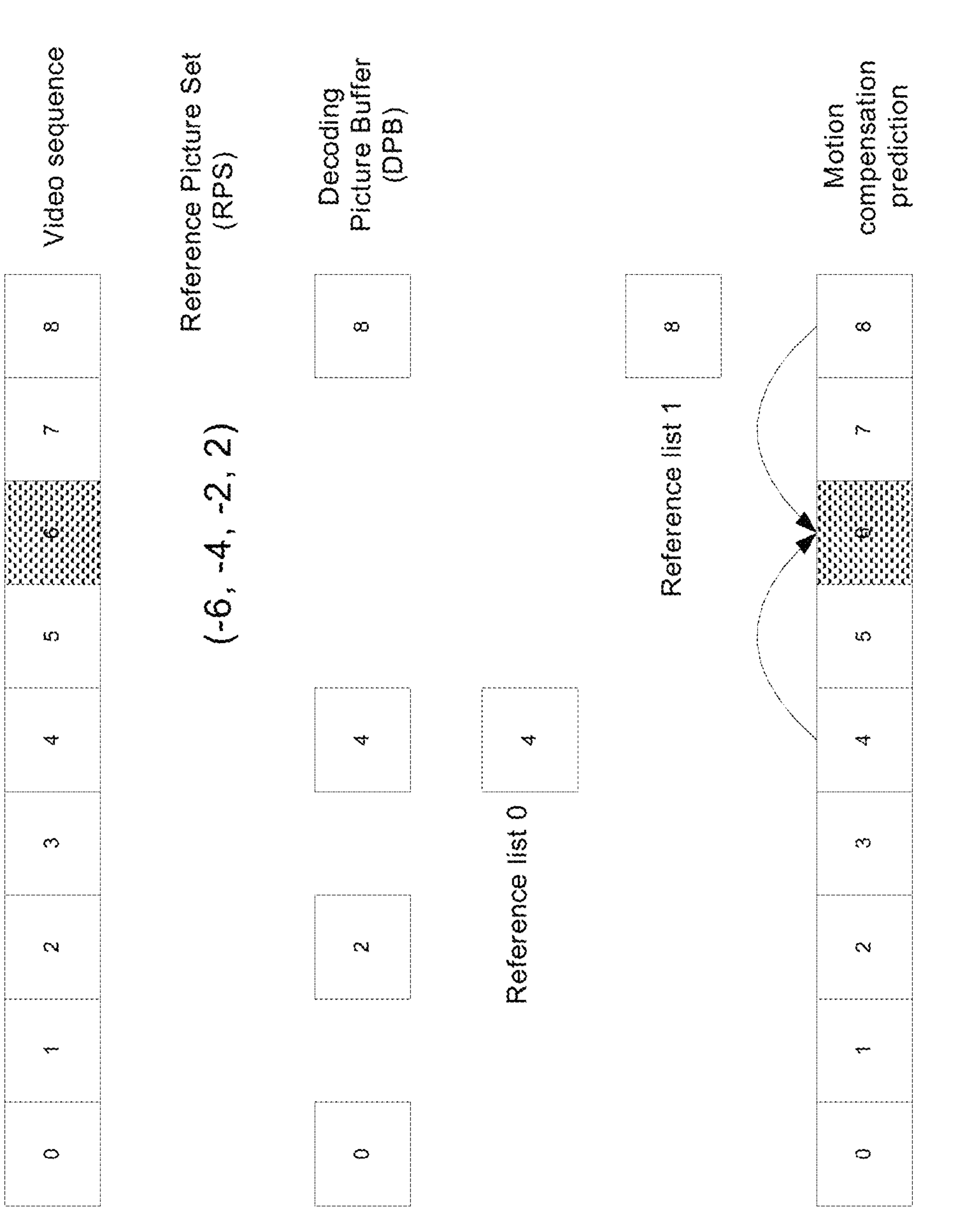
FIG. 13 illustrates an example enhancement layer temporal reference picture subset construction process consistent with embodiments.

FIG. 13 illustrates an example indicating how the reference picture for the motion compensation prediction of the current picture may be marked. The current picture POC number may be 6, and its RPS may be (−6, −4, −2, 2) which may indicate the available reference pictures in DPB may be picture 0, 2, 4 and 8. In some embodiments, the size of reference picture list may depend on the number of reference pictures that may be allowed for motion compensation prediction. In some embodiments, the number of reference pictures that may be allowed may be 1 per list (e.g. list in FIG. 13). For example, reference picture list 0 may contain picture 4 and/or reference picture list 1 may contain picture 8. The motion compensation prediction may then predict one or more, or each, prediction unit of the current picture (POC 6) from picture 4 and/or picture 8.

Embodiments contemplate one or more techniques of extending reference picture set (RPS) signaling to support multiple layer scalable extension of HEVC. In some embodiments, the techniques may be useful with single layer HEVC RPS use and/or signaling (as well as the associated reference picture buffering and/or list construction procedures), while extending the RPS signaling to support additional enhancement layers for scalable coding. In some embodiments, inter-layer RPS prediction for the enhancement layers may be used to save the RPS signaling overhead at the Parameter Set level and/or the slice level. In some embodiments, the RPS syntax and structure may be useful with single layer HEVC reference picture set specified in HEVC. In some embodiments, the RPS of one or more enhancement layers for temporal prediction may be predicted from the RPS of lower layers, perhaps to save the bit overhead, among other reasons. In some embodiments, the RPS of enhancement layers that may be used for inter-layer prediction (ILP) may be predicted from the RPS of lower layers, perhaps to save the bit overhead, among other reasons. In some embodiments, the decoding process may be defined to support reference picture set and/or list construction for scalable HEVC.

In some embodiments, it may be useful to use reconstructed pictures from one or more lower layers to predict the coding picture of enhancement layer in general scalable coding scheme. Embodiments recognize techniques to signal the inter-layer reference pictures in reference picture lists that can be deployed in an H.264 video coding standard based scalable coding scheme (and perhaps in only such schemes). Embodiments recognize other video coding standards, such as HEVC, that may use the reference picture set based signaling syntax and decoding process for motion prediction, where the inter-layer reference pictures may no longer be signaled and decoded directly without reference picture set. Embodiments recognize that the scalable HEVC that may be developed may be based on HEVC standard for the compatibility concerns. The reference picture set signaling and prediction techniques contemplated by one or more embodiments may be able to support efficient inter-layer prediction in the scalable coding architecture and/or satisfy the characteristics described herein.

One or more embodiments contemplate one or more short term reference picture set extension designs for HEVC scalable coding. Also, one or more embodiments contemplate one or more coding processes of short term reference picture set extensions. In addition, one or more embodiments contemplate one or more reference picture list constructions. And one or more embodiments contemplate one or more long term reference picture set prediction designs.

One or more embodiments contemplate one or more short term reference picture set extensions for HEVC scalable coding. In some embodiments, the temporal reference picture sets of the base layer and an enhancement layer could be identical, for example, when both layers may be using the same temporal prediction structure, such as low-delay prediction and/or dyadic coding structure, with the same GOP size and/or frame rate. In multi-layer scalable coding, the temporal reference picture set of an enhancement layer could be predicted (e.g. estimated)/obtained from the temporal reference picture set of the base layer or another reference layer (e.g. a lower layer that may be used for inter-layer prediction of the current layer may be referred to as a reference layer) with the same temporal prediction structure.

Table 30 is an exemplary Network Abstraction Layer (NAL) unit structure that may be used for scalable HEVC. The layer_id may be specified in a NAL unit header that may indicate to which layer the current data unit may belongs.

TABLE 30

| Exemplary NAL unit syntax | Descriptor |
|---|---|
| nal_unit( NumBytesInNALunit ) { | |
| forbidden_zero_bit | f(1) |
| nal_ref_flag | u(1) |
| nal_unit_type | u(6) |
| NumBytesInRBSP = 0 | |
| temporal_id | u(3) |
| layer_id | u(5) |
| for( i = nalUnitHeaderBytes; i < NumBytesInNALunit; i++ ) { | |
| if( i + 2 < NumBytesInNALunit && next_bits( 24 ) = = 0x000003 ) { | |
| rbsp_byte[ NumBytesInRBSP++ ] | b(8) |
| rbsp_byte[ NumBytesInRBSP++ ] | b(8) |
| i += 2 | |
| emulation_prevention_three_byte / * equal to 0x03 */ | f(8) |
| } else | |
| rbsp_byte[ NumBytesInRBSP++ ] | b(8) |
| } | |
| } | |

Table 31 illustrates an exemplary sequence parameter set (SPS) syntax specified in HEVC recognized by embodiments.

TABLE 31

| Exemplary HEVC Sequence parameter set syntax | Descriptor |
|---|---|
| seq_parameter_set_rbsp( ) { | |
| profile_idc | u(8) |
| reserved_zero_8bits /* equal to 0 */ | u(8) |
| level_idc | u(8) |
| seq_parameter_set_id | ue(v) |
| chroma_format_idc | ue(v) |
| if( chroma_format_idc = = 3 ) | |
| separate_colour_plane_flag | u(1) |
| max_temporal_layers_minus1 | u(3) |
| pic_width_in_luma_samples | ue(v) |
| pic_height_in_luma_samples | ue(v) |
| pic_cropping_flag | u(1) |
| if( pic_cropping_flag ) { | |
| pic_crop_left_offset | ue(v) |
| pic_crop_right_offset | ue(v) |
| pic_crop_top_offset | ue(v) |
| pic_crop_bottom_offset | ue(v) |
| } | |
| bit_depth_luma_minus8 | ue(v) |
| bit_depth_chroma_minus8 | ue(v) |
| pcm_enabled_flag | u(1) |
| if( pcm_enabled_flag ) { | |
| pcm_bit_depth_luma_minus1 | u(4) |
| pcm_bit_depth_chroma_minus1 | u(4) |
| } | |
| qpprime_y_zero_transquant_bypass_flag | u(1) |
| log2_max_pic_order_cnt_lsb_minus4 | ue(v) |
| for( i = 0; i <= max_temporal_layers_minus1; i++ ) { | |
| max_dec_pic_buffering[ i ] | ue(v) |
| num_reorder_pics[ i ] | ue(v) |
| max_latency_increase[ i ] | ue(v) |
| } | |
| restricted_ref_pic_lists_flag | u(1) |
| if( restricted_ref_pic_lists_flag) | |
| lists_modification_present_flag | u(1) |
| log2_min_coding_block_size_minus3 | ue(v) |
| log2_diff_max_min_coding_block_size | ue(v) |
| log2_min_transform_block_size_minus2 | ue(v) |
| log2_diff_max_min_transform_block_size | ue(v) |
| if( pcm_enabled_flag ) { | |
| log2_min_pcm_coding_block_size_minus3 | ue(v) |
| log2_diff_max_min_pcm_coding_block_size | ue(v) |
| } | |
| max_transform_hierarchy_depth_inter | ue(v) |
| max_transform_hierarchy_depth_intra | ue(v) |
| scaling_list_enable_flag | |
| chroma_pred_from_luma_enabled_flag | u(1) |
| deblocking_filter_in_aps_enabled_flag | u(1) |
| seq_loop_filter_across_slices_enabled_flag | u(1) |
| asymmetric_motion_partitions_enabled_flag | u(1) |

TABLE 31-continued

| Exemplary HEVC Sequence parameter set syntax | Descriptor |
|---|---|
| non_square_quadtree_enabled_flag | u(1) |
| sample_adaptive_offset_enabled_flag | u(1) |
| adaptive_loop_filter_enabled_flag | u(1) |
| if( adaptive_loop_filter_enabled_flag) | |
| alf_coef_in_slice_flag | u(1) |
| if( pcm_enabled_flag) | |
| pcm_loop_filter_disable_flag | u(1) |
| temporal_id_nesting_flag | u(1) |
| if( log2_min_coding_block_size_minus3 = = 0 ) | |
| inter_4x4_enabled_flag | u(1) |
| num_short_term_ref_pic_sets | ue(v) |
| for( i = 0; i < num_short_term_ref_pic_sets; i++) | |
| short_term_ref_pic_set( i ) | |
| long_term_ref_pics_present_flag | u(1) |
| tiles_or_entropy_coding_sync_idc | u(2) |
| if( tiles_or_entropy_coding_sync_idc = = 1 ){ | |
| num_tile_columns_minus1 | ue(v) |
| num_tile_rows_minus1 | ue(v) |
| uniform_spacing_flag | u(1) |
| if( !uniform_spacing_flag) { | |
| for( i = 0; i < num_tile_columns_minus1; i++ ) | |
| column_width[ i ] | ue(v) |
| for( i = 0; i < num_tile_rows_minus1; i++ ) | |
| row_height[ i ] | ue(v) |
| } | |
| loop_filter_across_tiles_enabled_flag | u(1) |
| } | |
| vui_parameters_present_flag | u(1) |
| if( vui_parameters_present_flag) | |
| vui_parameters ( ) | |
| sps_extension_flag | u(1) |
| if( sps_extension_flag) | |
| while( more_rbsp_data( )) | |
| sps_extension_data_flag | u(1) |
| rbsp_trailing_bits( ) | |
| } | |

Table 32 is an example slice header syntax. The short term RPS of current picture may be created in the slice header, perhaps when short_term_ref_pic_set_sps_flag may be equal to 0. The slice header may also specify the number and/or syntax of long term reference pictures that may be included in the long term RPS of current picture. The syntax of short-term and/or long term RPS that may be specified in the current HEVC is also illustrated in Table 32.

TABLE 32

| HEVC slice header syntax | Descriptor |
|---|---|
| slice_header( ) { | |
| first_slice_in_pic_flag | u(1) |
| if( first_slice_in_pic_flag = = 0 ) | |
| slice_address | u(v) |
| slice_type | ue(v) |
| entropy_slice_flag | u(1) |
| if( !entropy_slice_flag ) { | |
| pic_parameter_set_id | ue(v) |
| if( output_flag_present_flag ) | |
| pic_output_flag | u(1) |
| if( separate_colour_plane_flag = = 1 ) | |
| colour_plane_id | u(2) |
| if( IdrPicFlag ) { | |
| idr_pic_id | ue(v) |
| no_output_of_prior_pics_flag | u(1) |
| } else { | |
| pic_order_cnt_lsb | u(v) |
| short_term_ref_pic_set_sps_flag | u(1) |
| if( !short_term_ref_pic_set_sps_flag ) | |
| short_term_ref_pic_set( num_short_term_ref_pic_sets ) | |

TABLE 32-continued

| HEVC slice header syntax | Descriptor |
|---|---|
| else | |
| short_term_ref_pic_set_idx | u(v) |
| if( long_term_ref_pics_present_flag ) { | |
| num_long_term_pics | ue(v) |
| for( i = 0; i < num_long_term_pics; i++ ) { | |
| delta_poc_lsb_lt[ i ] | ue(v) |
| delta_poc_msb_present_flag[ i ] | u(1) |
| if( delta_poc_msb_present_flag[ i ] ) | |
| delta_poc_msb_cycle_lt_minus1[ i ] | ue(v) |
| used_by_curr_pic_lt_flag[ i ] | u(1) |
| } | |
| } | |
| } | |
| if( sample_adaptive_offset_enabled_flag ) { | |
| slice_sao_interleaving_flag | u(1) |
| slice_sample_adaptive_offset_flag | u(1) |
| if( slice_sao_interleaving_flag && slice_sample_adaptive_offset_flag ) { | |
| sao_cb_enable_flag | u(1) |
| sao_cr_enable_flag | u(1) |
| } | |
| } | |
| if( scaling_list_enable_flag \| \| deblocking_filter_in_aps_enabled_flag \| \| ( sample_adaptive_offset_enabled_flag && !slice_sao_interleaving_flag ) \| \| adaptive loop filter enabled flag ) | |
| aps_id | ue(v) |
| if( slice_type = = P \| \| slice_type = = B ) { | |
| num_ref_idx_active_override_flag | u(1) |
| if( num_ref_idx_active_override_flag ) { | |
| num_ref_idx_l0_active_minus1 | ue(v) |
| if( slice_type = = B ) | |
| num_ref_idx_l1_active_minus1 | ue(v) |
| } | |
| } | |
| if( lists_modification_present_flag ) { | |
| ref_pic_list_modification( ) | |
| ref_pic_list_combination( ) | |
| } | |
| if( slice_type = = B ) | |
| mvd_l1_zero_flag | u(1) |
| } | |
| if( cabac_init_present_flag && slice_type != 1 ) | |
| cabac_init_flag | u(1) |
| if( !entropy_slice_flag ) { | |
| slice_qp_delta | se(v) |
| if( deblocking_filter_control_present_flag ) { | |
| if( deblocking_filter_in_aps_enabled_flag ) | |
| inherit_dbl_params_from_aps_flag | u(1) |
| if( !inherit_dbl_params_from_aps_flag ) { | |
| disable_deblocking_filter_flag | u(1) |
| if( !disable_deblocking_filter_flag ) { | |
| beta_offset_div2 | se(v) |
| tc_offset_div2 | se(v) |
| } | |
| } | |
| } | |
| if( slice_type = = B ) | |
| collocated_from_l0_flag | u(1) |
| if( slice_type != 1 && ((collocated_from_l0_flag && num_ref_idx_l0_active_minus1 > 0 ) \| \| (!collocated_from_l0_flag && num_ref_idx_l0_active_minus1 > 0) ) | |
| collocated_ref_idx | ue(v) |
| if( ( weighted_pred_flag && slice_type = = P ) \| \| (weighted_bipred_idc = = 1 && slice_type = = B ) ) | |
| pred_weight_table( ) | |
| } | |
| if( slice_type = = P \| \| slice_type = = B ) | |
| five_minus_max_num_merge_cand | ue(v) |
| if( adaptive_loop_filter_enabled_flag ) { | |
| slice_adaptive_loop_filter_flag | u(1) |
| if( slice_adaptive_loop_filter_flag && alf_coef_in_slice_flag ) | |

TABLE 32-continued

HEVC slice header syntax

| | Descriptor |
|---|---|
| alf_param( ) | |
| if( slice_adaptive_loop_filter_flag && | |
| !alf_coef_in_slice_flag ) | |
| alf_cu_control_param( ) | |
| } | |
| if( seq_loop_filter_across_slices_enabled_flag && | |
| ( slice_adaptive_loop_filter_flag \| \| | |
| slice_sample_adaptive_offset_flag \| \| | |
| !disable_deblocking_filter_flag ) ) | |
| slice_loop_filter_across_slices_enabled_flag | u(1) |
| if( tiles_or_entropy_coding_sync_idc > 0 ) { | |
| num_entry_point_offsets | ue(v) |
| if( num_entry_point_offsets > 0 ) { | |
| offset_len_minus1 | ue(v) |
| for( i = 0; i < num_entry_point_offsets; i++ ) | |
| entry_point_offset[ i ] | u(v) |
| } | |
| } | |
| } | |

Table 33 is an example of an SPS syntax that may be used to introduce short term reference picture set extension for the enhancement layer. For base layer (layer_id=0), the SPS of one embodiment may be identical to the SPS specified in HEVC. The syntax contemplated by one or more embodiments is illustrated in the table.

TABLE 33

Exemplary Sequence parameter set syntax enabling RPS prediction

| | Descriptor |
|---|---|
| seq_parameter_set_rbsp( ) { | |
| ...... | |
| if( log2_min_coding_block_size_minus3 = = 0 ) | |
| inter_4x4_enabled_flag | u(1) |
| if(layer_id) { | |
| num_short_term_ref_pic_set_ext | ue(v) |
| for( i = 0; i < num_short_term_ref_pic_sets; i++) | |
| short_term_ref_pic_set_ext( i) | |
| } | |
| else{ | |
| num_short_term_ref_pic_sets | ue(v) |
| for( i = 0; i < num_short_term_ref_pic_sets; i++) | |
| short_term_ref_pic_set( i) | |
| } | |
| long_term_ref_pics_present_flag | u(1) |
| tiles_or_entropy_coding_sync_idc | u(2) |
| ...... | |
| } | |

In some embodiments, num_short_term_ref_pic_set_ext may specify a number of short term reference picture set extensions that nay be specified in a sequence parameter set.

In one or more scalability use embodiments, the short term reference picture set extension of enhancement layers may include both a temporal reference picture subset with reference pictures for temporal prediction, and/or the inter-layer reference picture subset with reference pictures from its reference layer(s) for inter-layer prediction (ILP). Table 34 illustrates exemplary contemplated short term reference picture set extensions that may support temporal RPS subset (e.g. Table 35), and/or inter-layer RPS subset (e.g. Table 36). The new proposed syntax is illustrated in the following tables.

TABLE 34

Exemplary Short-term reference picture set extension syntax

| | Descriptor |
|---|---|
| short_term_ref_pic_set_ext( idx ) { | |
| st_temporal_rps(idx) | |
| ilp_enable_flag | u(1) |
| if (ilp_enable_flag) | |
| st_ilp _rps(idx) | |
| } | |

TABLE 35

Exemplary Short-term temporal reference picture subset

| | |
|---|---|
| st_temporal_rps(idx) { | |
| st_temporal _rps_prediction_flag | u(1) |
| if (st_temporal_rps_prediction_flag) { | |
| temporal_ref_layer_id | u(v) |
| temporal_ref_rps_idx | u(v) |
| rps_scale_factor_minus1 | ue(v) |
| } | |
| else { | |
| inter_ref_pic_set_prediction_flag | u(1) |
| if( inter_ref_pic_set_prediction_flag ) { | |
| delta_idx_minus1 | ue(v) |
| delta_rps_sign | u(1) |
| abs_delta_rps_minus1 | ue(v) |
| for( j = 0; j <= NumDeltaPocs[ RIdx ]; j++ ) | |
| { | |
| used_by_curr_pic_flag[ j ] | u(1) |
| if( !used_by_curr_pic_flag[ j ] ) | |
| use_delta_flag[ j ] | u(1) |
| } | |
| } | |
| else { | |
| num_negative_pics | ue(v) |
| num_positive_pics | ue(v) |
| for( i = 0; i < num_negative_pics; i++ ) { | |
| delta_poc_s0_minus1[ i ] | ue(v) |
| used_by_curr_pic_s0_flag[ i ] | u(1) |
| } | |
| for( i = 0; i < num_positive_pics; i++ ) { | |
| delta_poc_s1_minus1[ i ] | ue(v) |
| used_by_curr_pic_s1_flag[ i ] | u(1) |
| } | |
| } | |
| } | |

TABLE 36

Exemplary Short-term inter-layer reference picture subset

| | |
|---|---|
| st_ilp_rps(idx) { | |
| ilp_ref_layer_id | u(v) |
| colocated_ref_pic_present_flag | u(1) |
| ilp_rps_prediction_flag | u(1) |
| if(ilp_rps_prediction_flag ) { | |
| ilp_ref_rps_idx | u(v) |
| rps_scale_factor_minus1 | ue(v) |
| for( j = 0; j <= | |
| NumDeltaPocs[ilp_ref_layer_id][ilp_ref_rps_idx ]; j++ ) { | |
| used_by_curr_ilp_pic_flag[ j ] | u(1) |
| } | |
| else { | |
| num_ilp_negative_pics | ue(v) |
| num_ilp_positive_pics | ue(v) |
| for( i = 0; i < num_ilp_negative_pics; i++ ) { | |
| ilp_delta_poc_s0_minus1[ i ] | ue(v) |
| used_by_curr_ilp_pic_s0_flag[ i ] | u(1) |
| } | |

TABLE 36-continued

| Exemplary Short-term inter-layer reference picture subset | |
|---|---|
| for( i = 0; i < num_ilp_positive_pics; i++ ) { | |
| ilp_delta_poc_s1_minus1[ i ] | ue(v) |
| used_by_curr_pic_ilp_s1_flag[ i ] | u(1) |
| } | |
| } | |
| } | |

In some embodiments, st_temporal_rps_prediction_flag equaling 1 may enable the prediction of temporal RPS subset from the temporal reference picture subset from the reference layer. In some embodiments, temporal_ref_layer_id may specify the reference layer used for the short term temporal reference picture subset prediction. In some embodiments, temporal_ref_rps_idx may specify the reference picture set index in the temporal reference picture layer that may be used for the short term temporal reference picture subset prediction. In some embodiments, rps_scale_factor_minus1 may specify the scale factor to scale the DeltaPOC of the RPS. In some embodiments, ilp_enable_flag equaling 1 may enable enhancement layer ILP. In some embodiments, ilp_ref_layer_id may specify the reference layer that may be used for ILP. In some embodiments, colocated_ref_pic_present flag equaling 1 may specify the co-located reference picture from reference layer that may be used for ILP. In some embodiments, ilp_rps_prediction_flag equaling 1 may indicate the inter-layer reference picture subset may be predicted from the temporal reference picture subset of the reference layer. In some embodiments, ilp_ref_rps_idx may specify the index of reference picture set of reference layer that may be used for inter-layer RPS subset prediction. In some embodiments, used_by_curr_ilp_pic_flag equaling 1 may specify whether the corresponding inter-layer reference picture may be used in the current enhancement layer for ILP.

In one or more embodiments, the short term RPS extension may provide the flexibility to predict individual temporal reference picture subsets from the temporal reference picture subsets (short_term_ref_pic_subset ( )) of the reference layer (e.g., in some embodiments, if the reference layer may be a base layer, the temporal reference picture subset may be the same as the short term RPS (short_term_ref_pic_set( )) that may be specified in HEVC). It may also support explicit signaling of the temporal reference pictures, perhaps but not limited to in case the reference picture subset may not be predicted from any reference layer.

One or more embodiments contemplate that a scalable coding scheme may utilize the reconstructed picture stored in the reference layer DPB as reference pictures for inter-layer prediction to improve the coding efficiency of the enhancement layer, among other reasons. Which pictures in the DBP of the reference layer may be used in an ILP to predict the current enhancement layer picture can be determined by referring to the given temporal RPS in the given reference layer, and/or marking those reference pictures that may be used by sending one bit per picture. In some embodiments, one bit per picture (and in some embodiments perhaps only one bit per picture) that may be stored in reference layer DPB may be used to signal the ILP reference picture, which may result in reduced bit overhead compared to explicit signaling, among other results. In some embodiments, the ILP reference pictures can also be signaled explicitly by way of sending delta POC values, for example.

In some embodiments, the picture set prediction techniques described herein may be deployed for one or more, or each, individual reference picture set extension of the enhancement layer. In some embodiments, for example in spatial and/or SNR scalability use case, a part of and/or the entire short term temporal reference picture subsets of the enhancement layer could be identical to the short term reference picture set of the given reference layer, in some embodiments perhaps if the frame rate and/or the size of a group of pictures (GOP) may be the same. A part of and/or the entire temporal reference picture subsets may be predicted from the reference layer. Though not shown in Tables 33 and 34, an additional flag may be added in the parameter set that may indicate that the temporal reference picture subsets of the current layer may be identical to the temporal reference picture subsets from the reference layer. In some embodiments, perhaps when the flag may be set, signaling of the individual temporal reference picture subset (st_temporal_rps( )) may be skipped from the reference picture set extension (short_term_ref_pic_set_ext( )).

In some embodiments, the reference picture set of the base layer may contain (or in some embodiments may only contain) the reference pictures for temporal prediction within the base layer (e.g. there may be no layer below the base layer available for ILP). In some embodiments, the reference picture set extension of an enhancement layer can contain reference pictures for temporal prediction and/or inter-layer prediction. In some embodiments, perhaps when more than one enhancement layer may be used, the reference picture set extension may be identical between two or more enhancement layers. In such scenarios, though not shown in Tables 33 and 34, an additional flag may be introduced into the parameter set that may indicate that the reference picture sets of the current layer (e.g. including temporal subsets and/or inter-layer subsets) may be substantially or completely identical to a given reference layer. In some embodiments, perhaps when such flag may be set, the parameters "num_short_term_ref_pic_set_ext" and/or "short_term_ref_pic_set_ext( )" may be skipped from the parameter set.

Figure 18:
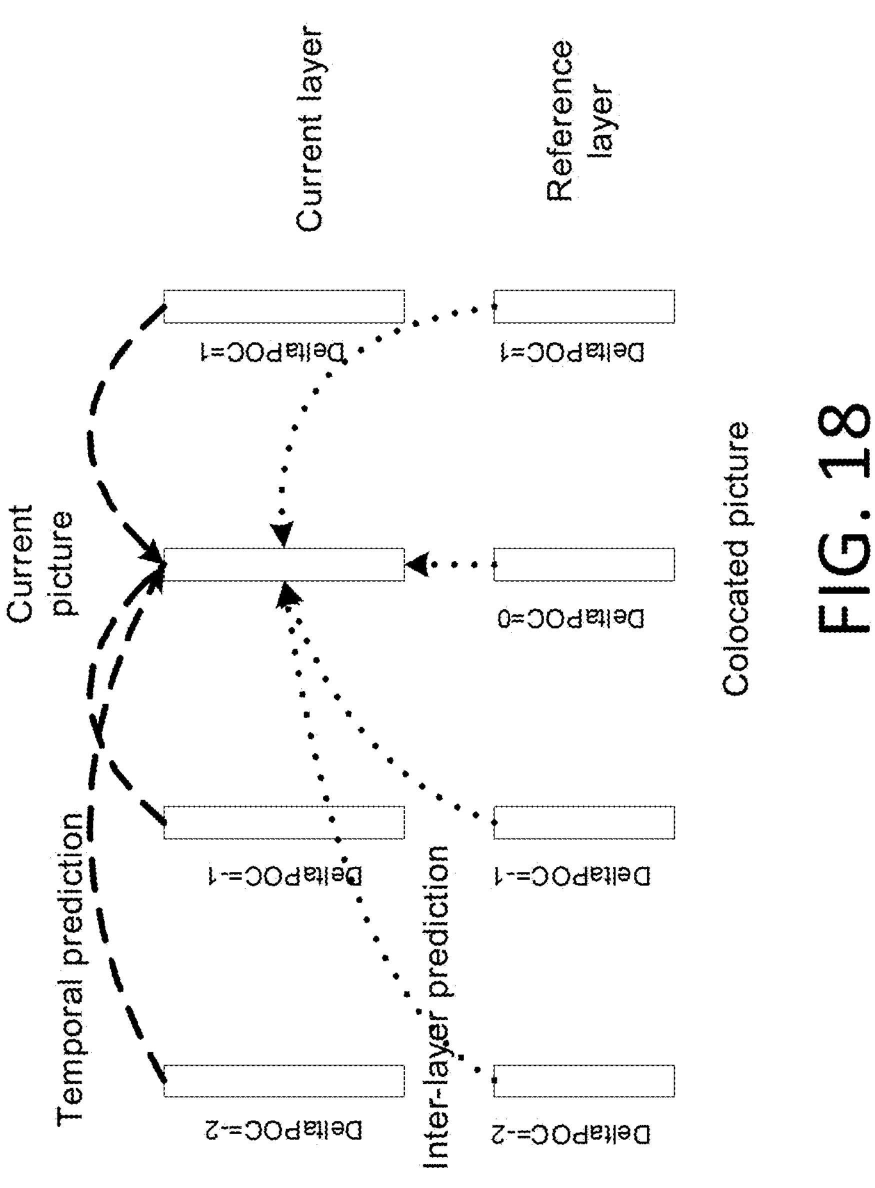
FIG. 18 illustrates exemplary temporally collocated pairs of temporal references and inter-layer reference consistent with embodiments.

In some embodiments, a reference picture that may be used for temporal prediction (e.g. as signaled in temporal reference picture subset) and/or a reference picture from the lower reference layer that may be used for ILP (e.g. as signaled in inter-layer reference picture subset) could be collocated in the temporal domain. For example, they could have the same POC distance (DeltaPOC) from the current picture. Also by way of example, as shown in FIG. 18, to predict the current picture, three of its temporal references and four of its inter-layer references may be used, where in some embodiments three pairs of the temporal and/or inter-layer references may be temporally collocated. Though having more reference pictures from one or both layers could improve coding performance, in some embodiments it may also result in increased system complexity. For applications with limited DPB buffer size and/or codec horsepower such as mobile video chat or facetime, for example, the number of reference pictures to be stored in DPB buffer may be restricted. In such scenarios, embodiments contemplate a signaling technique that may further reduce the number of reference pictures may be deployed in the scalable coding system by using one (or in some embodiment perhaps only one) of the temporally collocated reference picture pair. Though not shown in Tables 33 and 34, an additional flag could be introduced to reduce complexity. In some embodiments, perhaps when this flag may be set, the temporal reference picture may be replaced by the temporally collocated inter-layer reference picture from the reference layer (e.g. if such an inter-layer reference picture may be available). In some embodiments, this may reduce the number of reference pictures in the current layer DPB buffer.

Figure 15:
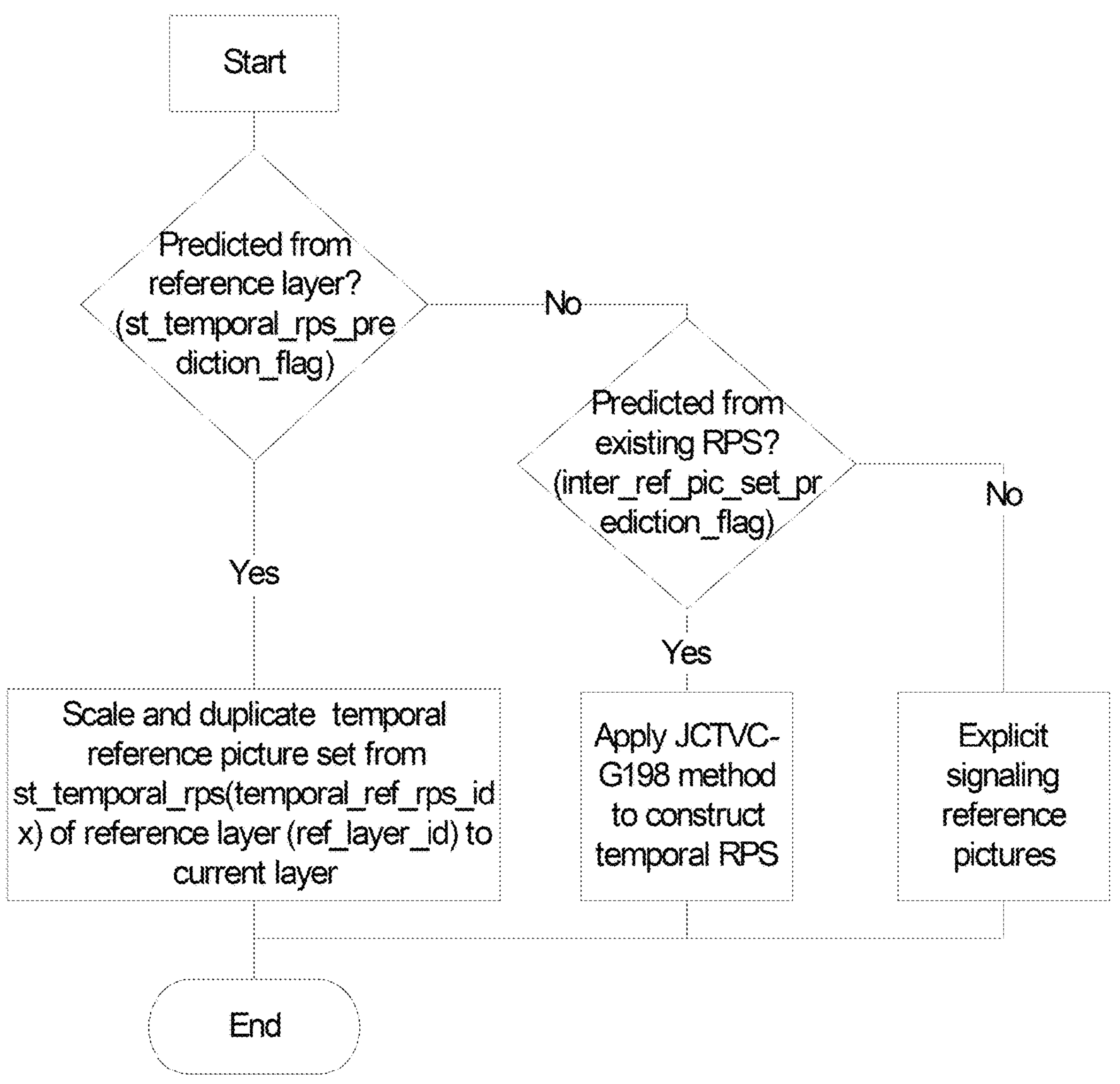
FIG. 15 and FIG. 16 illustrate examples of a decoding process of a temporal reference picture subset and an inter-layer reference picture subset consistent with embodiments.
Figure 16:
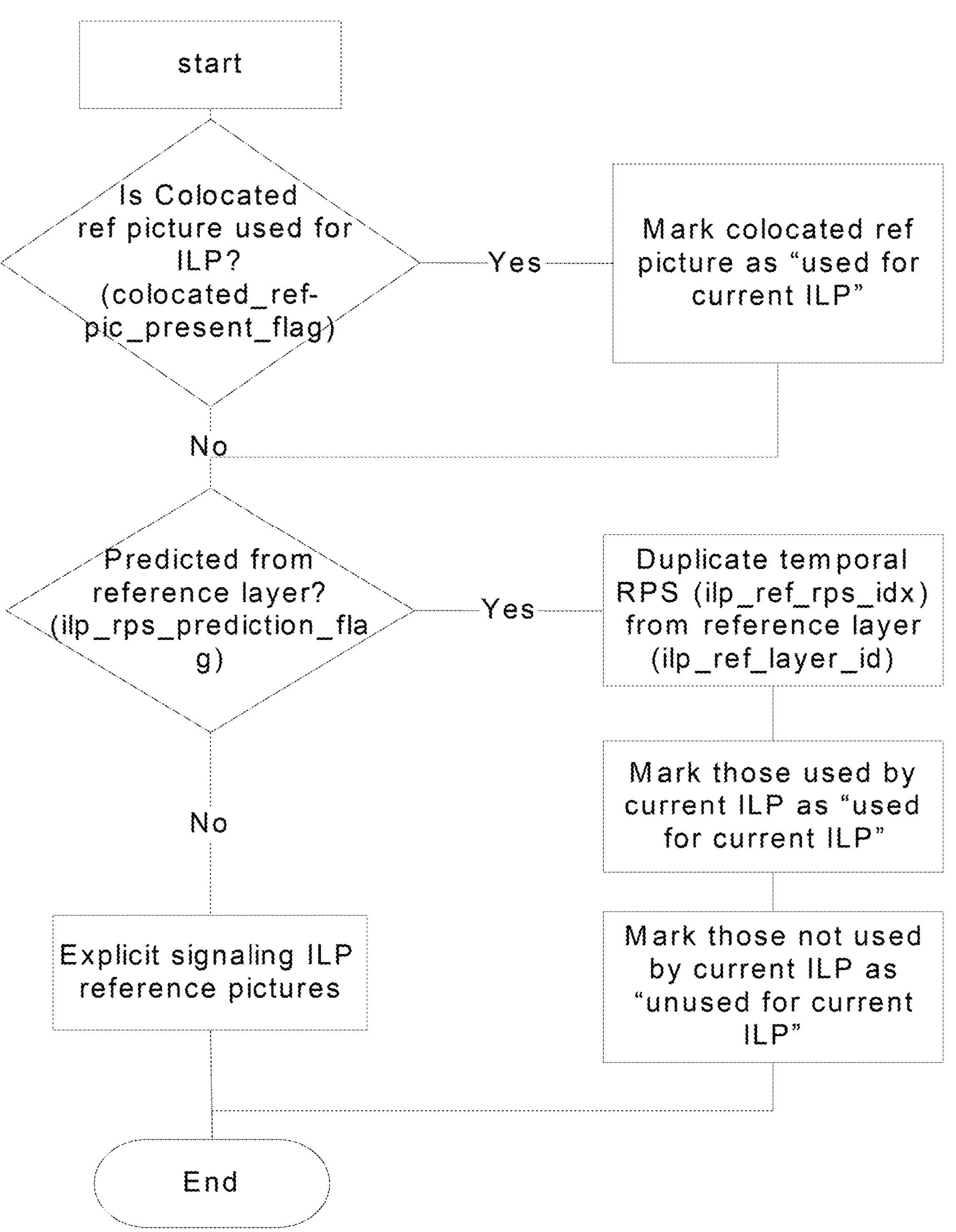

One or more embodiments contemplate a decoding process for reference picture set extension. An exemplary decoding process of temporal reference picture subset and inter-layer reference picture subset are illustrated in FIG. 15 and FIG. 16.

One or more embodiments contemplate one or more decoding techniques for a reference picture set extensions, which in some embodiments may be invoked once per picture, perhaps after decoding of a slice header, and in some embodiments, perhaps prior to the decoding of any coding unit and/or prior to the decoding process for a reference picture list construction of the slice.

Some embodiments contemplate at least three temporal lists of picture order count values may be constructed to derive the temporal reference picture subset; PocStTCurrBefore, PocStTCurrAfter, PocStTFoll, with NumPocStTCurrBefore, NumPocStTCurrAfter, and NumPocStTFoll, number of elements, respectively.

In some embodiments, at least three inter-layer lists of picture order count (POC) values may be constructed to derive the inter-layer reference picture subset: PocStILCurrCol, PocStILCurrBefore, PocStILCurrAfter, with NumPocStILCurrCol, NumPocStILCurrBefore, NumPocStILCurrAfter, number of elements, respectively.

In some embodiments, perhaps if the current picture is an IDR picture, PocStTCurrBefore, PocStTCurrAfter, PocStTFoll, PocStIlpCurrCol, PocStIlpCurrBefore and/or PocStIlpCurrAfter may be set to empty, and NumPocStTCurrBefore, NumPocStTCurrAfter, NumPocStTFoll, NumPocStIlpCurrCol, NumPocStIlpCurrBefore, and/or NumPocStIlpCurrAfter may be set to 0. Otherwise, in some embodiments, the following may apply for derivation of the five lists of picture order count values and the numbers of entries:

```
 for( i = 0, j = 0, k = 0; i < NumNegativePics[ StRpsIdx ] ; i++ )
   if( UsedByCurrPicS0[ StRpsIdx ][ i ] )
     PocStTCurrBefore[ j++ ] = PicOrderCntVal +
DeltaPocS0[ StRpsIdx ][ i ]*(rps_scale_factor_minus1+1)
   else
     PocStTFoll[ k++ ] = PicOrderCntVal + DeltaPocS0[ StRpsIdx ][ i ]
*(rps_scale_factor_minus1+1)
NumPocStTCurrBefore = j
for( i = 0, j = 0; i < NumPositivePics[ StRpsIdx ]; i++ )
   if( UsedByCurrPicS1[ StRpsIdx ][ i ] )
     PocStTCurrAfter[ j++ ] = PicOrderCntVal + DeltaPocS1[ StRpsIdx ][ i ]
*(rps_scale_factor_minus1+1)
   else
     PocStTFoll[ k++ ] = PicOrderCntVal + DeltaPocS1[ StRpsIdx ][ i ]
*(rps_scale_factor_minus1+1)
NumPocStTCurrAfter = j
NumPocStTFoll = k
 for( i = 0, j = 0, k = 0; i < NumNegativePics[ StRpsIdx ] ; i++ )
    if( UsedByCurrPicIlpS0[ StRpsIdx ][ i ] )
      PocStIlpCurrBefore[ j++ ] = PicOrderCntVal + IlpDeltaPocS0[ StRpsIdx ][ i ]
*(rps_scale_factor_minus1+1)
NumPocStIlpCurrBefore = j
for( i = 0, j = 0; i < NumPositivePics[ StRpsIdx ]; i++ )
   if( UsedByCurrPicIlpS1[ StRpsIdx ][ i ] )
     PocStIlpCurrAfter[ j++ ] = PicOrderCntVal + IlpDeltaPocS1[ StRpsIdx ][ i ]
*(rps_scale_factor_minus1+1)
NumPocStIlpCurrAfter = j
 if(colocated_ref_pic_present_flag) {
    PocStIlpCurrCol[ 0] = PicOrderCntVal
    NumPocStIlpCurrCol = 1
 }
```

In some embodiments, the reference picture set may include at least five lists of reference pictures: RefPicSetStTCurrBefore, RefPicSetStTCurrAfter, RefPicSetStTFoll, RefPicSetStIlpCurrCol, RefPicSetStIlpCurrBefore and/or RefPicSetStIlpCurrAfter. The variable NumPocTotalCurr may be set equal to NumPocStTCurrBefore+NumPocStTCurrAfter+NumPocStIlpCurrCol+NumPocStIlpCurrBefore+NumPocStIlpCurrAfter. When decoding a P or B slice, it may be useful for the bitstream if the value of NumPocTotalCurr may not be equal to 0. In some embodiments, the derivation process for the reference picture set and/or picture marking may be performed according to the following:

In some embodiments, the following may apply for the temporal reference picture subsets:

```
   for( i = 0; i < NumPocStTCurrBefore; i++ )
     if( there is a short-term reference picture picX in the DPB
       with PicOrderCntVal equal to PocStTCurrBefore[ i ])
     RefPicSetStTCurrBefore[ i ] = picX
 else
   RefPicSetStTCurrBefore[ i ] = "no reference picture"
   for( i = 0; i < NumPocStTCurrAfter; i++ )
     if( there is a short-term reference picture picX in the DPB
       with PicOrderCntVal equal to PocStTCurrAfter[ i ])
     RefPicSetStTCurrAfter[ i ] = picX
   else
     RefPicSetStTCurrAfter[ i ] = "no reference picture"
 for( i = 0; i < NumPocStTFoll; i++ )
   if( there is a short-term reference picture picX in the DPB
       with PicOrderCntVal equal to PocStTFoll[ i ])
     RefPicSetStTFoll[ i ] = picX
   else
     RefPicSetStTFoll[ i ] = "no reference picture"
```

In some embodiments, the following applies for the inter-layer reference picture subsets:

```
for( i = 0; i < NumPocStIlpCurrBefore; i++ )
  if( there is a short-term reference picture picX in the DPB
     with PicOrderCntVal equal to PocStIlpCurrBefore[ i ])
  RefPicSetStIlpCurrBefore[ i ] = picX
else
  RefPicSetStIlpCurrBefore[ i ] = "no reference picture"
for( i = 0; i < NumPocStIlpCurrAfter; i++ )
  if( there is a short-term reference picture picX in the DPB
     with PicOrderCntVal equal to PocStIlpCurrAfter[ i ])
  RefPicSetStIlpCurrAfter[ i ] = picX
else
  RefPicSetStIlpCurrAfter[ i ] = "no reference picture"
for( i = 0; i < NumPocStIlpCurrCol; i++ )
  if( there is a short-term reference picture picX in the DPB
     with PicOrderCntVal equal to PocStIlpCurrCol[ i ])
  RefPicSetStIlpCurrCol[ i ] = picX
  else
  RefPicSetStIlpCurrCol[ i ] = "no reference picture"
```

One or more embodiments contemplate one or more decoding techniques for reference picture lists construction. In some embodiments, these techniques may be invoked at the beginning of the decoding process for one or more, or each, P or B slice. The variable NumRpsCurrTempList0 is set equal to Max(num_ref_idx_l0_active_minus1+1, NumPocTotalCurr) and the list RefPicListTemp0 is constructed as follows:

```
cIdx = 0
while( cIdx < NumRpsCurrTempList0 ) {
    RefPicListTemp0[cIdx++]=RefPicSetStIlpCurrCol
  for( i = 0; i < NumPocStTCurrBefore && cIdx < NumRpsCurrTempList0; cIdx++, i++ )
    RefPicListTemp0[ cIdx ] = RefPicSetStTCurrBefore[ i ]
  for( i = 0; i < NumPocStTCurrAfter && cIdx < NumRpsCurrTempList0; cIdx++, i++ )
    RefPicListTemp0[ cIdx ] = RefPicSetStTCurrAfter[ i ]
  for( i = 0; i < NumPocStIlpCurrBefore && cIdx < NumRpsCurrTempList0; cIdx++, i++ )
    RefPicListTemp0[ cIdx ] = RefPicSetStIlpCurrBefore[ i ]
  for( i = 0; i < NumPocStIlpCurrAfter && cIdx < NumRpsCurrTempList0; cIdx++, i++ )
    RefPicListTemp0[ cIdx ] = RefPicSetStIlpCurrAfter[ i ]
}
```

In some embodiments, the list RefPicList0 may be constructed in default as follows:

```
for( cIdx = 0; cIdX ≤ num_ref_idx_l0_active_minus1; cIdx++)
  RefPicList0[ cIdx ] = RefPicListTemp0[ cIdx ]
```

In some embodiments, perhaps when the slice may be a B slice, the variable NumRpsCurrTempList1 may be set equal to Max (num_ref_idx_l1_active_minus1+1, NumPocTotalCurr) and the list RefPicListTemp1 may be constructed as follows:

```
cIdx = 0
while( cIdx < NumRpsCurrTempList1 ) {
    RefPicListTemp1[cIdx++]=RefPicSetStIlpCurrCol
  for( i = 0; i < NumPocStTCurrAfter && cIdx < NumRpsCurrTempList1; cIdx++, i++ )
    RefPicListTemp1[ cIdx ] = RefPicSetStTCurrAfter[ i ]
  for( i = 0; i < NumPocStTCurrBefore && cIdx < NumRpsCurrTempList1; cIdx++, i++ )
    RefPicListTemp1[ cIdx ] = RefPicSetStTCurrBefore[ i ]
  for( i = 0; i < NumPocStIlpCurrAfter && cIdx < NumRpsCurrTempList0; cIdx++, i++ )
    RefPicListTemp0[ cIdx ] = RefPicSetStIlpCurrAfter[ i ]
  for( i = 0; i < NumPocStIlpCurrBefore && cIdx < NumRpsCurrTempList0; cIdx++, i++ )
    RefPicListTemp0[ cIdx ] = RefPicSetStIlpCurrBefore[ i ]
}
```

In some embodiments, perhaps when the slice may be a B slice, the list RefPicList1 may be constructed by default as follows:

```
for( cIdx = 0; cIdX ≤ num_ref_idx_l1_active_minus1; cIdx++)
  RefPicList1[ cIdx ] = RefPicListTemp1[ cIdx ]
```

Figure 14:
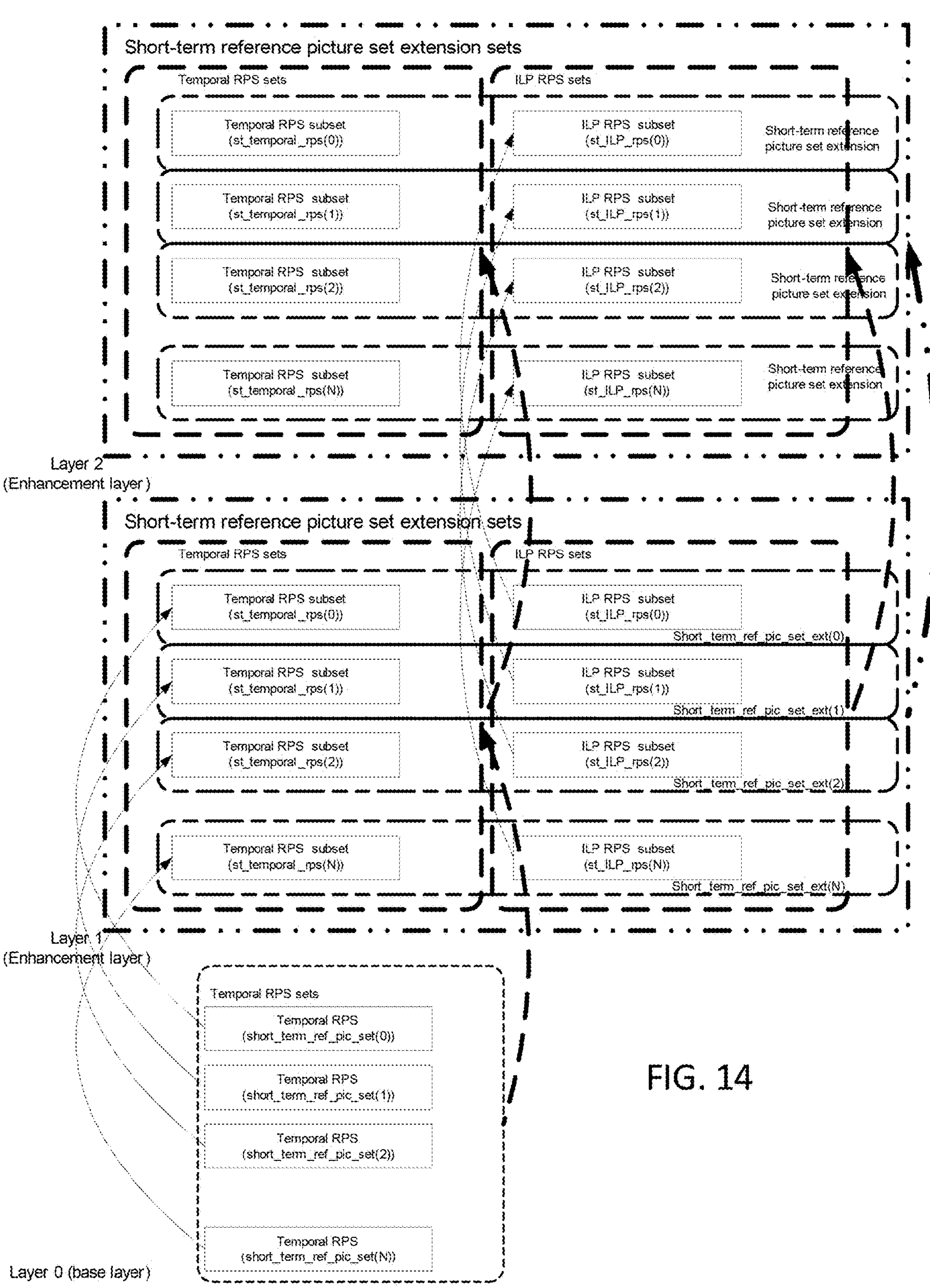
FIG. 14 depicts various examples of the sources of short term reference picture set prediction consistent with embodiments.

FIG. 13 illustrates an exemplary enhancement layer temporal reference picture subset construction process. The temporal reference picture subset could be predicted from a given temporal reference picture subset of a given reference layer, and/or predicted from the existing reference picture subset within the same layer, and/or could be signaled explicitly. FIG. 14 illustrates numerous exemplary embodiments of predicting short term reference picture sets and/or set extensions.

Figure 17:
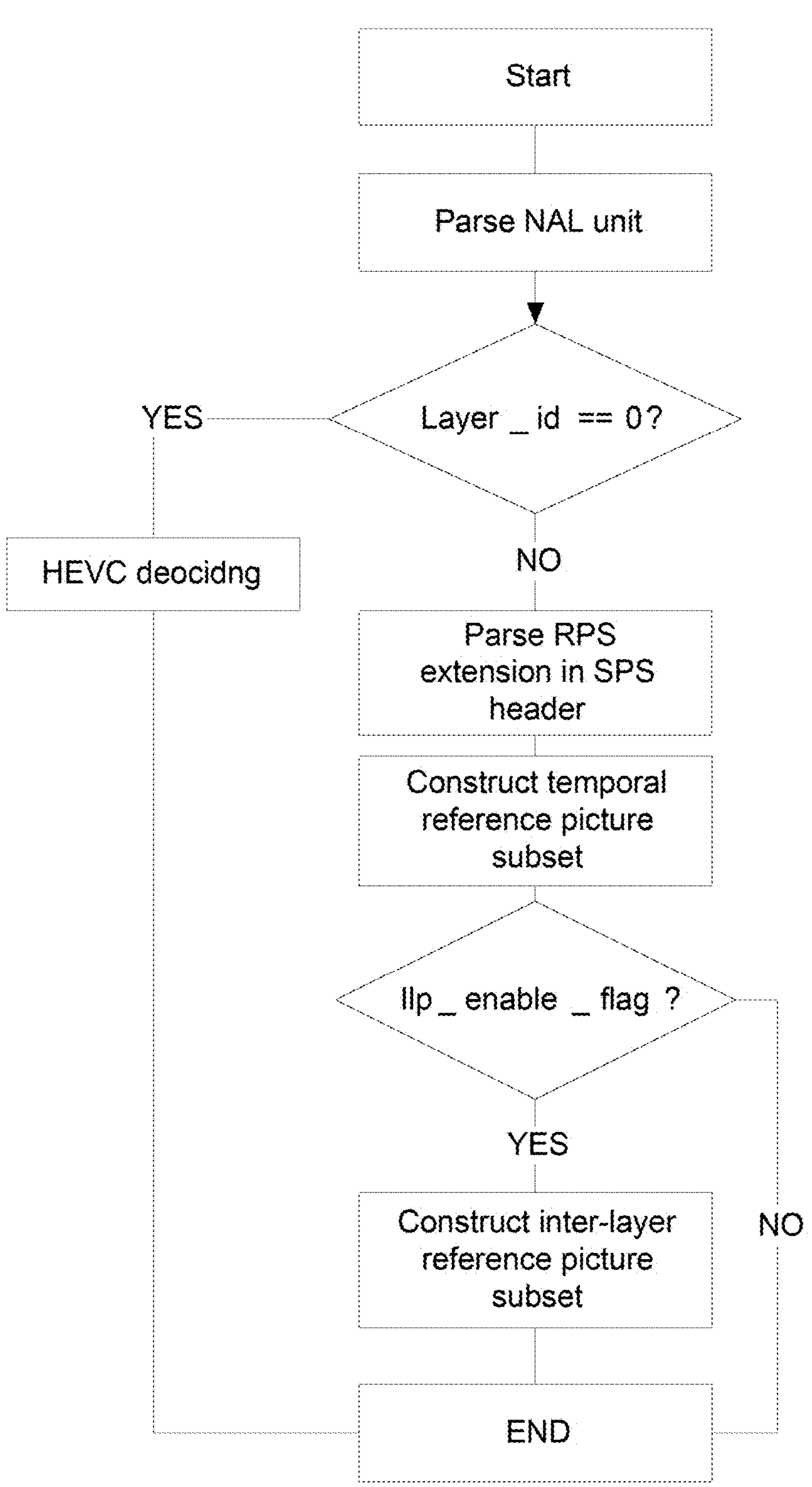
FIG. 17 illustrates an exemplary decoding process for reference picture set extension consistent with embodiments.

FIG. 16 illustrates an exemplary enhancement layer inter-layer prediction (ILP) reference picture subset construction process. The ILP reference picture subset may be either predicted from a given temporal reference picture set from a given reference layer, or signaled explicitly. An exemplary decoding process for reference picture set extension is illustrated in FIG. 17. The decoder may use a parse NAL unit header to determine if the unit may be for a base layer or enhancement layers, perhaps depending on the layer_id. In some embodiments, perhaps if layer_id may be 0, the payload data of the NAL unit may be from the base layer, and the decoding process may be compliant with the HEVC coding standard, and/or the corresponding reference picture sets may derived as specified in the HEVC standard.

In some embodiments, if layer_id may be larger than 0, the payload data of the NAL unit may be from the enhancement layers, and/or the SPS header may a carry short-term reference picture set extension as described herein.

In some embodiments, the temporal reference picture subset may be presented in a reference picture set extension. The temporal reference picture subset can be constructed either from the predicted temporal reference picture set from a lower layer, and/or by explicit signaling.

In some embodiments, if inter-layer prediction may be enabled (e.g. ilp_enable_flag is true), the inter-layer reference picture subset may be constructed to mark the available inter-layer reference pictures in DPB. The co-located reference picture may be signaled by collocated_ref_pic_present_ flag, and/or the rest of the inter-layer reference pictures may be signaled either explicitly, or from a prediction of a lower layer's inter-layer reference picture subset, for example.

Figure 19:
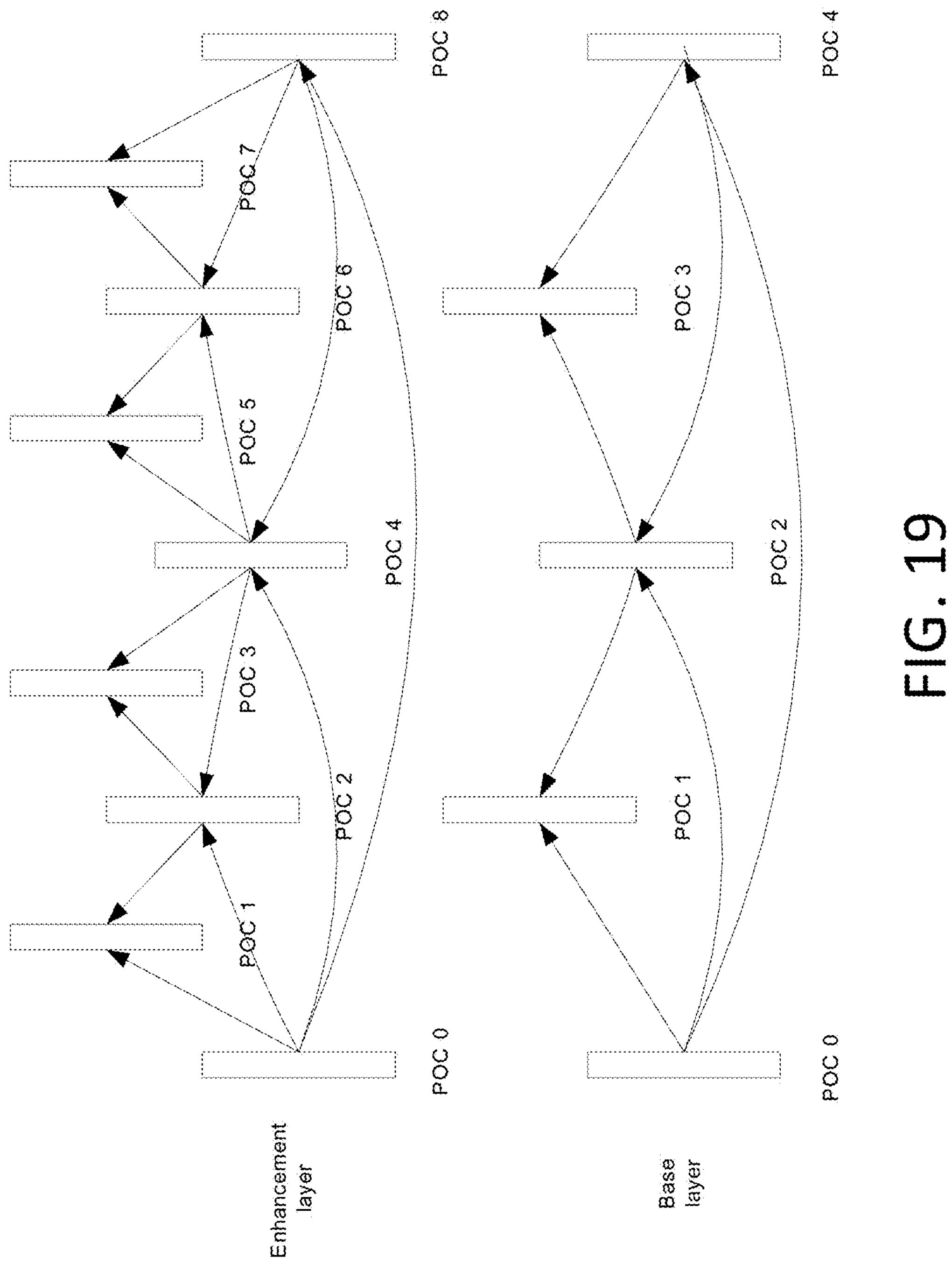
FIG. 19 an example of a two layer dyadic and nested temporal scalable coding structure with different frame rate consistent with embodiments.

FIG. 19 is an example of two layers dyadic and nested temporal scalable coding structure with a different frame rate. The base layer may have a lower frame rate and its GOP size may be four, the enhancement layer may have a high frame rate and its GOP size may be eight.

Table 37 is a prediction example for the scalable coding structure shown in FIG. 19. Table 38 illustrates an exemplary bits reduction of one or more, or each, RPS as compared to an explicit RPS signaling method specified in HEVC. In some embodiments up to 70% bits saving may be achieved. In some embodiments, perhaps as compared to inter-RPS prediction (JCTVC-G198), additional (e.g. significant) bits saving may be achieved.

In some embodiments, the bits saving may be more significant when the entire temporal reference picture subsets may be identical to the RPS of the base or reference layer. In such scenarios, one 1 bit flag and/or 1 bit layer_id (0) may be used to duplicate the entire temporal reference picture subsets of the enhancement layer from the base layer, for example.

One or more embodiments contemplate one or more decoding techniques for reference picture lists construction. A Reference picture list may include part or all of the reference pictures indicated by reference picture set extension for the motion compensation prediction of current coding picture. The construction of a reference picture list for a single layer video may be specified in HEVC. Embodiments contemplate that for scalable HEVC coding, extra inter-layer reference pictures may be marked into a reference picture list.

In some embodiments, the temporal reference pictures in the reference picture list may be constructed the same way as specified in HEVC. The inter-layer reference pictures may be marked in the reference picture list as described herein. If a co-located reference picture (e.g. at the same time instance as the current picture from a layer lower than a current layer) from a lower reference layer may be available, the co-located reference picture may be placed

TABLE 37

Exemplary Temporal RPS prediction

| Layer | RPS index | Delta POC | temporal RPS prediction flag | ref_layer_id | ref_rps_idx | scale factor | Decoded DeltaPOC |
|---|---|---|---|---|---|---|---|
| EL | 0 | (−8, −10, −12, −16) | 1 | 0 | 0 | 2 | −8, −10, −12, −16 |
| | 1 | (−4, −6, 4) | 1 | 0 | 1 | 2 | −4, −6, 4 |
| | 2 | (−2, −4, 2, 6) | 1 | 0 | 2 | 2 | −2, −4, 2, 6 |
| | 3 | (−1, 1, 3, 7) | 0 | 0 | | | |
| | 4 | (−1, −3, 1, 5) | 0 | 0 | | | |
| | 5 | (−2, −4, −6, 2) | 1 | 0 | 3 | 2 | −2, −4, −6, 2 |
| | 6 | (−1, −5, 1, 3) | 0 | 0 | | | |
| | 7 | (−1, −3, −7, 1) | 0 | 0 | | | |
| | 8 | (−8) | 1 | 0 | 4 | 2 | −8 |
| | 9 | (−4, 4) | 1 | 0 | 5 | 2 | −4, 4 |
| | 10 | (−2, 2, 6) | 1 | 0 | 6 | 2 | −2, 2, 6 |
| BL | 0 | (−4, −5, −6, −8) | 0 | | | | |
| | 1 | (−2, −3, 2) | 0 | | | | |
| | 2 | (−1, −2, 1, 3) | 0 | | | | |
| | 3 | (−1, −2, −3, 1) | 0 | | | | |
| | 4 | (−4) | 0 | | | | |
| | 5 | (−2, 2) | 0 | | | | |
| | 6 | (−1, 1, 3) | 0 | | | | |

TABLE 38

Bits reduction example

| RPS index | Delta POC | Total bits (A) (explicit signaling) | Total bits (B) (G198) | flag | ref_layer_id | ref_rps_idx | scale factor | Total bits | Saving % vs. (A) |
|---|---|---|---|---|---|---|---|---|---|
| 0 | (−8, −10, −12, −16) | 28 | 27 | 1 | 1 | 3 | 3 | 8 | 71.43% |
| 1 | (−4, −6, 4) | 23 | 15 | 1 | 1 | 3 | 3 | 8 | 65.22% |
| 2 | (−2, −4, 2, 6) | 25 | 10 | 1 | 1 | 3 | 3 | 8 | 68.00% |
| 5 | (−2, −4, −6, 2) | 25 | 12 | 1 | 1 | 3 | 3 | 8 | 68.00% |
| 8 | (−8) | 13 | 13 | 1 | 1 | 3 | 3 | 8 | 38.46% |
| 9 | (−4, 4) | 19 | 10 | 1 | 1 | 3 | 3 | 8 | 57.89% |
| 10 | (−2, 2, 6) | 21 | 9 | 1 | 1 | 3 | 3 | 8 | 61.90% |

prior to the temporal reference pictures in the reference picture list. If extra inter-layer reference pictures (e.g. non co-located reference pictures) may be used for inter-layer motion prediction, these reference pictures may be placed after those temporal reference pictures in the reference picture list.

In some embodiments, HEVC may also support the specification of the reference picture set in the slice header as shown in Table 32. In some embodiments, similar RPS prediction methodology can also be applied in the slice level, perhaps where short_term_ref_pic_set_sps_flag may equal zero.

Table 39 illustrates exemplary slice header syntax changes that may support short term RPS extensions for scalable HEVC. In some embodiments, the RPS indexed by num_short_term_ref_pic_set_ext can be predicted from the RPS specified in slice header of the reference layer, perhaps when applicable.

TABLE 39

Exemplary scalable HEVC slice header syntax

| | Descriptor |
|---|---|
| slice_header( ) { | |
| ...... | |
| pic_order_cnt_lsb | u(v) |
| if (!layer_id) { | |
| short_term_ref_pic_set_sps_flag | u(1) |
| if( !short_term_ref_pic_set_sps_flag ) | |
| short_term_ref_pic_set( num_short_term_ref_pic_sets ) | |
| else | |
| short_term_ref_pic_set_idx | u(v) |
| } | |
| else { | |
| short_term_ref_pic_set_sps_flag | u(1) |
| if( !short_term_ref_pic_set_sps_flag) | |
| short_term_ref_pic_set_ext( num_short_term_ref_pic_set_ext ) | |
| else | |
| short_term_ref_pic_set_ext_idx | u(v) |
| } | |
| ...... | |
| } | |

One or more embodiments contemplate long term reference picture set prediction for HEVC scalable coding. A long term reference picture set may be included in the slice header. Perhaps because slices may occur more often than parameter sets and/or multiple slices could be used for the same frame, among other reasons, saving bit overhead in the slice header may be useful. Aspects of the HEVC long term reference picture set syntax are illustrated in Table 32. Given the spatial scalability and/or quality scalability scenarios, among other factors, the short term and/or long term RPS may be similar for the base layer and/or the enhancement layer. In some embodiments, an additional flag may be added into the slice header that may indicate if the long term RPS can be predicted from a long term RPS from the reference layer, for example.

Table 40 illustrates an exemplary long term RPS prediction syntax for scalable HEVC contemplated by one or more embodiments.

TABLE 40

Long term RPS prediction syntax for Scalable HEVC

| | Descriptor |
|---|---|
| slice_header( ) { | |
| ...... | u(1) |
| if( long_term_ref_pics_present_flag ) { | |
| if (!layer_id) | |
| long_term_rps( ) | |
| else { | |
| lt_rps_prediction_flag | u(1) |
| if(lt_rps_prediction_flag) { | |
| ref_layer_id | u(v) |
| lt_rps_idx | u(v) |
| rps_scale_factor_minus1 | ue(v) |
| } | |
| else { | |
| long_term_rps( ) | |
| } | |
| } | |
| ...... | |
| long_term_rps( ) { | |
| num_long_term_pics | ue(v) |
| for( i = 0; i < num_long_term_pics; i++ ) { | |
| delta_poc_lsb_lt[ i ] | ue(v) |
| delta_poc_msb_present_flag[ i ] | u(1) |
| if( delta_poc_msb_present_flag[ i ] ) | |
| delta_poc_msb_cycle_lt_minus1[ i ] | ue(v) |
| used_by_curr_pic_lt_flag[ i ] | u(1) |
| } | |

In some embodiments, lt_rps_prediction_flag equaling 1 may specify the same long term RPS can be extracted from the slice header of the slice from a reference layer. In some embodiments, ref_layer_id may specify the reference layer which may contain the same long term RPS. In some embodiments, lt_rps_idx may specify the index of long term reference picture set of reference layer. In some embodiments rps_scale_factor_minus1 may specify the scaling factor to scale up the DeltaPOC of a long term reference picture set from the reference layer.

In light of the foregoing description and figures, one or more embodiments contemplate at least one device for video data coding that may be configured at least in part, to generate a bitstream. The bitstream may include one or more reference picture set (RPS) extensions that may indicate one or more inter-layer reference pictures for one or more decoding picture buffers (DPBs). The one or more DPBs may be respectively associated with one or more video coding layers.

In some embodiments, the device may be further configured such that the bitstream may be generated to further include at least one indication that a video coding layer of the one or more video coding layers may serve as a reference layer for at least one inter-layer prediction of at least one higher video coding layer of the one or more video coding layers.

In some embodiments, the device may be further configured such that the bitstream may be generated to further include an indication that at least one of the one or more inter-layer reference pictures associated with a DPB of a first video coding layer of the one or more video coding layers may also be associated with a DPB of a second video coding layer of the one or more video coding layers.

In some embodiments, the second video coding layer of the one or more video coding layers may be higher than the first video coding layer of the one or more video coding layers.

In some embodiments, the device may be further configured such that the bitstream may be generated to further include one or more RPS extensions that may indicate one or more temporal reference pictures for the one or more DPBs. The bitstream may further include an indication for inclusion of the one or more temporal reference pictures and the one or more inter-layer reference pictures to at least one reference picture list.

In some embodiments, the one or more inter-layer reference pictures may include one or more co-located reference pictures and one or more non-co-located reference pictures. The device may be further configured such that the bitstream may be generated to further include an indication of placement in the reference picture list of at least one of the one or more co-located reference pictures at a position of at least one of prior to or after a position of at least one of the one or more temporal reference pictures.

In some embodiments, the device may be further configured such that the bitstream may be generated such that the indication of placement may further indicate placement of at least one of the one or more non-co-located reference pictures at a position of at least one of prior to or after the position of the at least one of the one or more temporal reference pictures.

In some embodiments, the one or more inter-layer reference pictures may include one or more co-located inter-layer reference pictures and one or more non-co-located inter-layer reference pictures. The device may be further configured such that the one or more RPS extensions may indicate the one or more co-located inter-layer reference pictures for the one or more DPBs.

In some embodiments, the device may be further configured such that the bitstream may be generated to further include one or more RPS extensions indicating one or more temporal reference pictures for the one or more DPBs. The bitstream may further include an indication that at least one of the one or more non-co-located inter-layer reference pictures may be predictable from the one or more temporal reference pictures.

In some embodiments, the device may be further configured such that the bitstream may be generated to include the one or more reference picture set (RPS) extensions indicating the one or more inter-layer reference pictures for one or more decoding picture buffers (DPBs) within a parameter set.

In some embodiments, the device may be further configured such that the bitstream may be generated to further include at least one indication that one or more inter-layer reference pictures associated with a first DPB of a first video coding layer may be included in a second DPB of a second video coding layer.

In some embodiments, the second video coding layer may be higher than the first video coding layer.

One or more embodiments contemplate at least one device for video data coding that may be configured, at least in part, to generate a bitstream. The bitstream may include one or more reference picture set (RPS) extensions that may indicate one or more inter-layer delta picture order counts (POCs). The one or more POCs may respectively be associated with one or more video coding layers.

In some embodiments, the device may be further configured such that the bitstream may be generated to further include one or more RPS extensions that may indicate one or more temporal reference pictures for the one or more video coding layers.

In some embodiments, the device may be further configured such that the bitstream may be generated to further include an indication that one or more temporal reference pictures associated with a first video coding layer may be used for a second video coding layer.

In some embodiments, the indication may be a one bit flag. The first video coding layer may be at least one of a base layer or a reference layer. The second video coding layer may be an enhancement layer. The enhancement layer may be higher than the first video coding layer.

One or more embodiments contemplate at least one device for video data processing that may be configured, at least in part, to generate a first video coding layer. The first video coding layer may include a first reference picture set (RPS). The first RPS may include one or more temporal reference pictures in a first decoding picture buffer (DPB). The device may be further configured to generate a second video coding layer, based at least in part, on the temporal reference pictures of the first RPS. The second video coding layer may include a second RPS. The second RPS may include one or more temporal reference pictures and one or more inter-layer reference pictures in a second DPB. The device may be further configured to generate a third video coding layer, based at least in part, on at least one of the first RPS or the second RPS.

In some embodiments, at least the first video coding layer may be generated according to a high efficiency video coding (HEVC) protocol.

In some embodiments, the device may be further configured to perform motion compensated prediction temporally within at least one of the second video coding layer or the third video coding layer.

In some embodiments, the third video coding layer may include a third DPB. The third DPB may include at least one of the one or more inter-layer reference pictures that may be included in at least one of the first DPB or the second DPB.

In some embodiments, the device may be further configured such that the generation of the third video coding layer may include the prediction of one or more temporal reference pictures of a third RPS based on at least one of the first RPS or the second RPS.

In some embodiments, the device may be further configured to receive an indication to scale at least one of the first RPS or the second RPS. The generation of the third video coding layer may include the prediction of one or more temporal reference pictures of a third RPS based on at least one of a scaled first RPS or a scaled second RPS.

In some embodiments, the device may be further configured such that an RPS extension of the second video coding layer may include a set of the one or more temporal reference pictures of the second DPB and a set of the one or more inter-layer reference pictures of the second DPB. An RPS extension of the third video coding layer may be predictable from the RPS extension of the second video coding layer.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A video decoding device, comprising:

a processor configured to:

obtain video data that comprises an enhancement layer and at least one reference layer of the enhancement layer;

construct, for a current enhancement layer picture, an inter-layer reference picture set (RPS) that comprises at least one decoded picture associated with a same time instance as the current enhancement layer picture from the at least one reference layer of the enhancement layer;

construct, for the current enhancement layer picture, a temporal RPS, that comprises at least one temporal enhancement layer reference picture that is associated with a same enhancement layer as the current enhancement layer picture and a different time instance as the current enhancement layer picture;

generate a reference picture list for the current enhancement layer picture based on the inter-layer RPS and the temporal RPS, wherein the at least one temporal enhancement layer reference picture from the temporal RPS precedes the at least one decoded picture from the inter-layer RPS in the generated reference picture list for the current enhancement layer picture; and decode the current enhancement layer picture based on the reference picture list.

2. The device of claim 1, wherein the processor is further configured to:

identify, from the at least one reference layer of the current enhancement layer, the at least one decoded picture having a same picture order count (POC) number as the current enhancement layer picture; and add the identified at least one decoded picture to the inter-layer RPS.

3. The device of claim 1, wherein the processor is further configured to:

obtain inter-layer dependency information associated with the enhancement layer, wherein the inter-layer RPS is constructed based on the inter-layer dependency information associated with the enhancement layer.

4. The device of claim 1, wherein the processor is further configured to:

obtain an inter-layer reference picture number indicator associated with the current enhancement layer picture, the current enhancement layer picture indicating a number of inter-layer reference pictures from the inter-layer RPS to be used for predicting of the current enhancement layer picture, wherein the inter-layer RPS is constructed based on the inter-layer reference picture number indicator.

5. The device of claim 1, further comprising a memory.

6. A video encoding device, comprising:

a processor configured to:

obtain video data that comprises an enhancement layer and at least one reference layer of the enhancement layer;

construct, for a current enhancement layer picture, an inter-layer reference picture set (RPS) that comprises at least one decoded picture associated with a same time instance as the current enhancement layer picture from the at least one reference layer of the enhancement layer;

construct, for the current enhancement layer picture, a temporal RPS, that comprises at least one temporal enhancement layer reference picture that is associated with a same enhancement layer as the current enhancement layer picture and a different time instance as the current enhancement layer picture;

generate a reference picture list for the current enhancement layer picture based on the inter-layer RPS and the temporal RPS, wherein the at least one temporal enhancement layer reference picture from the temporal RPS precedes the at least one decoded picture from the inter-layer RPS in the generated reference picture list for the current enhancement layer picture; and encode the current enhancement layer picture based on the reference picture list.

7. The device of claim 6, wherein the processor is further configured to:

identify, from the at least one reference layer of the current enhancement layer, the at least one decoded picture having a same picture order count (POC) number as the current enhancement layer picture; and add the identified at least one decoded picture to the inter-layer RPS.

8. The device of claim 6, wherein the processor is further configured to:

obtain inter-layer dependency information associated with the enhancement layer, wherein the inter-layer RPS is constructed based on the inter-layer dependency information associated with the enhancement layer.

9. The device of claim 6, wherein the processor is further configured to:

determine a number of inter-layer reference pictures from the inter-layer RPS to be used for predicting of the current enhancement layer picture, the inter-layer RPS is constructed based on the determined number of inter-layer reference pictures.

10. The device of claim 6, further comprising a memory.

11. A method of video decoding, the method comprising:

obtaining video data that comprises an enhancement layer and at least one reference layer of the enhancement layer;

constructing, for a current enhancement layer picture, an inter-layer reference picture set (RPS) that comprises at least one decoded picture associated with a same time instance as the current enhancement layer picture from the at least one reference layer of the enhancement layer;

constructing, for the current enhancement layer picture, a temporal RPS, that comprises at least one temporal enhancement layer reference picture that is associated with a same enhancement layer as the current enhancement layer picture and a different time instance as the current enhancement layer picture;

generating a reference picture list for the current enhancement layer picture based on the inter-layer RPS and the temporal RPS, wherein the at least one temporal enhancement layer reference picture from the temporal RPS precedes the at least one decoded picture from the inter-layer RPS in the generated reference picture list for the current enhancement layer picture; and decoding the current enhancement layer picture based on the reference picture list.

12. The method of claim 11, further comprising:

identifying, from the at least one reference layer of the current enhancement layer, the at least one decoded picture having a same picture order count (POC) number as the current enhancement layer picture; and adding the identified at least one decoded picture to the inter-layer RPS.

13. The method of claim 11, further comprising:

obtaining inter-layer dependency information associated with the enhancement layer, wherein the inter-layer RPS is constructed based on the inter-layer dependency information associated with the enhancement layer.

14. The method of claim 11, further comprising:

obtaining an inter-layer reference picture number indicator associated with the current enhancement layer picture, the current enhancement layer picture indicating a number of inter-layer reference pictures from the inter-layer RPS to be used for predicting of the current enhancement layer picture, wherein the inter-layer RPS is constructed based on the inter-layer reference picture number indicator.

15. A computer-readable medium including instructions for causing one or more processors to:

obtain video data that comprises an enhancement layer and at least one reference layer of the enhancement layer;

construct, for a current enhancement layer picture, an inter-layer reference picture set (RPS) that comprises at least one decoded picture associated with a same time instance as the current enhancement layer picture from the at least one reference layer of the enhancement layer;

construct, for the current enhancement layer picture, a temporal RPS, that comprises at least one temporal enhancement layer reference picture that is associated with a same enhancement layer as the current enhancement layer picture and a different time instance as the current enhancement layer picture;

generate a reference picture list for the current enhancement layer picture based on the inter-layer RPS and the temporal RPS, wherein the at least one temporal enhancement layer reference picture from the temporal RPS precedes the at least one decoded picture from the inter-layer RPS in the generated reference picture list for the current enhancement layer picture; and decode the current enhancement layer picture based on the reference picture list.

16. The computer-readable medium of claim 15, further including instructions for causing one or more processors to:

identify, from the at least one reference layer of the current enhancement layer, the at least one decoded picture having a same picture order count (POC) number as the current enhancement layer picture; and add the identified at least one decoded picture to the inter-layer RPS.

* * * * *